(12) United States Patent
Kitamura

(10) Patent No.: US 11,202,088 B2
(45) Date of Patent: Dec. 14, 2021

(54) IMAGE PROCESSING APPARATUS AND METHOD

(71) Applicant: SONY CORPORATION, Tokyo (JP)

(72) Inventor: Takuya Kitamura, Tokyo (JP)

(73) Assignee: SONY CORPORATION, Tokyo (JP)

(\*) Notice: Subject to any disclaimer, the term of this patent is extended or adjusted under 35 U.S.C. 154(b) by 0 days.

(21) Appl. No.: 16/978,934

(22) PCT Filed: Mar. 1, 2019

(86) PCT No.: PCT/JP2019/008003
§ 371 (c)(1),
(2) Date: Sep. 8, 2020

(87) PCT Pub. No.: WO2019/176579
PCT Pub. Date: Sep. 19, 2019

(65) Prior Publication Data
US 2021/0051338 A1 Feb. 18, 2021

(30) Foreign Application Priority Data

Mar. 15, 2018 (JP) .............................. JP2018-047819

(51) Int. Cl.
*H04N 7/12* (2006.01)
*H04N 19/40* (2014.01)
(Continued)

(52) U.S. Cl.
CPC ........... *H04N 19/40* (2014.11); *H04N 19/105* (2014.11); *H04N 19/114* (2014.11);
(Continued)

(58) Field of Classification Search
CPC .... H04N 19/40; H04N 19/105; H04N 19/114; H04N 19/139; H04N 19/172;
(Continued)

(56) References Cited

U.S. PATENT DOCUMENTS

| 7,269,509 B2 * | 9/2007 | Ozaki ................ H04N 1/00408 |
| | | 701/523 |
| 10,136,132 B2 * | 11/2018 | Zhou ...................... H04N 19/64 |
| 2010/0119157 A1 * | 5/2010 | Kameyama ............ H04N 19/59 |
| | | 382/195 |
| 2014/0132594 A1 | 5/2014 | Gharpure et al. |

(Continued)

FOREIGN PATENT DOCUMENTS

| DE | 102010030068 A1 | 12/2011 |
| JP | 2008-193495 A | 8/2008 |

(Continued)

*Primary Examiner* — Gims S Philippe
(74) *Attorney, Agent, or Firm* — Paratus Law Group, PLLC

(57) ABSTRACT

There is provided an image processing apparatus and method allowing suppression of a decrease in coding efficiency. Coded data obtained by coding a captured image captured by a moving body with an image capturing section is transcoded on the basis of positional information indicating a position where the captured image has been generated. For example, the positional information includes at least one of GPS information indicating the position of the moving body or IMU information indicating movement of the moving body, and captured images are coded in frame images of a moving image on the basis of the information. For example, the present disclosure can be applied to an image processing apparatus, an image coding apparatus, a communication apparatus, an information processing apparatus, an image capturing apparatus, or the like.

17 Claims, 35 Drawing Sheets

(51) Int. Cl.
*H04N 19/105* (2014.01)
*H04N 19/114* (2014.01)
*H04N 19/139* (2014.01)
*H04N 19/172* (2014.01)
*H04N 19/196* (2014.01)
*H04N 19/46* (2014.01)

(52) U.S. Cl.
CPC ......... *H04N 19/139* (2014.11); *H04N 19/172* (2014.11); *H04N 19/196* (2014.11); *H04N 19/46* (2014.11)

(58) Field of Classification Search
CPC ................. H04N 19/196; H04N 19/46; H04N 21/234336; H04N 21/25841; H04N 19/124; H04N 19/134; H04N 19/85; H04N 21/226; H04N 19/136
USPC ..................................................... 375/240.16
See application file for complete search history.

(56) References Cited

U.S. PATENT DOCUMENTS

| | | | |
|---|---|---|---|
| 2014/0219361 | A1* | 8/2014 | Wegener .............. H04N 19/423 375/240.24 |
| 2015/0350653 | A1 | 12/2015 | Kim et al. |
| 2016/0133261 | A1* | 5/2016 | Shi ........................ G10L 19/008 381/22 |
| 2017/0163994 | A1 | 6/2017 | Sanchez De La Fuente et al. |
| 2017/0180729 | A1* | 6/2017 | Wu ...................... H04N 19/115 |
| 2017/0223423 | A1* | 8/2017 | Hardy ................ H04N 21/2387 |
| 2019/0075357 | A1* | 3/2019 | Bai ................. H04N 21/440263 |
| 2019/0283875 | A1* | 9/2019 | Zhu ........................ H04N 19/85 |

FOREIGN PATENT DOCUMENTS

| | | |
|---|---|---|
| JP | 2013-157787 A | 8/2013 |
| JP | 3208050 U | 12/2016 |
| WO | WO 2016/069877 A1 | 5/2016 |

* cited by examiner

FIG. 1

| METHOD | MEANS |
|---|---|
| #1 | POSITIONAL INFORMATION IS USED TO TRANSCODE STILL IMAGE CODED DATA INTO MOVING IMAGE CODED DATA, AND MOVING IMAGE CODED DATA IS TRANSMITTED |
| #1-1 | REFERENCE FRAME IS SELECTED ON BASIS OF POSITIONAL INFORMATION COMPUTE |
| #1-2 | MOTION VECTOR IS COMPUTED ON BASIS OF POSITIONAL INFORMATION |
| #1-3 | GOP STRUCTURE IS SELECTED ON BASIS OF POSITIONAL INFORMATION |
| #1-4 | PSEUDO 2 PATH RATE CONTROL IS PERFORMED ON BASIS OF POSITIONAL INFORMATION |
| #1-5 | SORTING-OUT OF FRAME IS PERFORMED ON BASIS OF POSITIONAL INFORMATION |
| #1-6 | POSITIONAL INFORMATION IS ADDED TO MOVING IMAGE CODED DATA AS USER DATA |
| #2 | IMAGE CAPTURING RESULTS OBTAINED USING PLURALITY OF MOVING BODIES IS SORTED |
| #3 | MOVING BODY SELECTS TRANSMISSION OR RECORDING |

F I G . 9
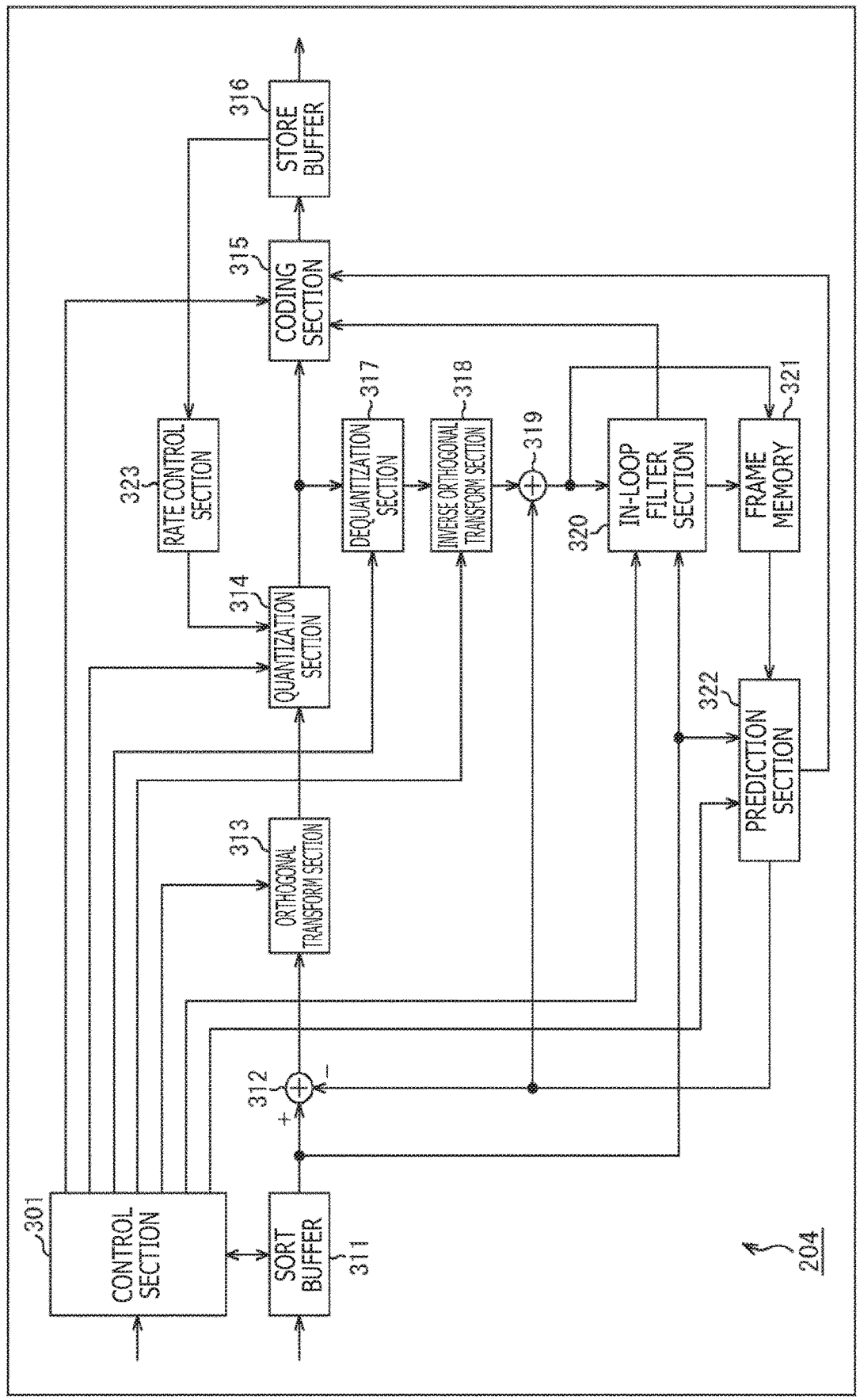

IMAGE PROCESSING APPARATUS AND METHOD

CROSS REFERENCE TO PRIOR APPLICATION

This application is a National Stage Patent Application of PCT International Patent Application No. PCT/JP2019/008003 (filed on Mar. 1, 2019) under 35 U.S.C. § 371, which claims priority to Japanese Patent Application No. 2018-047819 (filed on Mar. 15, 2018), which are all hereby incorporated by reference in their entirety.

TECHNICAL FIELD

The present disclosure relates to an image processing apparatus and method, and in particular to an image processing apparatus and method enabled to suppress a decrease in coding efficiency.

BACKGROUND ART

In a known system, a flying object is provided with a camera and flies with the camera capturing aerial images of the ground and the like (see, for example, PTL 1). The data of the captured images is large in amount, and is typically coded and recorded or transmitted.

CITATION LIST

Patent Literature

[PTL 1]
PCT Patent Publication No. WO2016/069877

SUMMARY

Technical Problems

However, a storage capacity or a communication band is not always sufficiently large for the data amount. Additionally, utilization of captured images with higher resolutions leads to an increased data amount. Thus, there has been a demand for further improvement of coding efficiency.

In view of such circumstances, an object of the present disclosure is to allow suppression of a decrease in coding efficiency.

Solution to Problems

An image processing apparatus according to one aspect of the present technique is an image processing apparatus including a transcode section configured to transcode coded data obtained by coding a captured image captured by a moving body with an image capturing section, on the basis of positional information indicating a position where the captured image has been generated.

An image processing method according to one aspect of the present technique is an image processing method including transcoding coded data obtained by coding a captured image captured by a moving body with an image capturing section, on the basis of positional information indicating a position where the captured image has been generated.

In the image processing apparatus according to one aspect of the present technique, the coded data obtained by coding the captured image captured by the moving body with the image capturing section is transcoded on the basis of positional information indicating the position where the captured image has been generated.

Advantageous Effects of Invention

According to the present technique, images can be processed. In particular, a decrease in coding efficiency can be suppressed.

BRIEF DESCRIPTION OF DRAWINGS

FIG. 1 is a diagram illustrating, in a tabulated list, a processing method to which the present technique is applied.
FIG. 9 is a block diagram illustrating a main configuration example of a moving image coding section.

DESCRIPTION OF EMBODIMENTS

Figure 2:
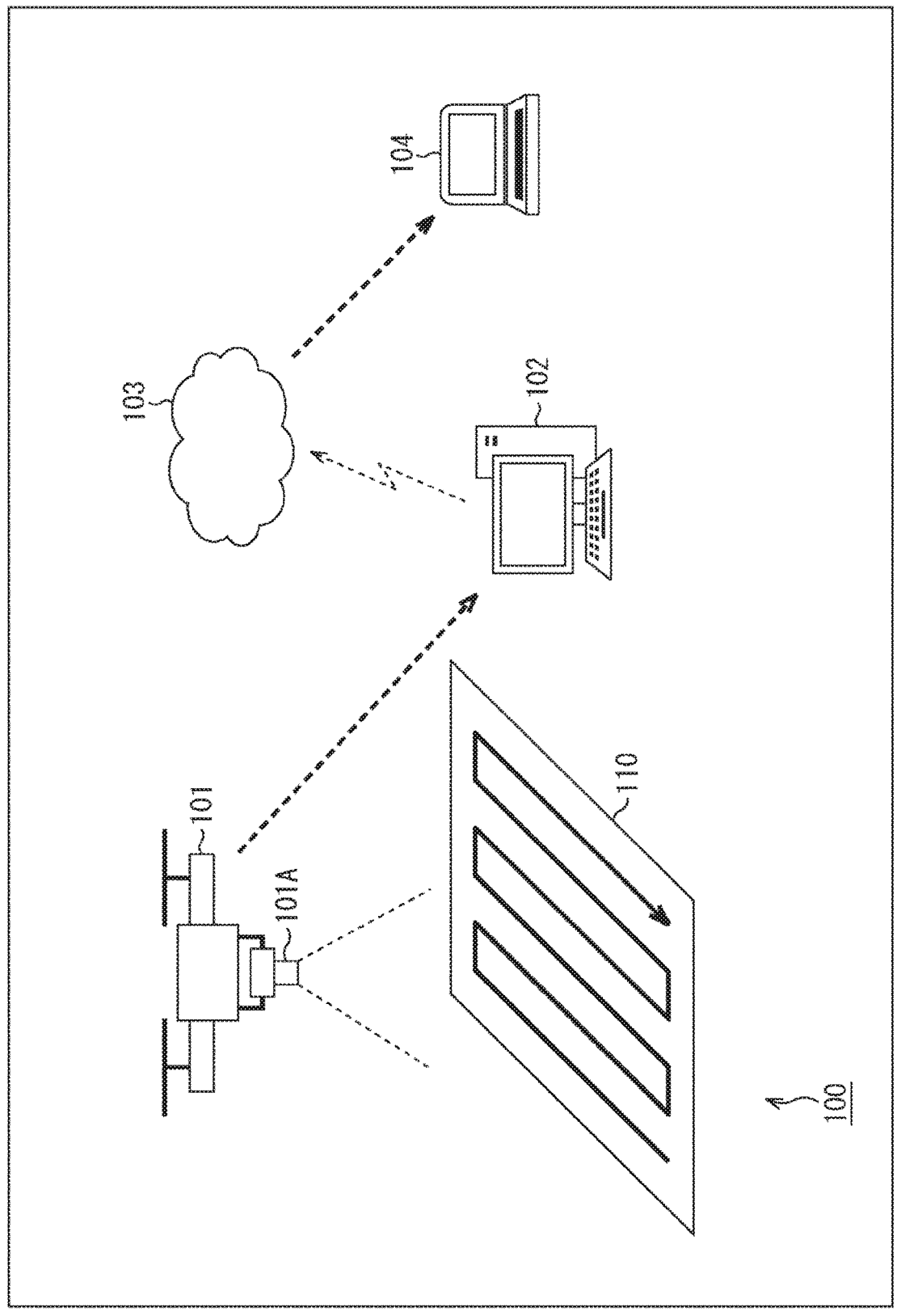
FIG. 2 is a diagram illustrating an example of a system to which the present technique is applied.

Embodiments of the present disclosure (hereinafter referred to as embodiments) will be described below. The description is in the following order.
1. Image Capturing from Flying Object
2. Common Concept (Brief Description of Each Method)
3. First Embodiment (Detailed Description of Method #1)
4. Second Embodiment (Detailed Description of Method #2)
5. Third Embodiment (Detailed Description of Method #3)
6. Supplemental Features 1. Image Capturing from Flying Object <Coding of Captured Image>

In a known system described in, for example, PTL 1, a flying object is provided with a camera and flies with the camera capturing aerial images of the ground and the like. For example, the system can be used to capture images of an entire predetermined range of the ground and the like with no part of the range missed and to generate, from the captured images, three-dimensional map information regarding the ground and the like. The data of the captured images processed by such a system is large in data amount, and is thus typically coded to reduce the data amount before the data is recorded or transmitted.

However, a storage capacity or a communication band is not always sufficiently large with respect to the data amount. Additionally, utilization of captured images with higher resolutions leads to an increased data amount. Thus, there has been a demand for further improvement of coding efficiency.

<Coding Based on Positional Information>

Thus, a captured image is coded on the basis of positional information indicating a position where a moving body has generated the captured image of the subject by capturing an image of a subject.

For example, an image processing apparatus includes a coding section coding a captured image on the basis of the position where the moving body has generated the captured image of the subject by capturing an image of the subject.

This allows suppression of a decrease in coding efficiency.

Note that any positional information may be used and may include, for example, information related to the position of the moving body, information related to movement of the moving body, or image capturing control information. Additionally, the position of the moving body may include not only a position in a horizontal direction but also a position in a height direction. In addition, the position may be an absolute position (for example, global coordinates such as latitude and longitude) or a relative position relative to a certain reference (for example, a relative position or the like with reference to a ground station).

Additionally, any moving body may be used. For example, the moving body may be a flying object such as what is called a drone, an airplane, or a balloon, a vehicle, for example, a car or a bicycle, a ship, or a living organism, for example, a human being, an animal, or the like.

<Transcoding Based on Positional Information>

Additionally, coded data resulting from coding of a captured image obtained by a moving body with an image capturing section is transcoded on the basis of positional information indicating a position where the captured image has been generated.

For example, an image processing apparatus includes a transcode section transcoding coded data obtained by coding a captured image captured by a moving body with an image capturing section, on the basis of positional information indicating a position where the captured image has been generated.

This allows suppression of a decrease in coding efficiency.

Note that any positional information may be used and may include, for example, information related to the position of the moving body, information related to movement of the moving body, or image capturing control information. Additionally, the position of the moving body may include not only a position in the horizontal direction but also a position in the height direction. In addition, the position may be an absolute position (for example, global coordinates such as latitude and longitude) or a relative position relative to a certain reference (for example, a relative position or the like with reference to a ground station).

2. Common Concept

<Brief Description of Each Method>

Such coding is utilized to execute, for example, processing as indicated in a table in FIG. 1 (one of methods #1 to #3).

For example, in the method #1, still image coded data resulting from coding in accordance with a still image coding scheme using positional information is transformed into moving image coded data resulting from coding in accordance with a moving image coding scheme (this transformation is hereinafter also referred to as transcoding).

In a flying object that captures images, limitation of the size and weight of a housing, limitation of power consumption due to battery driving, and the like generally make implementation of moving image coding, involving a heavy load, difficult. Thus, the flying object captures still images, and codes the captured still images in accordance with the still image coding scheme. However, the still image coding has a lower coding efficiency (compression rate) than moving image coding.

Additionally, in image capturing for generation of three-dimensional map information, images are captured such that many image capturing ranges overlap one another among a plurality of captured images. In other words, a group of captured images generated in a flying object includes much redundant information. However, in the still image coding scheme, this is not taken into account for coding, leading to a corresponding decrease in coding efficiency.

Thus, the flying object captures images of the ground and the like to generate captured images, codes the captured images in accordance with the still image coding scheme to generate still image coded data, and records the still image coded data. Additionally, at this time, the flying object adds positional information and the like obtained at the time of image capturing, to the still image coded data as metadata.

Then, after image capturing, the flying object transfers the captured image group (still image coded data group) to a relay station on the ground (the station is hereinafter also referred to as a ground station). Then, the ground station decodes the still image coded data group and recodes the decoded still image coded data in accordance with a moving image coding scheme. In other words, the ground station transcodes the captured images. At that time, the ground station performs the transcoding (performs coding in accordance with the moving image coding scheme) on the basis of positional information and the like corresponding to each of the captured images, to generate moving image coded data.

Generating moving image coded data in this manner allows the ground station to reduce the data amount below the amount of the still image coded data generated by the flying object. In other words, a decrease in coding efficiency can be suppressed. This enables a reduction in the data amount of the captured images before the captured images are recorded or transmitted. In other words, an increase in load on recording or transmission of the captured images can be suppressed.

In such coding based on the positional information, a reference frame may be selected on the basis of the positional information, for example, as in a method #1-1.

A certain moving image coding scheme involves performing prediction with reference to another frame, enabling a reduction in redundant information between the frames. In a case where such a coding scheme is used to code the captured images, each of the captured images is formed into a frame image, which is then coded. Incidentally, captured images are obtained by the flying object capturing images of the ground and the like while in motion, and thus correlation between the captured images is regarded to increase with decreasing distance between relevant positions.

Thus, which frame (in other words, another captured image) is to be referenced is selected on the basis of the positional information regarding the captured images. In other words, a captured image of a closer position is referenced. This enables prediction accuracy to be improved, allowing the coding efficiency to be further improved.

Additionally, for example, as in a method #1-2, motion vectors may be computed on the basis of the positional information.

A certain moving image coding scheme involves performing motion prediction between the current frame and the reference frame to generate motion vectors and using the motion vectors for coding. As described above, the flying object captures images while in motion, there is a high correlation between the movement of the flying object (including movement of the camera and the like) and the movement between images. In other words, by computing the motion vectors with the positional information (moving distance of the flying object) taken into account, the motion vectors can be more efficiently computed.

Additionally, for example, a coding parameter used for coding may be determined on the basis of the positional information. For example, as in a method #1-3, a GOP structure may be set using the positional information.

This is because the flying object captures images while in motion as described above, the correlation between the captured images depends on the movement of the flying object (including the movement of the camera and the like). For example, more significant movement of the flying object reduces the correlation between the captured images, whereas less significant movement of the flying object increases the correlation between the captured images.

Thus, setting the GOP structure with the positional information (moving distance of the flying object) taken into account, a GOP structure can be set that is more suitable for the correlation between the captured images, allowing the coding efficiency to be improved.

Additionally, for example, as in a method #1-4, rate control may be performed on the basis of the positional information.

For example, the positional information is used to estimate a code amount, a coding parameter is set in accordance with the estimation, and coding is performing using the coding parameter. Then, pseudo 2 path encoding can be realized. In other words, rate control is performed during coding, and thus pseudo rate control with two paths (hereinafter referred to as pseudo 2 path rate control) can be realized. Accordingly, more appropriate rate control can be performed, allowing the coding efficiency to be improved.

Additionally, for example, as in a method #1-5, sorting-out of captured images (frames) may be performed on the basis of the positional information.

The movement of the flying object (image capturing range of each image capturing) is not stable, and the image capturing may be within an unintended range due to an external factor, for example, winds. Such image capturing within an unintended range is likely to be useless and unwanted. In other words, such captured images may be deleted without any problem (for example, three-dimensional map information can be generated without any problem). Thus, by determining, on the basis of the positional information (that is, the image capturing range), whether the captured images are unwanted as described above or not, and deleting unwanted captured images before performing coding, a decrease in coding efficiency can be suppressed.

Additionally, for example, as in a method #1-6, the positional information may be added to (associated with) the moving image coding scheme as user data. Thus, when the moving image coded data is decoded and the captured images resulting from the decoding are processed, the positional information regarding the captured images can be utilized. For example, when map information is generated, the positional information regarding each captured image can be used, enabling more efficient processing.

Additionally, for example, a method #2 is as follows. During transcoding, captured images generated in a plurality of moving bodies are sorted on the basis of the positional information, and a group of the captured images resulting from the sorting is treated as one moving image and coded in accordance with the moving image coding scheme to generate moving image coded data.

For example, in a case where a plurality of flying objects is used to capture images of a substantially identical range, the captured images generated by the flying objects are within image capturing ranges positioned close to one another and have a high correlation. Accordingly, this allows referencing of the captured images generated by the different flying objects, allowing the coding efficiency to be improved.

Additionally, for example, in a method #3, whether coded data is to be transmitted or recorded by the flying object is selected.

For example, in a sufficiently favorable communication environment, the flying object transmits still image coded data to a facility generating three-dimensional map information (for example, a cloud or the like). This allows the captured images to be transmitted more quickly to the facility generating three-dimensional map information. Additionally, an increase in load on the ground station can be suppressed.

In addition, in an unfavorable (insufficient) communication environment, the flying object records still image coded data in a recording medium, and after the image capturing ends (flying ends), transmits the still image coded data to the ground station. The ground station transcodes the still image coded data into moving image coded data, and transmits the moving image coded data to the facility generating three-dimensional map information (for example, a cloud or the like). This enables an increase in the amount of data transmitted to be suppressed and allows the captured images to be transmitted more quickly to the facility generating three-dimensional map information.

By thus enabling selection of how the still image coded data is to be recorded or transmitted (as a system as a whole, how the captured images are to be transmitted), the captured images can be transmitted in a more appropriate manner according to the situation.

3. First Embodiment

<Image Processing System>

Now, each of the methods in FIG. 1 will be more specifically described. In the present embodiment, the method #1 (including methods #1-1 to #1-6) will be described. FIG. 2 is a block diagram illustrating an example of a configuration of a mode of the image processing system to which the present technique is applied. An image processing system 100 illustrated in FIG. 2 is a system capturing aerial images of the ground and the like and using the captured images to generate and utilize three-dimensional map information regarding the ground and the like.

As illustrated in FIG. 2, the image processing system 100 includes a flying object 101, a ground station 102, a cloud 103, and a terminal apparatus 104.

The flying object 101 is a mode of a moving body and flies in the air. The flying object 101 may be what is called a manned moving body in which an operator sits or an unmanned moving body remotely controlled by the operator to fly or which flies in accordance with a program or the like. In other words, the flying object 101 flies in accordance with operation by the operator or control by the program or the like.

The flying object 101 includes a camera 101A and can capture images of a subject while in flight. The camera 101A may be movable (the image capturing range (image capturing direction) is variable with respect to a housing of the flying object 101) or fixed (the image capturing range (image capturing direction) is fixed with respect to the housing of the flying object 101). Additionally, the camera 101A may be removable from the flying object 101 or may be integrated with the flying object 101 (may be unremovable from the flying object 101).

For example, while flying over a subject area 110 including a desired range such as the ground, the flying object 101 uses the camera 101A to capture an image of the subject area 110. The subject area 110 is large with respect to the image capturing range of the camera 101A, and it is difficult for the camera 101A to capture an image of the entire subject area 110 at a time.

Thus, the flying object 101 performs image capturing, for example, while the flying object 101 is moving zigzag over the subject area 110 as illustrated by an arrow. For example, the flying object 101 repeats image capturing with the image capturing range changed each time by moving as described above or changing the angle of the camera 101A, thus capturing an image of the entire subject area 110 with no part of the area missed. The flying object 101 codes, in accordance with the still image coding scheme, each captured image (still image) generated by the image capturing as described above to generate still image coded data.

Note that the flying object 101 adds information related to the position of the image capturing range to the still image coded data as positional information. The positional information includes, for example, GPS (Global Positioning System) information indicating the position of the flying object 101, IMU (Inertial Measurement Unit) information indicating movement of the flying object 101, image capturing control information indicating the orientation of the camera 101A (image capturing direction), and the like. The still image coded data provided with such additional positional information is stored in a storage medium inside the flying object 101.

After the image capturing (flight) ends, the flying object 101 and the ground station 102 are communicatively connected, and the still image coded data stored in the storage medium of the flying object 101 is transmitted to the ground station 102. This connection (communication) is optional, and for example, wired connection (wired communication) or wireless connection (wireless communication) may be used. Additionally, for example, via the storage medium such as a removable medium, the still image coded data (stored in the storage medium) may be transmitted from the flying object 101 to the ground station 102.

The ground station 102 is a mode of the information processing apparatus (image processing apparatus), and is, for example, installed near the subject area 110 to acquire the still image coded data from the flying object 101, having finished the image capturing (flight). The ground station 102 transcodes and transforms the acquired still image coded data into moving image coded data. At that time, the ground station 102 utilizes the positional information added to the still image coded data to code the captured images in accordance with the moving image coding scheme. The ground station 102 is communicatively connected to (or can be communicatively connected to) the cloud 103, and this communication is used to transfer the generated moving image coded data to the cloud 103.

The cloud 103 is a mode of the information processing apparatus (image processing apparatus), and has any configuration and can execute any processing. Hardware performance of the cloud 103 is sufficiently high and allows even advanced processing (complicated processing with a heavy load) to be easily executed. For example, the cloud 103 acquires moving image coded data from the ground station 102 and decodes the moving image coded data to restore captured images. The cloud 103 uses the captured images to three-dimensionally measure the subject area 110 to generate three-dimensional map information regarding the subject area 110. Then, the cloud 103 accumulates the generated three-dimensional map information in a database or the like, and provides a distribution service for the three-dimensional map information.

The terminal apparatus 104 is a mode of the information processing apparatus (image processing apparatus), and is a terminal apparatus receiving the distribution service provided by the cloud 103. For example, the terminal apparatus 104 is communicatively connected to (or can be communicatively connected to) the cloud 103, and uses this communication to indicate the subject area 110 to the cloud 103 and request feeding of three-dimensional map information regarding the subject area 110. The cloud 103 feeds the requested three-dimensional map information to the terminal apparatus 104.

The terminal apparatus 104 displays the fed three-dimensional map information regarding a monitor as images in accordance with user operations or the like. A user of the terminal apparatus 104 can utilize the displayed three-dimensional map.

<Flying Object>

Figure 3:
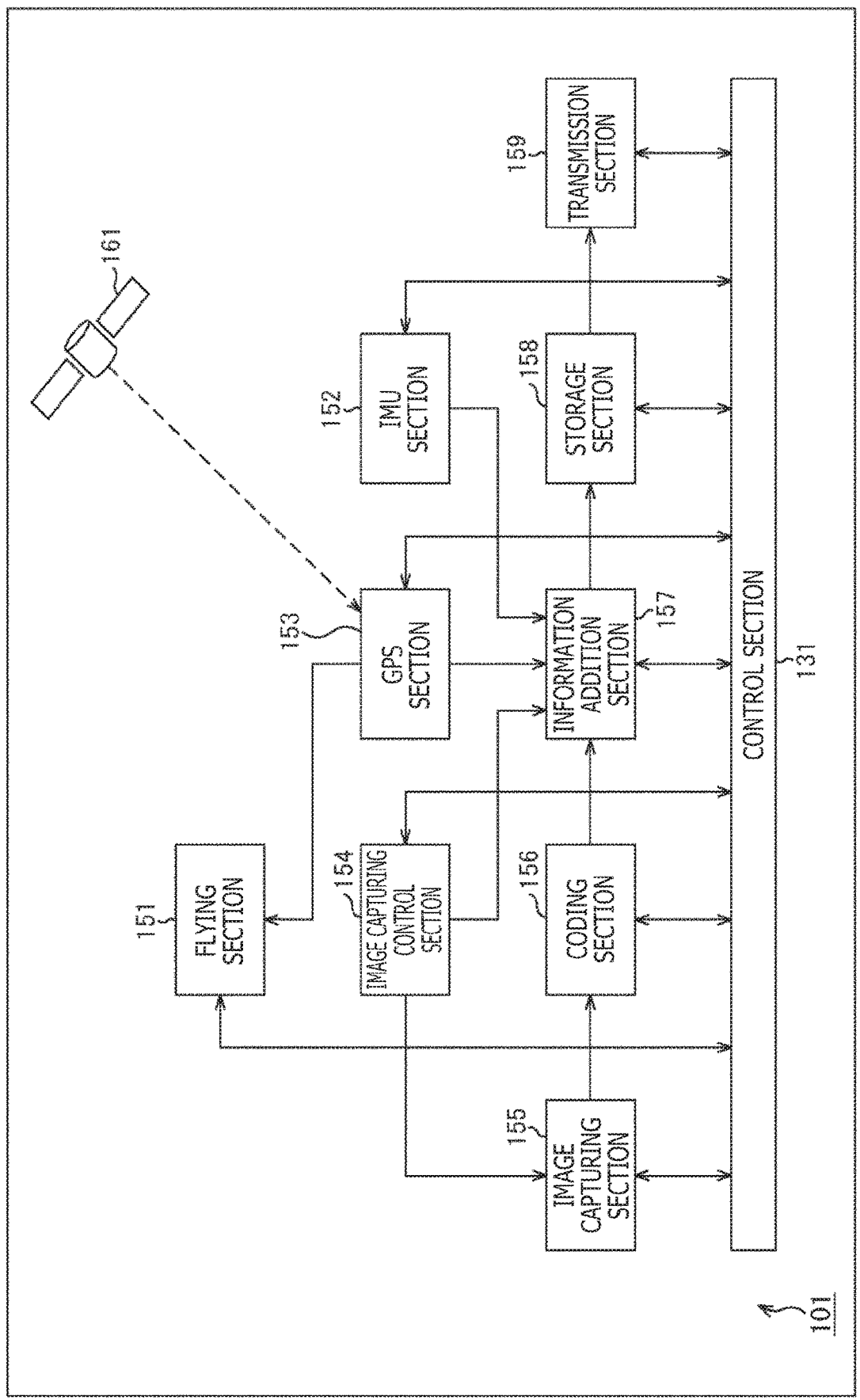
FIG. 3 is a block diagram illustrating a main configuration example of a flying object.

FIG. 3 is a block diagram illustrating a main configuration example of the flying object 101. As illustrated in FIG. 3, the flying object 101 includes, for example, a control section 131, a flying section 151, an IMU (Inertial Measuring unit) section 152, a GPS (Global Positioning System) section 153, an image capturing control section 154, an image capturing section 155, a coding section 156, an information addition section 157, a storage section 158, and a transmission section 159.

The control section 131 executes processing related to control of the flying object 101. For example, the control section 131 controls operation of processing sections from the flying section 151 to the transmission section 159. For example, the control section 131 controls various types of processing such as control of flying of the flying object 101 (route control, speed control, and the like), control of image capturing (orientation (angle and the like), focal distance, zooming, image capturing timing, exposure time, and the like of the camera 101A), coding of captured images, acquisition and addition of positional information, and storage, reading (transmission), and the like of still image coded data.

The control section 131 may have any configuration but includes, for example, a CPU (Central Processing Unit), a ROM (Read Only Memory), a RAM (Random Access Memory), and the like. The CPU and the ROM loads, into the RAM, programs, data, and the like stored in the storage section 158 and the like, and executes the programs, data, and the like to execute processing related to the control of the flying object 101.

Additionally, the control section 131 can execute processing related to the control of the flying object 101 on the basis of user instructions and the like input via an input section (operation section) not illustrated. Furthermore, the control section 131 can execute processing related to the control of the flying object 101 on the basis of control information fed from another apparatus via a communication section not illustrated.

The flying section 151 includes functions needed for the flying object 101 to fly, for example, a propeller, a motor, and the like. In other words, the flying section 151 performs driving and causes the flying object 101 to fly. The flying section 151 performs driving under the control of the control section 131. For example, the flying section 151 starts and ends flight in accordance with indications from the control section 131. Additionally, for example, the flying section 151 causes the flying object 101 to fly (move) such that the position, height, route, speed, and the like are as indicated by the control section 131.

The IMU section 152 includes a three-axis gyro (angular speed sensor or each acceleration sensor) and a three-direction acceleration sensor, and drives the sensors under the control of the control section 131, and determines three-dimensional angular speeds and accelerations. In other words, the IMU section 152 generates information related to the movement of the flying object 101. The IMU section 152 feeds, to the information addition section 157, the generated information related to the movement (including, for example, the three-dimensional angular speed and acceleration).

Under the control of the control section 131, the GPS section 153 receives a signal from a GPS satellite 161 and determines the position (coordinates) of the flying object 101 on the basis of the signal. In other words, the GPS section 153 generates information related to the position of the flying object 101. The GPS section 153 feeds, to the information addition section 157, the generated information related to the position (GPS information).

The image capturing control section 154 is controlled by the control section 131 to control driving of the image capturing section 155. For example, the image capturing control section 154 controls the orientation (angle and the like), focal distance, zooming, image capturing timing, exposure time, and the like of the camera 101A. Additionally, the image capturing control section 154 feeds the information addition section 157 with image capturing control information indicating the contents of the control (in other words, the image capturing direction and the like).

The image capturing section 155 includes a mechanism and the like controlling the camera 101A and the orientation of the camera 101A, and executes processing related to image capturing under the control of the image capturing control section 154. For example, the image capturing section 155 captures an image of a subject (for example, the subject area 110) at an image capturing timing specified by the image capturing control section 154 using the orientation, focal distance, zooming, and exposure time specified by the image capturing control section 154, to generate (data of) a captured still image. The image capturing section 155 feeds the captured image to the coding section 156.

Under the control of the control section 131, the coding section 156 codes, in accordance with the still image coding scheme, each of the captured images fed from the image capturing section 155, to generate still image coded data. This still image coding scheme is optional. For example, JPEG (Joint Photographic Experts Group) or the like may be used or any other scheme may be used. The coding section 156 feeds the generated still image coded data to the information addition section 157.

Under the control of the control section 131, the information addition section 157 adds, to the still image data, positional information related to the position of the captured image. The positional information includes, for example, the still image coded data and at least one of the GPS information fed from the GPS section 153, the IMU information fed from the IMU section 152, or the image capturing control information fed from the image capturing control section 154. In other words, the positional information includes at least one of the information related to position and movement of the flying object 101, the information related to the control of image capturing, or the like. Note that the position of the flying object 101 may include a position in the horizontal direction (for example, longitude and latitude), a position in the vertical direction (height), or both. The height may be measured by a altimeter provided in the flying object 101 or computed from the IMU information or the like.

The information addition section 157 adds the positional information to the still image coded data as metadata to form a file. This file format is optional. For example, the information addition section 157 may use Exif (Exchangeable Image File Format) to add the positional information to the coded data. The use of such a format allows the positional information to be more easily accessed.

The information addition section 157 feeds the storage section 158 with an image file generated by adding the positional information to the still image coded data as described above.

The storage section 158 includes any storage medium, for example, a hard disk, a flash memory, or the like, and stores, under the control of the control section 131, the image file fed from the information addition section 157 in the storage medium. Additionally, under the control of the control section 131, the storage section 158 reads and feeds the image file stored in the storage medium, to the transmission section 159.

The transmission section 159 includes, for example, a network interface, and executes, under the control of the control section 131, processing related to transmission via the network interface. For example, after flight (after the image capturing ends), with the flying object 101 communicatively connected to the ground station 102, the transmission section 159 reads and transmits the image file stored in the storage section 158 (for example, the image file generated in this flight) to the ground station 102. This communication method and communication scheme is optional. For example, wired communication or wireless communication may be used.

<Image File>

Figure 4:
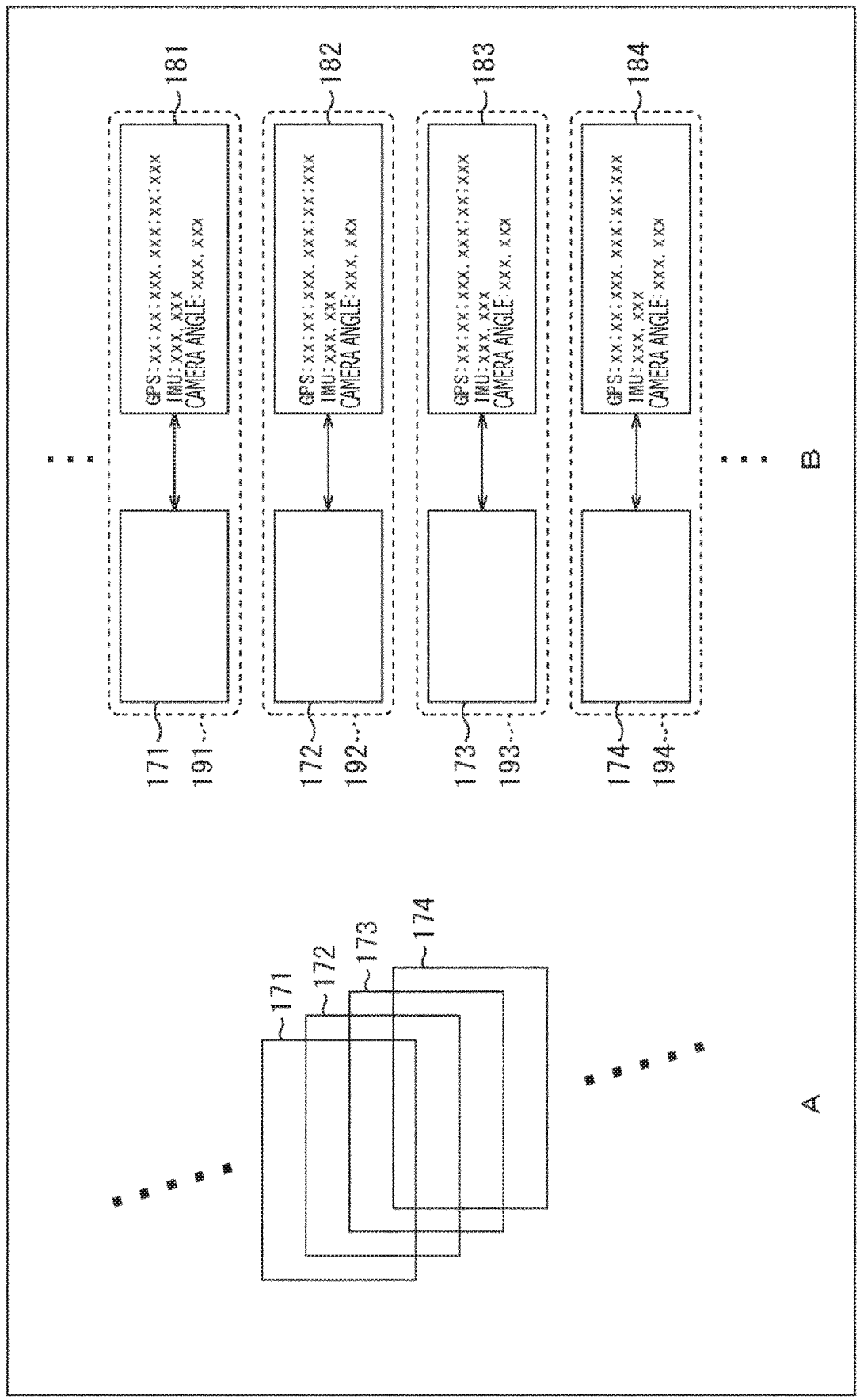
FIG. 4 is a diagram illustrating an example of how the flying object transforms captured images into a file.

When capturing images of the subject area 110, the image capturing section 155 repeats image capturing while updating the image capturing range such that one image capturing range overlaps another image capturing range. Accordingly, for example, captured images corresponding to images of mutual vicinities include many overlapping portions as seen in captured images 171 to 174 illustrated in A of FIG. 4. In actuality, the captured images are used to generate 3D images (three-dimensional map information), and thus a plurality of captured images of an identical point with different image capturing angles (orientations) may be utilized, but it may be improper to simply reduce the overlapping portions. However, the overlapping portions are likely to have higher degree of image similarity than non-overlapping portions. In other words, in terms of image information, the captured image group contains much redundant information.

However, in the flying object 101, limitation of the size and weight of a housing, limitation of power consumption due to battery driving, and the like generally make implementation of moving image coding, involving a heavy load, difficult. Thus, the flying object 101 captures still images, and codes the captured images in accordance with the still image coding scheme.

As described above, the positional information is added to each of the captured images to form a file. For example, as illustrated in B of FIG. 4, positional information 181 corresponding to a captured image 171 (positional information 181 obtained during image capturing when the captured image 171 has been generated) is added to still image coded data of the captured image 171 in a predetermined file format to generate an image file 191. The positional information 181 includes, for example, GPS information (GPS: xx; xx; xxx, xxx; xx; xxx), IMU information (IMU: xxx, xxx), and image capturing control information (camera angle: xxx, xxx).

Similarly, positional information 182 corresponding to a captured image 172 (positional information 182 obtained during image capturing when the captured image 172 has been generated) is added to still image coded data of the captured image 172 in a predetermined file format to generate an image file 192. Similarly, positional information 183 corresponding to a captured image 173 (positional information 183 obtained during image capturing when the captured image 173 has been generated) is added to still image coded data of the captured image 173 in a predetermined file format to generate an image file 193. Similarly, positional information 184 corresponding to a captured image 174 (positional information 184 obtained during image capturing when the captured image 174 has been generated) is added to still image coded data of the captured image 174 in a predetermined file format to generate an image file 194.

Accordingly, these image files include still image coded data, which has a larger code amount than moving image coded data. Additionally, the still image coding scheme independently codes each captured image, and is thus hindered from reduce redundant information between the captured images as described above. In other words, the image file contains much redundant information as illustrated in A of FIG. 4. Accordingly, the coding efficiency is low (there is room for improvement).

<Ground Station>

Thus, the ground station 102 transcodes and transforms such an image file (still image coded data) into moving image coded data. Furthermore, at that time, coding is performed using the positional information added to the still image coded data. This allows the ground station 102 to generate moving image coded data with coding efficiency improved. In other words, a decrease in coding efficiency can be suppressed.

Figure 5:
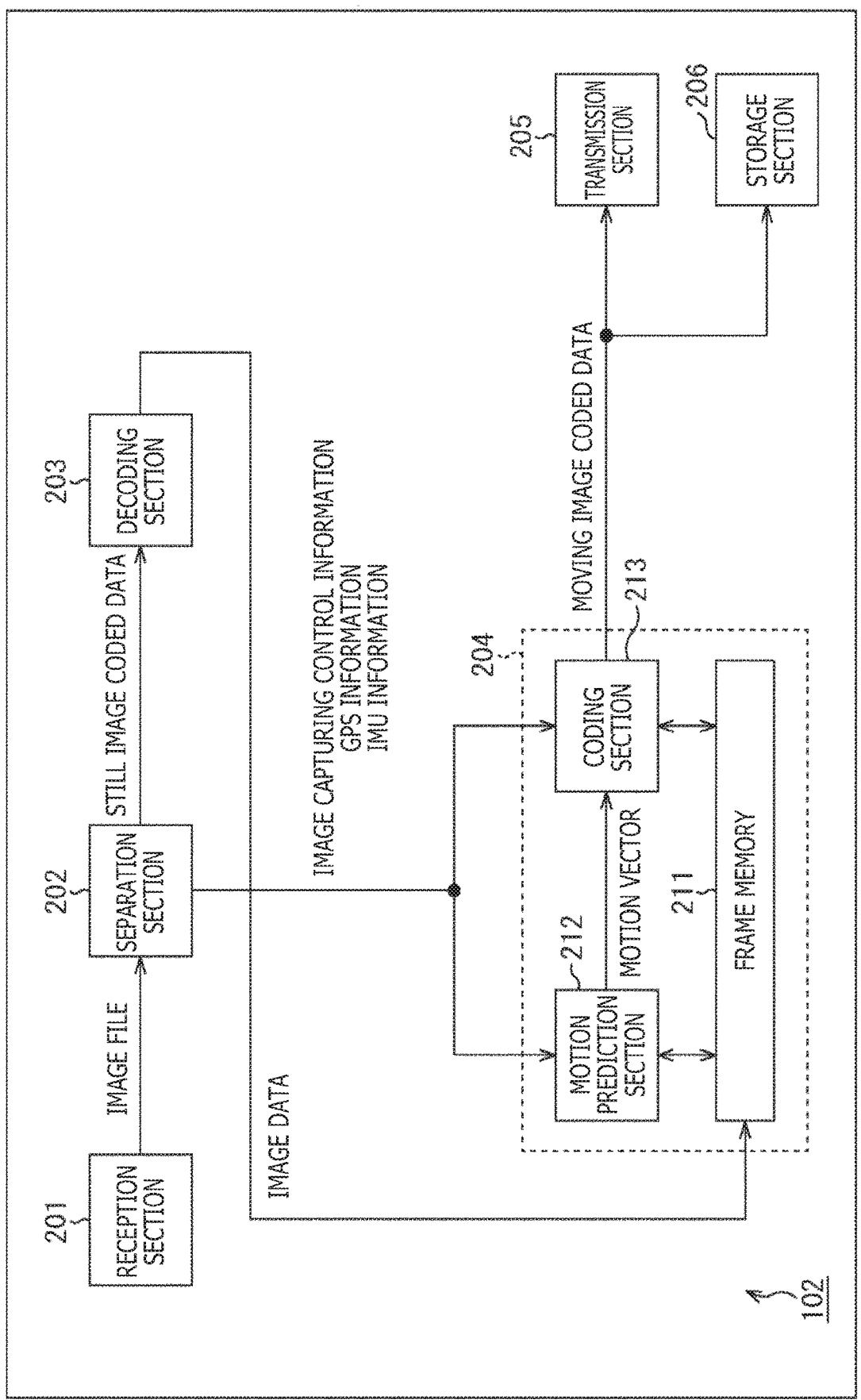
FIG. 5 is a block diagram illustrating a main configuration example of a ground station.

FIG. 5 is a block diagram illustrating a main configuration example of the ground station 102. As illustrated in FIG. 5, the ground station 102 includes, for example, a reception section 201, a separation section 202, a decoding section 203, a moving image coding section 204, a transmission section 205, and a storage section 206. Additionally, the moving image coding section 204 includes a frame memory 211, a motion prediction section 212, and a coding section 213.

The reception section 201 includes, for example, a network interface, and executes processing related to reception via the network interface. For example, with the ground station communicatively connected to the flying object 101, the reception section 201 receives an image file transmitted from the flying object 101 (transmission section 159). The reception section 201 feeds the received image file to the separation section 202.

The separation section 202 separates the positional information from the still image coded data in the fed image file. The separation section 202 feeds (the motion prediction section 212 and coding section 213 of) the moving image coding section 204 with the positional information separated from the still image coded data (GPS information, IMU information, image capturing control information, and the like). Additionally, the separation section 202 feeds the decoding section 203 with the still image coded data separated from the positional information.

The decoding section 203 decodes the fed still image coded data in accordance with a decoding scheme corresponding to the coding scheme, to restore (data of) captured images. For example, in a case where the captured images are coded one by one into still images in accordance with the still image coding scheme as in the example described above, the decoding section 203 decodes the still image coded data in accordance with the still image coding scheme corresponding to the coding scheme, to restore the respective captured images. The decoding section 203 feeds the restored captured images (image data) to the frame memory 211 of the moving image coding section 204.

The moving image coding section 204 executes processing related to coding of captured images. For example, the moving image coding section 204 codes a captured image obtained by the moving body. For example, the moving image coding section 204 performs the coding on the basis of the positional information corresponding to the position where the moving body has generated the captured image by capturing an image of the subject. For example, the moving image coding section 204 performs the coding in accordance with another scheme different from the coding scheme for the coded data not decoded by the decoding section 203 yet. For example, the moving image coding section 204 codes, into frame images of moving images, the plurality of captured images restored by the decoding section 203 decoding the still image coded data. In other words, the moving image coding section 204 codes the captured image group in accordance with the moving image coding scheme to generate moving image coded data. This moving image coding scheme is optional. For example, MPEG (Moving Picture Experts Group), AVC (Advanced Video Coding), HEVC (High Efficiency Video Coding), or the like may be used, or any other scheme may be used.

For example, the moving image coding section 204 uses motion prediction to code the captured image group. The frame memory 211 acquires and stores the captured images fed from the decoding section 203. The motion prediction section 212 uses the captured images stored in the frame memory 211 and the positional information fed from the separation section 202 to perform motion prediction to generate motion vectors. The motion prediction section 212 feeds the generated motion vectors to the coding section 213. The coding section 213 utilizes the motion vectors fed from the motion prediction section 212 and the positional information fed from the separation section 202 to code the captured image group stored in the frame memory 211 to generate moving image coded data.

The moving image coding section 204 (coding section 213) feeds the generated moving image coded data to the transmission section 205, the storage section 206, or both.

The transmission section 205 includes a network interface, and executes processing related to transmission via the network interface. For example, the transmission section 205 transmits, to another apparatus (for example, the communicatively connected cloud 103), the moving image coded data fed from the moving image coding section 204 (coding section 213). The communication method and communication scheme are optional. For example, wired communication or wireless communication may be used.

The storage section 206 includes any storage medium, for example, a hard disk or a flash memory, and stores, in the storage medium, the moving image coded data fed from the moving image coding section 204 (coding section 213). The moving image coded data stored in the storage section 206 can be utilized in an optional method. For example, the ground station 102 may execute predetermined image processing such as generation of three-dimensional map information, and during the image processing, read and utilize the moving image data. Additionally, for example, the moving image coded data may be read from the storage section 206 and transmitted to another apparatus via the transmission section 205. In addition, for example, the storage section 206 may be connected to another apparatus (at that time, the storage section 206 may be removed from the ground station 102), and the another apparatus may read the moving image coded data from the storage section 206.

<Comparison of Processing>

Figure 6:
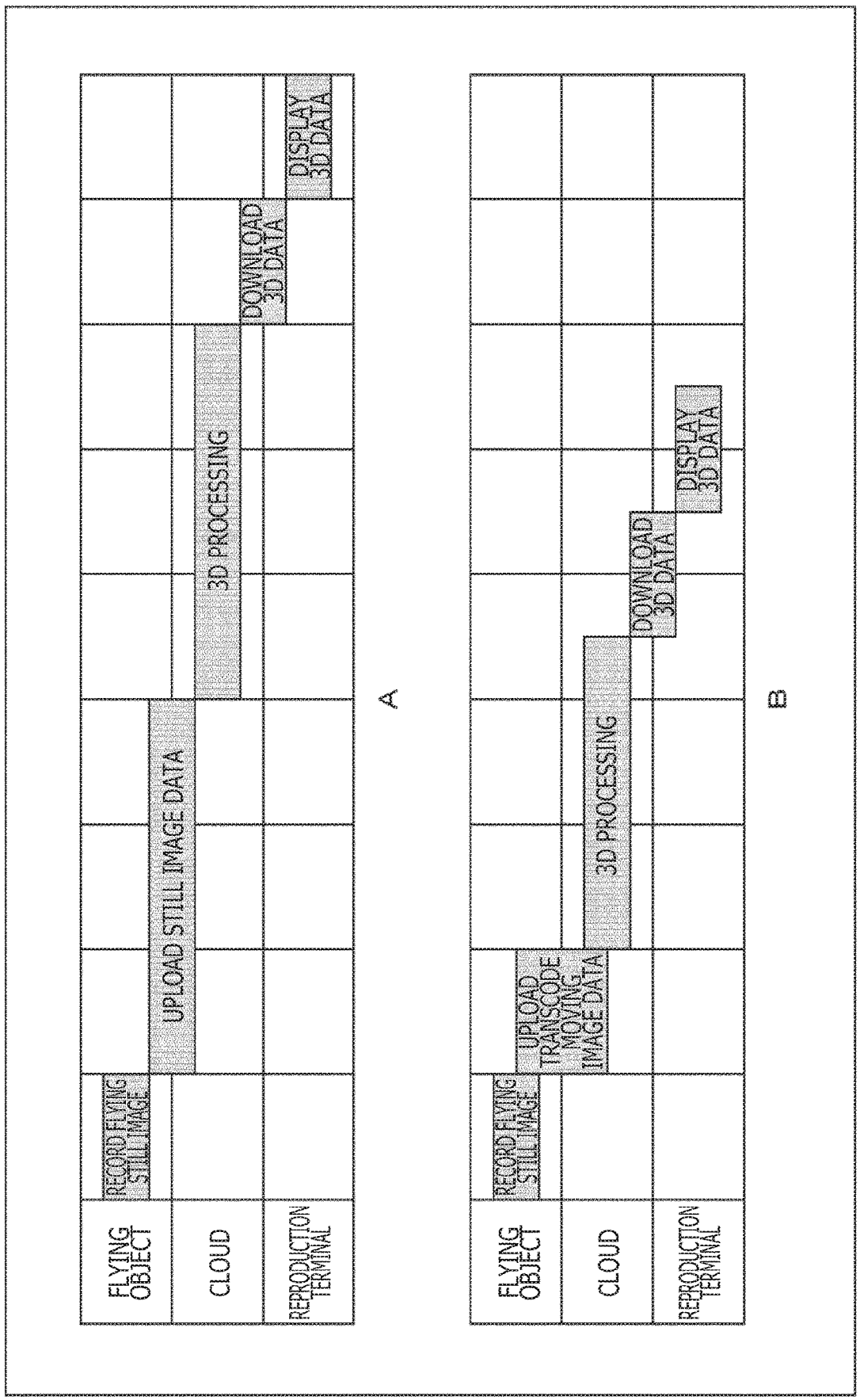
FIG. 6 is a diagram illustrating a method #1.

FIG. 6 illustrates an example of a timing chart comparing transmission of still image coded data to the cloud 103 without transformation with transcoding of the still image coded data into moving image coded data followed by transmission of the moving image coded data to the cloud 103.

In a case where still image coded data is directly transmitted to the cloud 103, the following is executed that processing in which the flying object 101 flies, and captures and records images as still images, processing in which still image coded data (still image data) is uploaded to the cloud 103, 3D processing in which the cloud 103 generates three-dimensional map information regarding the basis of the captured images, processing in which the terminal apparatus 104 downloads the three-dimensional map information (3D data), and processing in which the terminal apparatus 104 displays the downloaded three-dimensional map information as images, as illustrated in A of FIG. 6.

In contrast, in a case where the still image coded data is transcoded into moving image coded data, which is then transmitted to the cloud 103, then instead of the processing in which the still image coded data is uploaded to the cloud 103 as illustrated in B of FIG. 6, processing in which the still image coded data is transcoded into moving image coded data is executed and processing in which the moving image coded data (moving image data) is uploaded to the cloud 103 is then executed.

The image processing system 100 can easily generate and utilize three-dimensional map information. As the measurement on the ground is more difficult due to the large area and high complexity of the topography, the image processing system 100 can more easily generate three-dimensional map information and is thus very useful. Accordingly, for example, it is sufficiently assumed that a location in the suburbs, the mountains, or the like is used as a site for which three-dimensional map information is generated (the location of the subject area 110). However, in many cases, such a location has few communication facilities and an improper communication environment (narrow communication band).

The still image coded data has a much larger data amount than the moving image coded data, and thus an improper communication environment (narrow communication band) increases the time required for uploading the still image coded data as in A of FIG. 6 in a case where the still image coded data is transmitted directly to the cloud 103.

Thus, the ground station 102 transcodes the still image coded data into moving image coded data as described above, and the transcoding enables a significant reduction in data amount compared to the use of the still image coded data. Furthermore, in a case where coding is performed using the positional information, the coding can be more efficiently achieved. In other words, a decrease in coding efficiency can be suppressed.

Accordingly, as illustrated in B of FIG. 6, even the combination of the transcode processing with the upload processing enables a quicker transmission than in A of FIG. 6. In other words, an increase in communication loads in uploading of image data (coded data) can be suppressed. In addition, in this case, generation, provision, utilization, and the like of three-dimensional map information can be performed more quickly than in A of FIG. 6.

<Procedure of Image Capture Processing>

Now, processing executed in the image processing system 100 as described above will be described. In a case of capturing images, the flying object 101 executes image capture processing. With reference to a flowchart in FIG. 7, an example of a procedure of image capture processing executed by the flying object 101 will be described.

When the image capture processing is started, in step S101, under the control of the control section 131, the flying section 151 flies over a desired position in the subject area 110.

In step S102, under the control of the control section 131, the image capturing control section 154 controls the image capturing section 155 to adjust an image capturing direction to a desired direction. The image capturing control section 154 also adjust an angle of field or the like.

In step S103, under the control of the control section 131, the image capturing section 155 captures an image of the subject (subject area 110) to generate a captured image. Additionally, the IMU section 152 generates IMU information of that point in time, the GPS section 153 generates GPS information of that point in time, and the image capturing control section 154 generates image capturing control information of that point in time.

In step S104, under the control of the control section 131, the coding section 156 codes the captured image generated in step S103 in accordance with the still image coding scheme, for example, JPEG.

In step S105, the information addition section 157 associates the positional information including the IMU information, GPS information, and image capturing control information generated in step S103 with the still image coded data generated in step S104. For example, the information addition section 157 uses a predetermined file format, for example, Exif and the like to add the positional information to the still image coded data as metadata to generate an image file.

In step S106, the storage section 158 stores the image file generated in step S105.

When the processing in step S106 ends, the image capture processing ends. The flying object 101, for example, repeats such image capture processing to capture an image of the entirety of the subject area 110.

<Procedure of Transformation and Transfer Processing>

Figure 8:
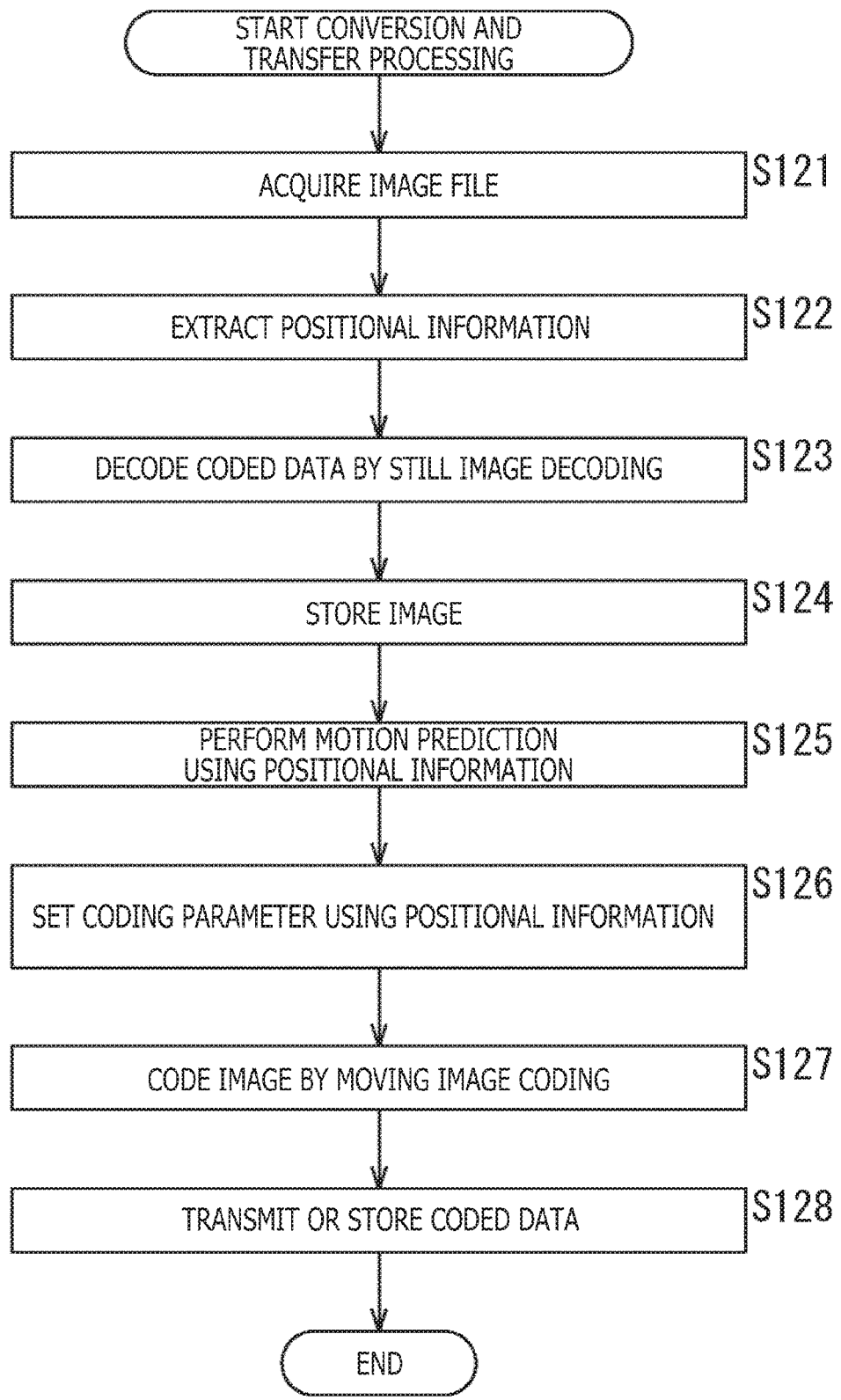
FIG. 8 is a flowchart illustrating an example of a procedure of transformation and transfer processing.

When the flying (image capturing) of the flying object 101 ends and the flying object 101 is communicatively connected to the ground station 102, the ground station 102 executes transformation and transfer processing. An example of a procedure of the transformation and transfer processing executed by the ground station 102 will be described with reference to a flowchart in FIG. 8.

When the transformation and transfer processing is started, in step S121, the reception section 201 acquires an image file transmitted from the flying object 101 (transmission section 159).

In step S122, the separation section 202 extracts positional information from the image file acquired in step S121 to separate the positional information from the still image coded data.

In step S123, the decoding section 203 decodes the still image coded data separated from the positional information in step S122 to restore a captured image.

In step S124, the frame memory 211 stores the captured image (image data) restored in step S123.

In step S125, the motion prediction section 212 performs motion prediction using the positional information extracted in step S122 and the captured image stored in step S124, to generate motion vectors.

In step S126, the coding section 213 uses the positional information extracted in step S122 to set the coding parameter.

In step S127, the coding section 213 uses the motion vectors generated in step S125 and the coding parameter set in step S126 to code the captured image stored in step S124 in accordance with the moving image coding scheme, for example, MPEG, AVC, HEVC, or the like, thus generating moving image coded data.

In step S128, the transmission section 205 transmits, to the cloud 103, the moving image coded data generated in step S127. Alternatively, the storage section 206 may store the moving image coded data generated in step S127.

When the processing in step S128 ends, the transformation and transfer processing ends.

Executing each step of processing as described above allows a decrease in coding efficiency to be suppressed.

<Example of Moving Image Coding Section>

An optional moving image coding scheme is used for the coding performed by the moving image coding section 204 of the ground station 102. The moving image coding scheme may be, for example, MPEG, AVC, HEVC, or the like. FIG. 9 is a block diagram illustrating a main configuration example of the moving image coding section 204 in a case where the captured image is coded using a coding scheme complying with HEVC.

In this case, the moving image coding section 204 includes a control section 301, a sort buffer 311, a calculation section 312, an orthogonal transform section 313, a quantization section 314, a coding section 315, a store buffer 316, a dequantization section 317, an inverse orthogonal transform section 318, a calculation section 319, an in-loop filter section 320, a frame memory 321, a prediction section 322, and a rate control section 323.

The frame memory 211 in FIG. 5 corresponds to the sort buffer 311 in FIG. 9. Additionally, the motion prediction section 212 in FIG. 5 corresponds to the control section 301 and the prediction section 322 in FIG. 9. Additionally, the coding section 213 in FIG. 5 corresponds to each processing section in FIG. 9 (processing sections from the control section 301 to the rate control section 323).

The control section 301 executes processing related to control of coding by the moving image coding section 204. For example, the control section 301 sets the coding parameter to be fed to each block (each processing section) on the basis of RDO (Rate-Distortion Optimization). Additionally, the control section 301 feeds the set coding parameter to each processing section of the moving image coding section 204 (for example, the sort buffer 311, the orthogonal transform section 313, the quantization section 314, the coding section 315, the dequantization section 317, the inverse orthogonal transform section 318, the in-loop filter section 320, the prediction section 322, and the like) as appropriate to control processing executed in the processing section.

Additionally, the control section 301, for example, generates control information including the coding parameter (for example, a sequence parameter set, a picture parameter set, a slice header, and the like), and feeds the control information to the coding section 315, which then adds the control information to the coded data and transmits the coded data.

Additionally, the control section 301 controls sorting of frames of moving image data held by the sort buffer 311, and on the basis of a block size as an external or pre-specified processing unit, divides the moving image data held by the sort buffer 311 into blocks of processing units (CUs, PUs, transform blocks, or the like).

The sort buffer 311 acquires and holds (stores) input captured images as frame images of moving images. The order in which the sort buffer 311 thus acquires the captured images corresponds to the order of reproduction (order of display). On the basis of the control of the control section 301, the sort buffer 311 sorts the captured images (input images) in order of coding (in order of decoding) or divides the captured images into blocks corresponding to processing units. The sort buffer 311 feeds the processed captured images to the calculation section 312. Additionally, the sort buffer 311 feeds the captured images (original images) to the prediction section 322 and the in-loop filter section 320.

The calculation section 312 uses, as inputs, the captured images corresponding to blocks of processing units and prediction images fed from the prediction section 322 and corresponding to the blocks, subtracts, from each captured image, the corresponding prediction image to generate a prediction residual, and feeds the prediction residual to the orthogonal transform section 313.

On the basis of the coding parameter fed from the control section 301, the orthogonal transform section 313 performs orthogonal transform on the prediction residual fed from the calculation section 312 to generate a transformation coefficient. The orthogonal transform section 313 feeds the generated transformation coefficient to the quantization section 314.

On the basis of transformation information fed from the control section 301, the quantization section 314 scales (quantizes) the transformation coefficient fed from the orthogonal transform section 313. Note that the rate of the quantization is controlled by the rate control section 323. The quantization section 314 feeds the coding section 315 and the dequantization section 317 with the transformation coefficient resulting from the quantization as described above (also referred to as a quantized transformation coefficient).

The coding section 315 performs variable length coding (for example, arithmetic coding) on the quantized transformation coefficient fed from the quantization section 314 to generate a bit sequence (coded data). Additionally, the coding section 315 generates a coding parameter from the quantized transformation coefficient and codes the coding parameter to generate a bit sequence. Furthermore, coding section 315 codes information related to a filter, fed from the in-loop filter section 320, information related to the prediction mode, fed from the prediction section 322, or other information to generate a bit sequence. Additionally, the coding section 315 codes various coding parameters fed from the control section 301 to generate a bit sequence. Furthermore, the coding section 315 multiplexes the bit sequences of various pieces of information generated as described above to generate coded data. The coding section 315 feeds the coded data to the store buffer 316.

The store buffer 316 temporarily holds the coded data obtained by the coding section 315. At a predetermined timing, the store buffer 316 outputs the held coded data to a section (for example, the transmission section 205 or the store section 206) outside the moving image coding section 204, for example, as a bit stream or the like.

On the basis of the coding parameters fed from the control section 301, the dequantization section 317 scales (dequantizes) the value of the quantized transformation coefficient fed from the quantization section 314. Note that the dequantization is processing opposite to the quantization performed in the quantization section 314 and similar to dequantization performed by a decoding-side dequantization section (described below). In other words, description (below) of the decoding-side dequantization section can be applied to description of the dequantization section 317. The dequantization section 317 feeds the inverse orthogonal transform section 318 with the transformation coefficient resulting from the dequantization as described above.

On the basis of the coding parameters fed from the control section 301, the inverse orthogonal transform section 318 performs inverse orthogonal transform on the transformation coefficient fed from the dequantization section 317 to generate a prediction residual. Note that the inverse orthogonal transform is processing opposite to the orthogonal transform performed in the orthogonal transform section 313 and similar to inverse orthogonal transform performed by a decoding-side inverse orthogonal transform section (described below). In other words, description (below) of the decoding-side inverse orthogonal transform section can be applied to description of the inverse orthogonal transform section 318.

The calculation section 319 adds the prediction residual fed from the inverse orthogonal transform section 318 and the prediction image corresponding to the prediction residual, fed from the prediction section 322, to generate a local decoded image. The calculation section 319 feeds the generated local decoded image to the in-loop filter section 320 and the frame memory 321.

On the basis of the coding parameters fed from the control section 301 and the like, the in-loop filter section 320 executes filter processing as appropriate on the local decoded image fed from the calculation section 319. Note that the filter processing executed by the in-loop filter section 320 is optional. For example, deblocking filter (DBF), an adaptive offset filter (SAO (Sample Adaptive Offset)), or the like may be performed. Among these, a plurality of types of filter processing may be executed.

The in-loop filter section 320 feeds the filtered local decoded image to the frame memory 321. Note that, in a case of transmitting information related to the filter, for example, a filter coefficient or the like, the in-loop filter section 320 feeds the coding section 315 with the information related to the filter.

The frame memory 321 holds (stores) the local decoded image fed from the calculation section 319 and the filtered local decoded image fed from the in-loop filter section 320. Additionally, the frame memory 321 uses the local decoded images to reconstruct decoded images in picture units, and holds the resultant decoded images (stores the decoded images in a buffer in the frame memory 321). In response to a request from the prediction section 322, the frame memory 321 feeds the decoded images (or some of the decoded images) to the prediction section 322.

The prediction section 322 uses the coding parameters fed from the control section 301 and the input images (original images) fed from the sort buffer 311 to execute prediction processing such as inter-prediction or intra-prediction. The prediction section 322 performs prediction by referencing the decoded images as reference images, and on the basis of prediction results, executes motion compensation processing to generate a prediction image. The prediction section 322 feeds the generated prediction image to the calculation section 312 and the calculation section 319. Additionally, the prediction section 322 feeds information related to a prediction mode selected by the above-described processing, that is, information related to the optimum prediction mode, to the coding section 315 as necessary.

On the basis of the code amount of coded data stored in the store buffer 316, the rate control section 323 controls the quantization operation of the quantization section 314 in such a manner as to prevent overflow or underflow.

In the moving image coding section 204 configured as described above, the control section 301 acquires the positional information fed from the separation section 202, and on the basis of the positional information, sets the motion vectors and coding parameters. The processing sections (from the sort buffer 311 to the rate control section 323) of the moving image coding section 204 use the thus set motion vectors and coding parameters to perform coding. In other words, the moving image coding section 204 utilizes the positional information to code the captured images.

Accordingly, the moving image coding section 204 can suppress a decrease in coding efficiency as described above.

<Procedure of Moving Image Coding Processing>

With reference to a flowchart in FIG. 10, an example of a procedure of moving image coding processing will be described, the moving image coding processing executed by the moving image coding section 204 when the coding as described above is performed.

When moving image coding processing is started, in step S141, the sort buffer 311 acquires and accumulates image data of captured images fed from the decoding section 203.

In step S142, the control section 301 executes processing related to coding control. For example, the control section 301 performs control related to motion prediction and setting of the coding parameter on the basis of the positional information fed from the separation section 202.

In step S143, under the control of the control section 301, the sort buffer 311 sorts the frames (captured image group) of the input moving image data such that the arrangement of frames changes from the order of display to the order of coding.

In step S144, under the control of the control section 301, the prediction section 322 executes prediction processing to generate a prediction image in the optimum prediction mode or the like. For example, in this prediction processing, the prediction section 322 performs intra-prediction to generate a prediction image in an optimum intra-prediction mode or the like, performs inter-prediction to generate a prediction image in an optimum inter-prediction mode or the like, and selects any of the optimum prediction modes on the basis of a cost function value or the like. For example, the prediction section 322 uses, in the inter-prediction, the reference frames and motion vectors set by the control section 301.

In step S145, the calculation section 312 calculates a difference between the input image and the prediction image in the optimum mode selected by the prediction processing in step S144. In other words, the calculation section 312 generates a prediction residual between the input image and the prediction image. The thus determined prediction residual has a reduced data amount compared to the original image data. Accordingly, compared to the direct coding of images, the above-described processing allows the data amount to be compressed.

In step S146, the orthogonal transform section 313 executes orthogonal transform processing on the prediction residual generated by the processing in step S145, generating a transformation coefficient.

In step S147, the quantization section 314, for example, uses the coding parameter set in step S142 to quantize the transformation coefficient generated by the processing in step S146, thus generating a quantization transformation coefficient.

In step S148, on the basis of a property corresponding to the property of the quantization in step S147, the dequantization section 317 dequantize the dequantization transformation coefficient generated by the processing in step S147, to generate a transformation coefficient.

In step S149, the inverse orthogonal transform section 318 uses a method corresponding to the orthogonal transform processing in step S146 to inversely orthogonally transform the transformation coefficient generated by the processing in step S148, generating residual data.

In step S150, the calculation section 319 adds the prediction image generated by the prediction processing in step S144 to the prediction residual generated by the processing in step S149, to generate a locally decoded decoded image.

In step S151, the in-loop filter section 320 executes in-loop filter processing on the locally decoded decoded image generated by the processing in step S150.

In step S152, the frame memory 321 stores the locally decoded image derived by the processing in step S150 and the locally decoded image filtered in step S151.

In step S153, the coding section 315 codes the quantization transformation coefficient resulting from the processing in step S147. For example, the coding section 315 codes, by arithmetic coding or the like, the quantization transformation coefficient, including information related to the image, to generate coded data. Additionally, at this time, the coding section 315 codes the various coding parameters. Furthermore, the coding section 315 generates a coding parameter from the quantization transformation coefficient and codes the coding parameter.

In step S154, the store buffer 316 stores and outputs the thus generated coded data to a section (transmission section 205 or store section 206) outside the moving image coding section 204, for example, as a bit stream.

When the processing in step S154 ends, the moving image coding processing ends.

The moving image coding processing executed as described above allows the captured images to be coded using the positional information. Accordingly, a decrease in coding efficiency can be suppressed.

<Configuration of Cloud>

Now, the decoding side will be described. Moving image coded data generated by the ground station 102 is transferred to the cloud 103, which then decodes the moving image coded data. A hardware configuration of the cloud 103 is optional. For example, the cloud 103 may include a single information processing apparatus or a plurality of information processing apparatuses.

Figure 11:
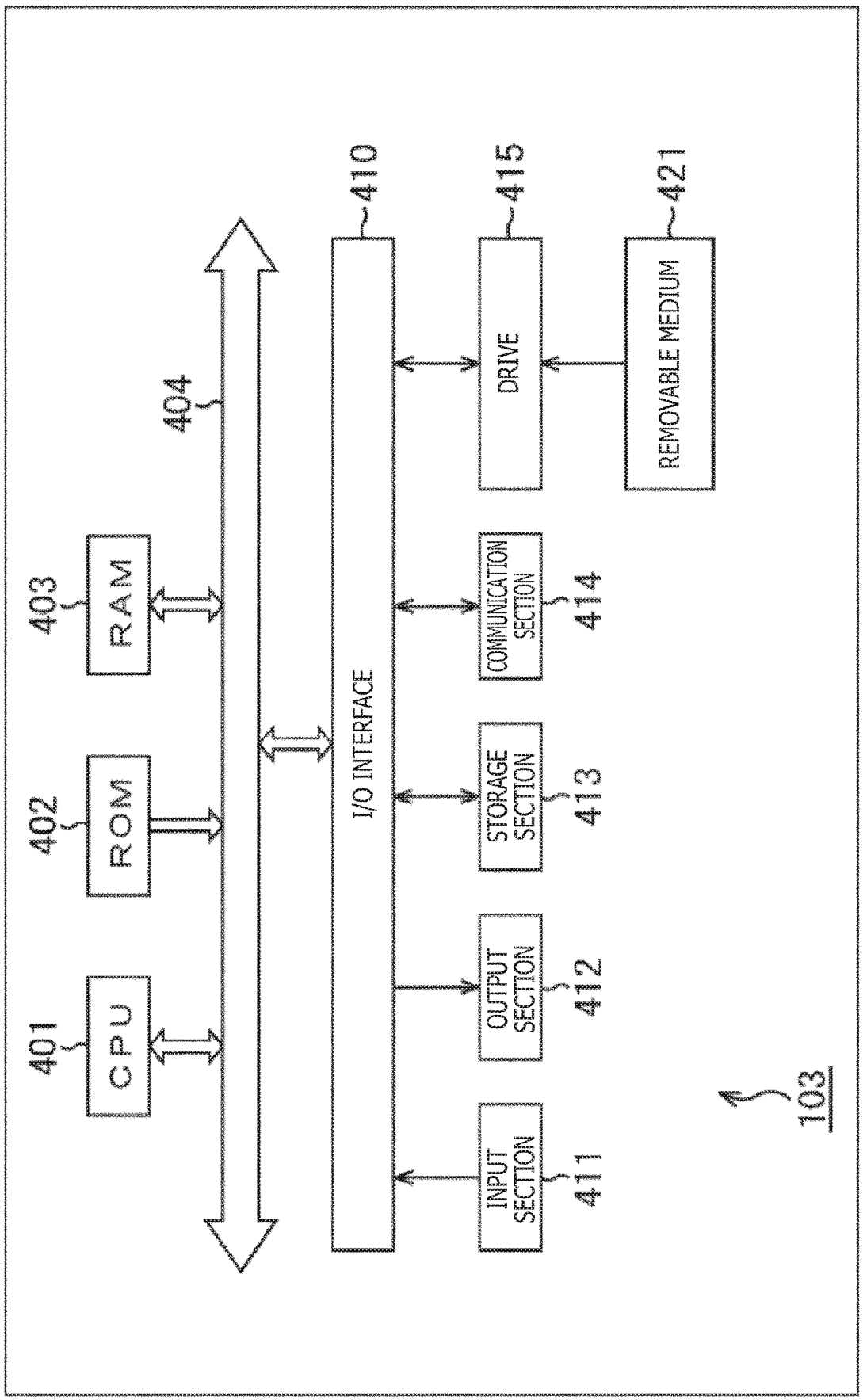
FIG. 11 is a block diagram illustrating a main configuration example in a case where a cloud is expressed as an information processing apparatus.

FIG. 11 is a block diagram illustrating a main configuration example in a case where the cloud 103 includes, for example, one computer.

As illustrated in FIG. 11, the cloud 103 includes a CPU 401, a ROM 402, a RAM 403, a bus 404, an I/O (Input/Output) interface 410, an input section 411, an output section 412, a storage section 413, a communication section 414, and a drive 415.

The CPU 401, the ROM 402, and the RAM 403 are connected together via the bus 404. The bus 404 also connects to the I/O interface 410. The I/O interface 410 connects to the input section 411, the output section 412, the storage section 413, the communication section 414, and the drive 415.

The input section 411 includes an optional input device receiving external information such as user inputs. For example, the input section 411 may include one or more of an operation button, a touch panel, a camera, a microphone, and an input terminal. Additionally, for example, the input section 411 may include one or more optional sensors such as an optical sensor and a temperature sensor. Of course, the input section 411 may include any other input device.

The output section 412 includes an optional output device outputting information such as images and sounds. For example, the output section 412 may include any one of a display, a speaker, and an output terminal. Of course, the output section 412 may include any other output device.

The storage section 413 includes an optional storage medium storing information such as programs or data. For example, the storage section 413 may include any one of a hard disk, a RAM disk, or a nonvolatile memory. Of course, the storage section 413 may include any other storage medium.

The communication section 414 includes an optional communication device performing communication to transmit and receive information such as programs or data to and from an external apparatus via a predetermined communication medium (for example, an optional network such as the Internet). The communication section 414 may include, for example, an optional network interface. For example, the communication section 414 communicates with (transmits and receives programs or data to and from) any other apparatus. Note that the communication section 414 may include a wired communication function, a wireless communication function, or both.

The drive 415 reads information stored in a removable medium 421 installed in the drive 415 and writes information to the removable medium 421 installed in the drive 415. The drive 415 can, for example, read information from the removable medium 421 and feed the read information to the CPU 401, the RAM 403, and the like. Additionally, in a case where the removable medium 421, which is writable, is installed in the drive 415, the drive 415 can cause information (programs, data, or the like) fed from the CPU 401, the RAM 403, or the like to be stored in the removable medium 421. The removable medium 421 is a recording medium that can be installed in and removed from the drive 415. For example, the removable medium 421 may be a magnetic disk, an optical disk, a magneto-optical disk, a semiconductor memory, or the like.

The CPU 401 loads, into the RAM 403, programs and the like stored in the ROM 402 and the storage section 413, and executes the programs to execute various types of processing. The RAM 403 also stores, as appropriate, data required for the CPU 401 to execute various type of processing.

By executing programs or the like as described above, the CPU 401 can execute processing related to decoding of moving image coded data.

<Configuration of Moving Image Decoding Section>

Figure 12:
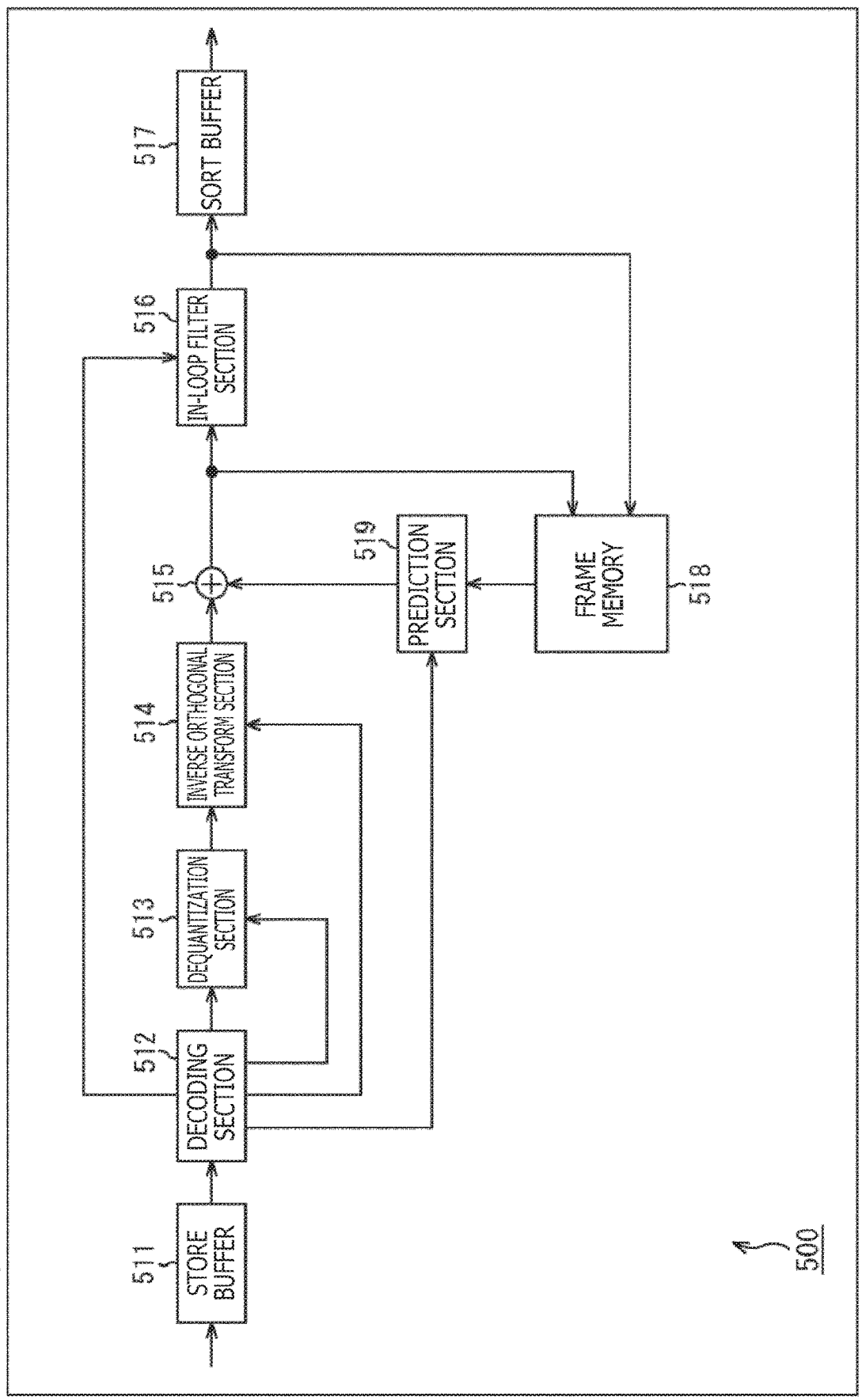
FIG. 12 is a block diagram illustrating a main configuration example of a moving image coding section implemented by the cloud.

For example, the CPU 401 implements the functions of a moving image decoding section configured as illustrated in FIG. 12. A moving image decoding section 500 illustrated in FIG. 12 is a processing section decoding moving image coded data generated by the moving image coding section 204 in FIG. 9, and decodes the moving image coded data using a decoding scheme corresponding to the coding scheme of the moving image coding section 204 in FIG. 9, that is, the coding scheme complying with HEVC.

In FIG. 12, the moving image decoding section 500 includes a store buffer 511, a decoding section 512, a dequantization section 513, an inverse orthogonal transform section 514, a calculation section 515, an in-loop filter section 516, a sort buffer 517, a frame memory 518, and a prediction section 519. Note that the prediction section 519 includes an intra-prediction section and an inter-prediction section that are not illustrated.

The store buffer 511 acquires and holds (stores) a bit stream (moving image coded data) input to the moving image decoding section 500. At a predetermined timing, in a case where a predetermined condition is met, or the like, the store buffer 511 feeds the stored bit stream to the decoding section 512.

In accordance with a definition of syntax table, the decoding section 512 variable-length-decodes a syntax value of each syntax element included in the bit stream fed from the store buffer 511, and parses (analyzes and acquires) the resultant syntax value to generate a decoding parameter. The decoding section 512 feeds, as appropriate, the generated decoding parameter to the processing sections (for example, the dequantization section 513, the inverse orthogonal transform section 514, the in-loop filter section 516, the prediction section 519, and the like) of the moving image coding section 500.

Additionally, the decoding section 512 decodes the moving image coded data to generate a quantization transformation coefficient for each transformation block. The decoding section 512 feeds the quantization transformation coefficient to the dequantization section 513.

On the basis of the decoding parameter fed from the decoding section 512, the dequantization section 513 scales (dequantizes) the value of the quantization transformation coefficient fed from the decoding section 512 to generate a transformation coefficient resulting from dequantization. Note that the dequantization is performed as opposite processing of the quantization by the quantization section 314. In other words, the dequantization is processing similar to the dequantization by the dequantization section 317. The dequantization section 513 feeds the generated transformation coefficient to the inverse orthogonal transform section 514.

On the basis of the decoding parameter fed from the decoding section 512, the inverse orthogonal transform section 514 executes inverse orthogonal transform processing on the transformation coefficient fed from the dequantization section 513 to generate residual data. Note that the inverse orthogonal transform is performed as opposite processing of the orthogonal transform by the orthogonal transform section 313. In other words, the dequantization is processing similar to the inverse orthogonal transform by the inverse orthogonal transform section 318. The inverse orthogonal transform section 514 feeds the generated residual data to the calculation section 515.

The calculation section 515 adds together the residual data fed from the inverse orthogonal transform section 514 and the prediction image fed from the prediction section 519 to generate local decoded images. The calculation section 515 feeds the generated local decoded images to the in-loop filter section 516 and the frame memory 518.

On the basis of the decoding parameter fed from the decoding section 512, the in-loop filter section 516 executes filter processing as appropriate on the local decoded images fed from the calculation section 515. Note that the filter processing executed by the in-loop filter section 516 is optional. For example, deblocking filter (DBF), an adaptive offset filter (SAO (Sample Adaptive Offset)), or the like may be performed. Among these, a plurality of types of filter processing may be executed. The in-loop filter section 516 feeds the filtered local decoded images to the sort buffer 517 and the frame memory 518.

The sort buffer 517 holds (stores) the local decoded images fed from the in-loop filter section 516. The sort buffer 517 uses the local decoded images to reconstruct decoded images in picture units and holds the resultant decoded images (stores the decoded images in a buffer). The sort buffer 517 sorts the obtained decoded images such that the arrangement of images changes from the order of decoding to the order of reproduction. The sort buffer 517 outputs the sorted decoded images to sections outside the moving image decoding section 500 as moving image data.

The frame memory 518 reconstructs the local decoded images fed from the calculation section 515 into decoded images in picture units, and stores the resultant decoded images in a buffer in the frame memory 518. Additionally, the frame memory 518 reconstructs the local decoded images subjected to the in-loop filter processing, fed from the in-loop filter section 516, into decoded images in picture units, and stores the resultant decoded images in the buffer in the frame memory 518. The frame memory 518 feeds the stored decoded images (or some of the decoded images) as appropriate to the prediction section 519 as reference images. Note that the frame memory 518 may store the decoding parameter related to generation of decoded images.

The prediction section 519 performs prediction using a prediction method specified by the decoding parameter fed from the decoding section 512 to generate the prediction image. At that time, the prediction section 519 utilizes, as reference images, unfiltered or filtered decoded images (or some of the decoded images) stored in the frame memory 518 and specified by the decoding parameter. The prediction section 519 feeds a generated prediction image to the calculation section 515.

In the moving image decoding section 500 configured as described above, the decoding section 512 extracts the decoding parameter (coding parameter) transmitted from the coding side and uses the decoding parameter to decode the moving image coded data. Additionally, the decoding section 512 feeds the decoding parameter to other processing sections (for example, the dequantization section 513, the inverse orthogonal transform section 514, the in-loop filter section 516, the prediction section 519, and the like), and the processing sections use the decoding parameter to perform the respective types of processing. That is, the moving image decoding section 500 performs the decoding using the decoding parameter. In other words, the moving image decoding section 500 can correctly decode the captured image group coded on the basis of the positional information. Accordingly, a decrease in coding efficiency can be suppressed.

<Procedure of Moving Image Decoding Processing>

Figure 13:
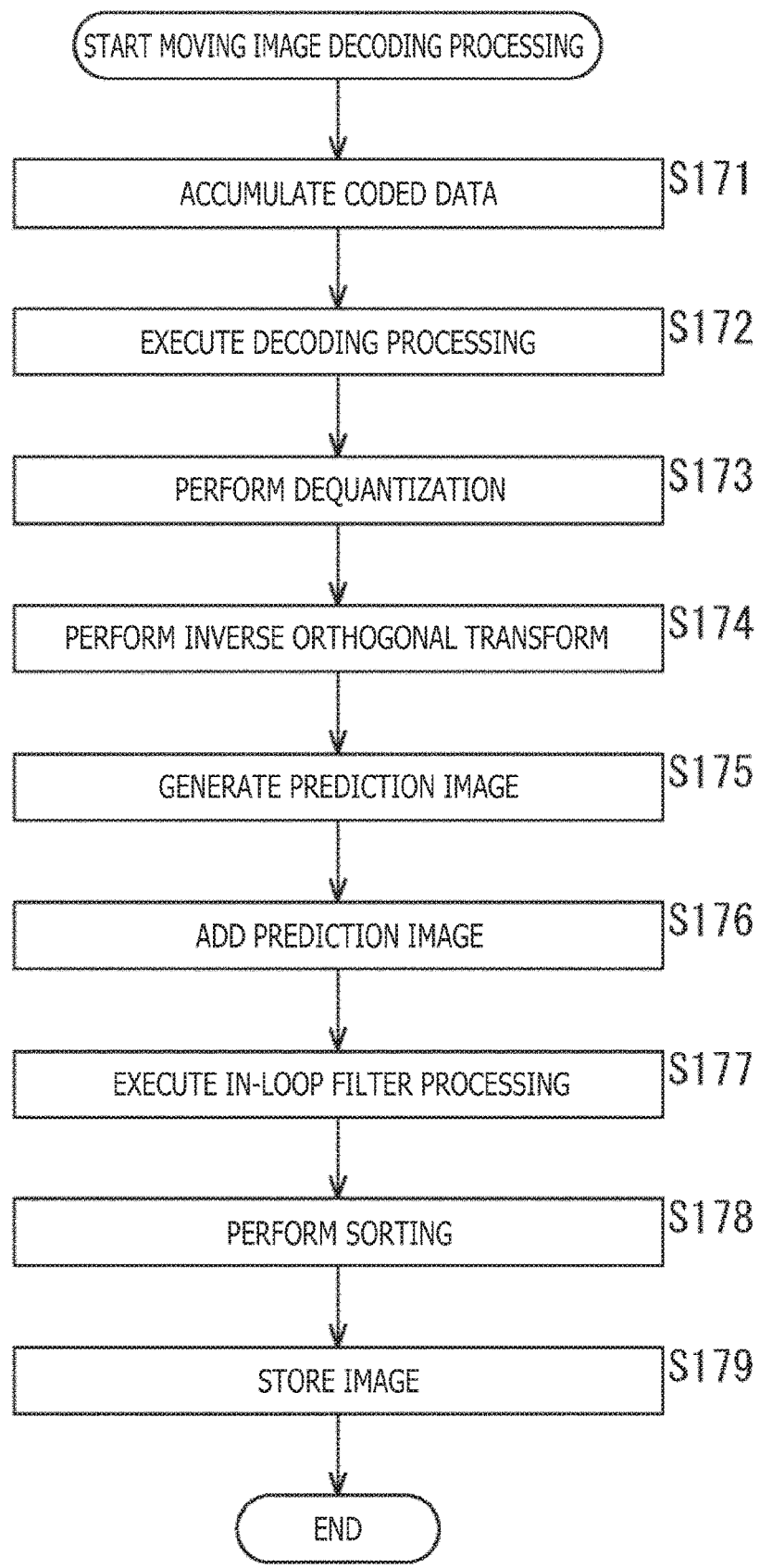
FIG. 13 is a flowchart illustrating a procedure of moving image decoding processing.

With reference to a flowchart in FIG. 13, an example of a procedure of moving image decoding processing will be described, the moving image decoding processing being executed by the moving image decoding section 500 when the decoding as described above is performed.

When the moving image decoding processing is started, in step S171, the store buffer 511 acquires and holds (accumulates) moving image coded data (bit stream) fed from a section outside the moving image decoding section 500.

In step S172, the decoding section 512 decodes the moving image coded data (bit stream) to generate a quantization transformation coefficient. Additionally, the decoding section 512 uses this decoding to parse (analyzes and acquires) various decoding parameters (coding parameters) from the coded data (bit stream).

In step S173, the dequantization section 513 performs dequantization corresponding to opposite processing of the quantization performed on the coding side, on the quantization transformation coefficient generated by the processing in step S172 to generate the transformation coefficient.

In step S174, the inverse orthogonal transform section 514 executes inverse orthogonal transform processing corresponding to opposite processing of the orthogonal transform processing executed on the coding side, on the transformation coefficient generated by the processing in step S173 to generate residual data.

In step S175, on the basis of the decoding parameters parsed in step S172, the prediction section 519 uses the prediction method specified by the coding side to execute prediction processing to generate prediction images.

In step S176, the calculation section 515 adds together the residual data generated by the processing in step S174 and the prediction images generated by the processing in step S175 to generate local decoded images.

In step S177, the in-loop filter section 516 executes in-loop filter processing on the local decoded images generated by the processing in step S176.

In step S178, the sort buffer 517 uses the local decoded images filtered by the processing in step S177 to generate decoded images and change the order of the group of decoded images from the order of decoding to the order of reproduction. The decoded image group sorted in the order of reproduction is output to sections outside the moving image decoding section 500 as moving images.

Additionally, in step S179, the frame memory 518 stores at least one of the set of the local decoded images generated by the processing in step S176 or the set of the local decoded images filtered by the processing in step S177.

When the processing in step S179 ends, the image decoding processing ends.

By executing the moving image decoding processing as described above, the moving image decoding section 500 can suppress a decrease in coding efficiency.

As described above, the present technique can also be applied to coding of captured images utilizing a coding scheme complying with HEVC and to decoding of coded data generated by the coding, utilizing a decoding scheme complying with HEVC. Of course, the present technique can be basically similarly applied to any other coding and decoding schemes, for example, AVC, MPEG, and the like.

<Method #1-1>

Now, a method #1-1 will be described. As described above with reference to FIG. 1, when a captured image is coded by the moving image coding scheme, a reference frame may be set on the basis of the positional information (method #1-1).

The flying object 101 captures images of the subject area 110, and thus, in general, captured images of closer positions have a higher correlation. Accordingly, the moving image coding section 204 uses a frame order (order of reproduction) as the order of image capturing of the captured images, even captured images with distant frame numbers may correspond to close positions and have a high correlation.

Figure 14:
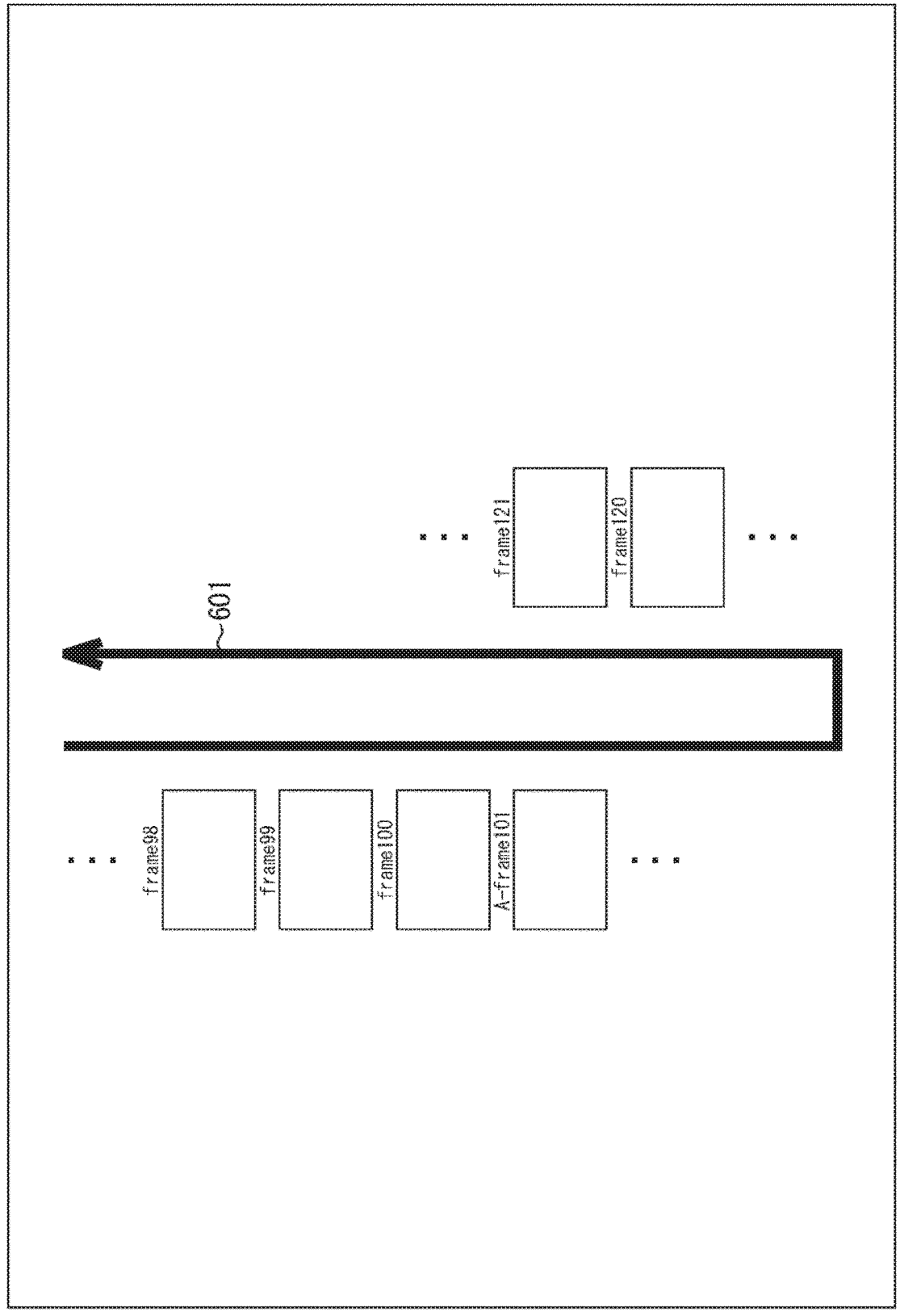
FIG. 14 is a diagram illustrating a method #1-1.

For example, it is assumed that, as in an example illustrated in FIG. 14, the flying object 101 captures images while moving as indicated by arrows, obtaining frame images as . . . , frame number 98 (frame98) to frame number 101 (frame101), . . . , frame number 120 (frame120), frame number 121 (frame121), . . . . In this case, a captured image with the frame number 121 is close not only to the frame number 120 but also to the frame number 101 and has a high correlation with these frame numbers.

Thus, on the basis of the positional information regarding each captured image, in a case of setting the frame number 121 as a current frame (processing target), the moving image coding section 204 selects not only the frame number 120 but also the frame number 101 as reference destinations (reference frames).

Figure 15:
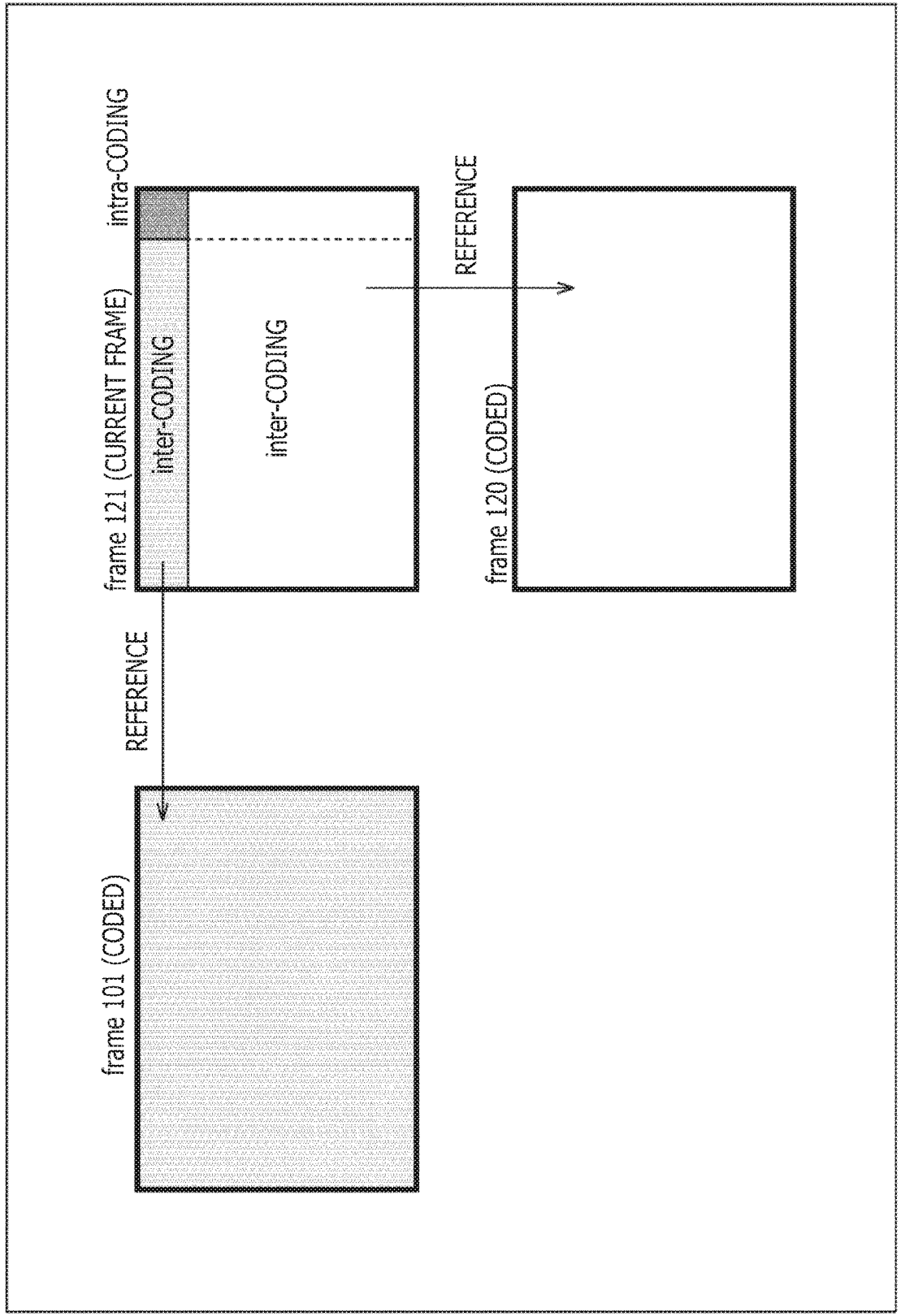
FIG. 15 is a diagram illustrating the method #1-1.

For example, as illustrated in FIG. 15, a partial region of the captured image with the frame number 121 which area is depicted in blank overlaps the captured image with the frame number 120 and has a high correlation with the captured image with the frame number 120. Thus, the partial region is inter-coded using the frame number 120 as a reference frame.

Additionally, in the example in FIG. 15, a partial region of the captured image with the frame number 121 which region is located on the left of a dotted line overlaps the captured image with the frame number 101 and has a high correlation with the captured image with the frame number 101. Thus, a part of the partial region for which the frame number 120 is not used as a reference frame, that is, a partial region of the captured image with the frame number 121 which region is depicted in light gray, is inter-coded using the frame number 101 as a reference frame.

Note that partial regions having a low correlation with the above-described frames (partial regions depicted in dark gray in FIG. 15) are intra-coded.

In other words, frames are sequentially set as a reference destination in order of decreasing area of a region overlapping the current frame. With the reference frame thus set (selected) on the basis of the positional information, inter-coding can be performed using, as a reference frame, a frame having a higher correlation with the current frame than in a case where, for example, the entire captured image with the frame number 121 is inter-coded using the frame number 120 as a reference frame. Accordingly, a decrease in coding efficiency can be suppressed.

Additionally, for example, a larger region can be inter-coded than in a case where the blank partial region with the frame number 121 is inter-coded using the frame number 120 as a reference frame, with the other partial region intra-coded. Thus, a decrease in coding efficiency can be suppressed.

In the example in FIG. 5, the motion prediction section 212 sets the reference frame on the basis of the positional information. For example, when performing motion prediction in step S125 (FIG. 8), the motion prediction section 212 executes reference frame selection processing to set the reference frame on the basis of the positional information as described above.

<Procedure of Reference Frame Selection Processing>

Figure 16:
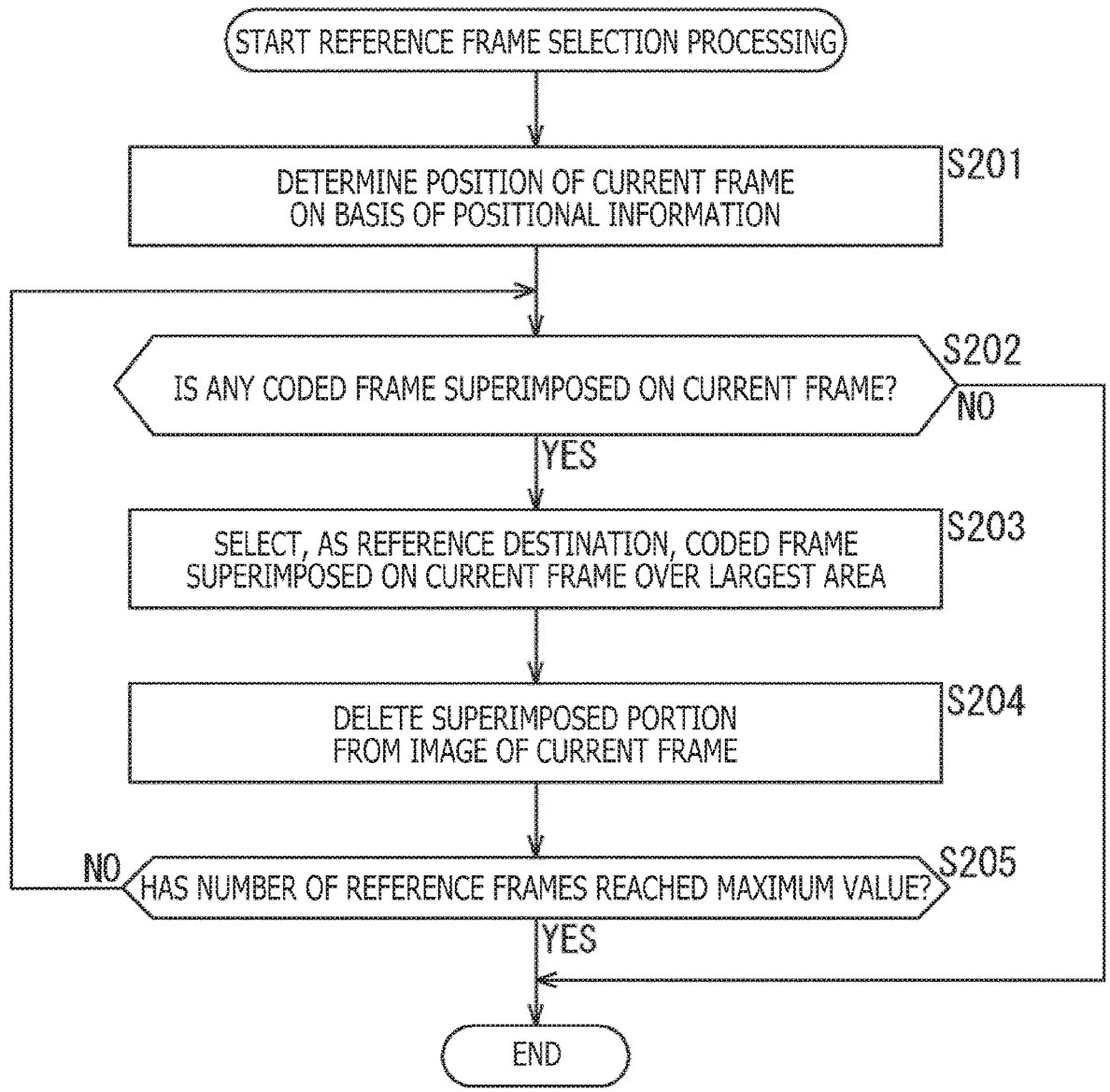
FIG. 16 is a flowchart illustrating an example of a procedure of reference frame selection processing.

An example of a procedure of reference frame selection processing will be described with respect to a flowchart in FIG. 16. When the reference frame selection processing is started, in step S201, the motion prediction section 212 determines the position of the current frame on the basis of the positional information.

In step S202, on the basis of the positional information, the motion prediction section 212 determines whether any coded frame includes a captured image overlapping the current frame or not. In a case where the motion prediction section 212 determines that a certain coded frame includes a captured image overlapping the current frame, the processing proceeds to step S203.

In step S203, the motion prediction section 212 selects, as a reference destination, a coded frame with the largest area overlapping the current frame.

In step S204, for setting of the next reference frame, the motion prediction section 212 deletes the overlapping portion from the captured image of the current frame.

In step S205, the motion prediction section 212 determines whether or not the number of set reference frames has reached the maximum number. The maximum value of the number of reference frames is optional. For example, two frames or any other number of frames may be used. In a case where the number of reference frames is determined not to have reached the maximum value, the processing returns to step S202.

In a case where any coded frame overlaps the current frame, the processing from step S202 to step S205 is repeated as described above until the number of reference frames reaches the maximum value. In step S205, in a case where the number of reference frames is determined to have reached the maximum value, the reference frame selection processing ends.

Additionally, in step S202, in a case where no coded frame is determined to overlap the current frame, the reference frame selection processing ends.

The partial region of the current frame for which the reference frame is set is inter-coded using the reference frame. Additionally, the partial region of the current frame for which no reference frame is set is intra-coded.

By executing the reference frame selection processing as described above, the moving image coding section 204 can set a coded frame with a higher correlation as a reference destination, allowing a decrease in coding efficiency to be suppressed, on the basis of the positional information.

Figure 10:
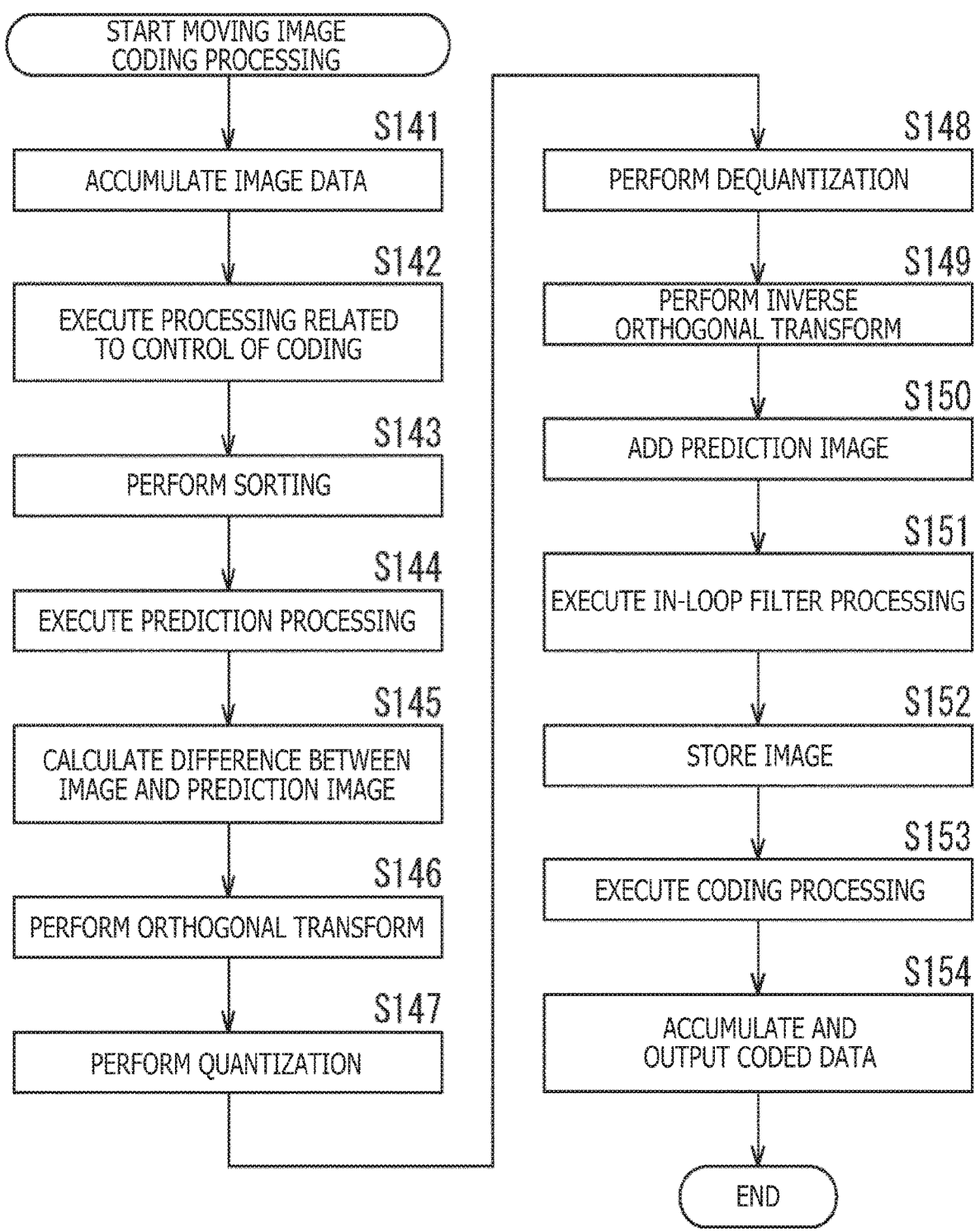
FIG. 10 is a flowchart illustrating an example of a procedure of moving image coding processing.

Note that, for example, in a case of FIG. 9 and FIG. 10, the control section 301 executes, in step S142, the above-described reference frame selection processing, and on the basis of the positional information, sets reference frames in order of decreasing area overlapping the current frame. In step S144, the prediction section 322 uses the reference frames set as described above to perform inter-prediction or intra-prediction.

Accordingly, also in this case, a decrease in coding efficiency can be suppressed.

<Method #1-2>

Now, a method #1-2 will be described. As described with reference to FIG. 1, when captured images are coded in accordance with the moving image coding scheme, motion vectors may be computed on the basis of the positional information (method #1-2).

This is because the flying object captures images while in motion as described above, movement between captured images has a high correlation with the movement of the flying object (including movement of the camera and the like). In other words, when computed with the positional information (moving distance of the flying object) taken into account, motion vectors can be more efficiently computed. For example, large motion vectors lead to an increased search range and an increased computation cost for ME, but the search range can be reduced by providing approximate values. Additionally, fluctuation (variation) of the vectors can be reduced. Thus, the approximate value for the motion vectors can be determined using the positional information.

<Method Using No Pseudo Height Information>

Figure 17:
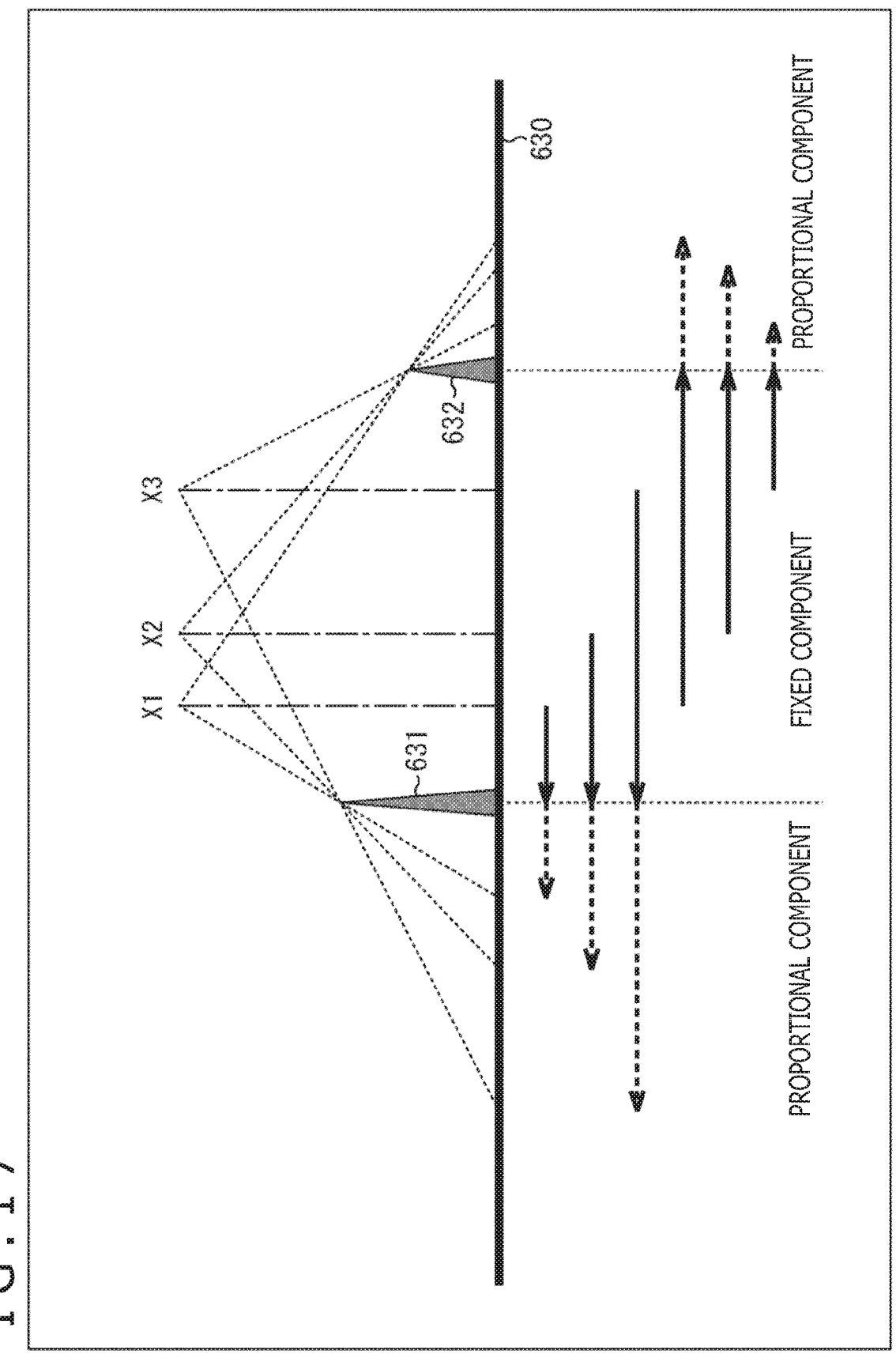
FIG. 17 is a diagram illustrating a method #1-2.

For example, it is assumed that, as illustrated in FIG. 17, three-dimensional structures such as a tree 631 and a tree 632 are present on a ground 630. With the heights of the trees not taken into account, the moving distance of the flying object 101 can be computed using past positional information (GPS information, IMU information, image capturing control information, and the like) and the current positional information (GPS information, IMU information, image capturing control information, and the like). A candidate for the motion vector (fixed component) is determined from the moving distance, and refinement is performed around the candidate, allowing the motion vector to be efficiently determined.

In a case of the example in FIG. 5, the motion prediction section 212 computes motion vectors on the basis of the positional information. For example, when performing motion prediction in step S125 (FIG. 8), the motion prediction section 212 executes motion vector computation processing to compute the motion vectors on the basis of the positional information as described above.

<Procedure of Motion Vector Computation Processing>

An example of a procedure of the motion vector computation processing will be described with reference to a flowchart in FIG. 18. When the motion vector computation processing is started, in step S221, the motion prediction section 212 determines the moving distance of the flying object 101 from the positional information and past motion prediction results.

In step S222, on the basis of the moving distance, the motion prediction section 212 determines a candidate for the motion vector (approximate value).

In step S223, the motion prediction section 212 performs refinement based on block matching around the candidate for the motion vector, to set the motion vector.

When the processing in step S223 ends, the motion vector computation processing ends.

By executing the motion vector computation processing as described above, the moving image coding section 204 can more efficiently compute the motion vectors on the basis of the positional information, allowing suppression of an increase in coding loads and a decrease in coding efficiency.

Figure 18:
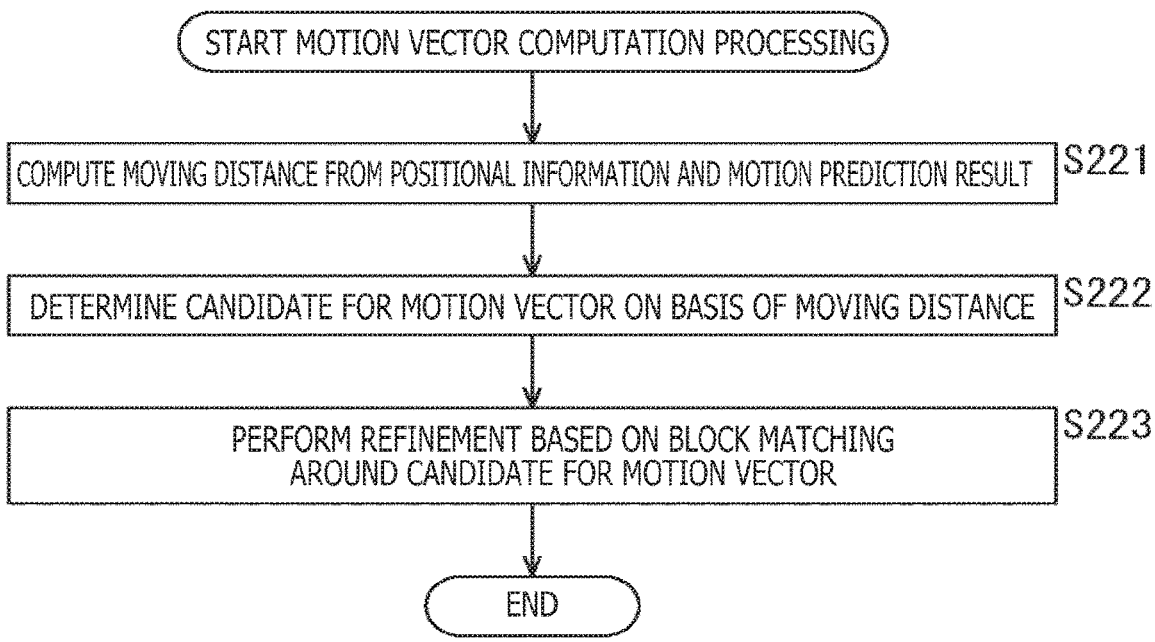
FIG. 18 is a flowchart illustrating an example of a procedure of motion vector computation processing.

Note that, for example, in a case of FIG. 9 and FIG. 10, the control section 301 executes, in step S142, the processing in step S221 and step S222 of the above-described motion vector computation processing (FIG. 18) and that the prediction section 322 executes, in step S144, the processing in step S223 of the above-described motion vector computation processing (FIG. 18). Accordingly, also in this case, an increase in coding loads and a decrease in coding efficiency can be suppressed.

<Method Using Pseudo Height Information>

For example, in a case where, in the example in FIG. 17, the heights of the tree 631 and the tree 632 are taken into account, components (proportional components) other than the motion vector (fixed component) can be computed from a plurality of past frames. The proportional components represent pseudo height information and are used to compute the current proportional component, and the current proportional component is added to the fixed component to determine an approximate value for the motion vector. Refinement is performed around the approximate value to allow the motion vector to be efficiently determined.

In a case of the example in FIG. 5, the motion prediction section 212 computes motion vectors on the basis of the positional information. For example, when performing motion prediction in step S125 (FIG. 8), the motion prediction section 212 executes the motion vector computation processing to compute the motion vectors on the basis of the positional information as described above.

<Procedure of Motion Vector Computation Processing>

An example of a procedure of the motion vector computation processing will be described with reference to a flowchart in FIG. 19. When the motion vector computation processing is started, in step S241, the motion prediction section 212 determines the moving distance (fixed component) of the flying object 101 from the positional information and the past motion prediction results.

In step S242, on the basis of the moving distance, the motion prediction section 212 acquires a coefficient for corresponding pseudo height information (proportional component).

In step S243, the motion prediction section 212 determines a candidate (approximate value) for the motion vector on the basis of the moving distance (fixed component) and the pseudo height information (proportional component).

In step S244, the motion prediction section 212 performs refinement based on block matching around the candidate for the motion vector, to set the motion vector.

When the processing in step S244 ends, the motion vector computation processing ends.

By executing the motion vector computation processing as described above, the moving image coding section 204 can more efficiently compute the motion vectors on the basis of the positional information, allowing suppression of an increase in coding loads and a decrease in coding efficiency.

Figure 19:
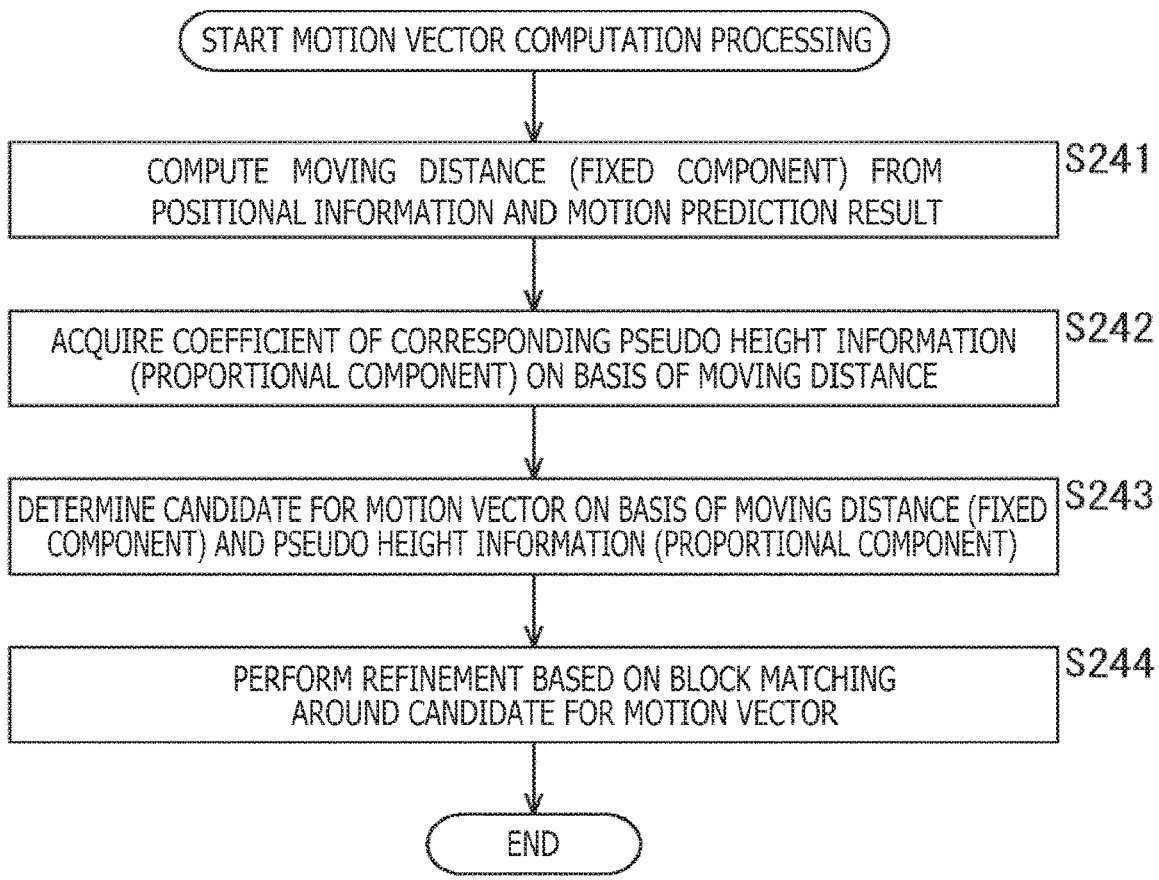
FIG. 19 is a flowchart illustrating another example of the procedure of the motion vector computation processing.

Note that, for example, in a case of FIG. 9 and FIG. 10, the control section 301 executes, in step S142, the processing from step S241 to step S243 of the above-described motion vector computation processing (FIG. 19) and that the prediction section 322 executes, in step S144, the processing in step S244 of the above-described motion vector computation processing (FIG. 19). Accordingly, also in this case, an increase in coding loads and a decrease in coding efficiency can be suppressed.

<Method #1-3>

As described with reference to FIG. 1, the coding parameters used for coding may be determined on the basis of the positional information. For example, as in a method #1-3, a GOP structure may be set on the basis of the positional information.

As described above, the flying object 101 captures images while in motion, and thus the correlation between captured images depends on the movement of the flying object (including the movement of the camera and the like). In other words, the appropriate GOP structure may be varied according to the movement (moving distance) of the flying object 101.

Figure 20:
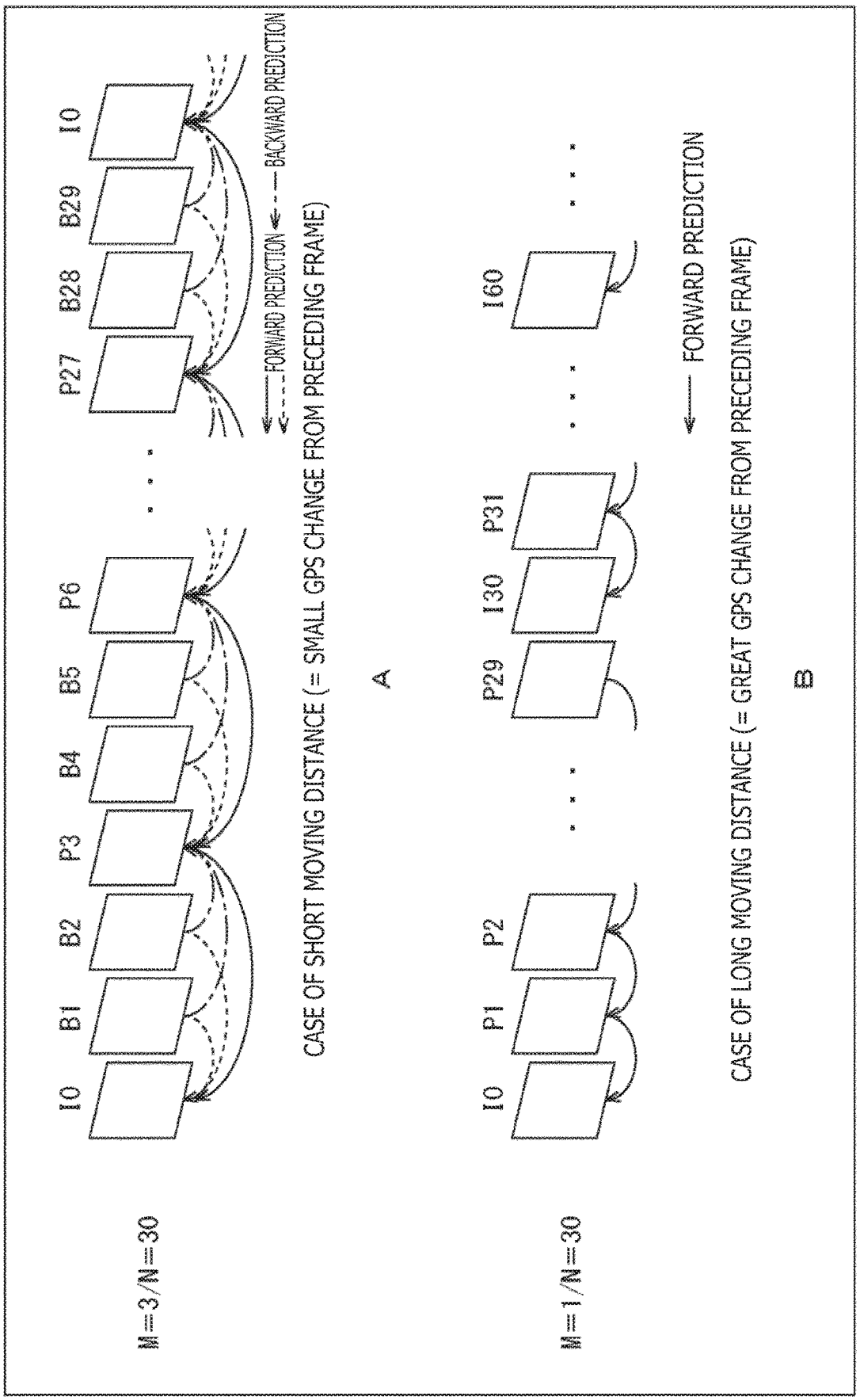
FIG. 20 is a diagram illustrating a method #1-3.

For example, less significant movement of the flying object leads to a higher correlation between captured images, and thus a GOP structure using forward prediction and backward prediction as illustrated in A of FIG. 20 enables utilization of high correlation between frames, allowing a decrease in coding efficiency to be suppressed compared to a GOP structure using only forward prediction illustrated in B of FIG. 20.

In contrast, more significant movement of the flying object leads to a lower correlation between captured images, and thus even utilization of the correlation between the frames fails to easily improve the coding efficiency. Furthermore, a GOP structure in an example in A of FIG. 20 is more complicate than a GOP structure in an example in B of FIG. 20, and may thus increase the loads of the coding processing. In other words, loads may be increased even with the coding efficiency prevented from being improved.

Thus, for example, the GOP structure using only forward prediction as illustrated in B of FIG. 20 is applied. Such a GOP structure is simpler than the GOP structure in the example in A of FIG. 20, allowing suppression of an increase in loads of the coding processing.

By setting a more appropriate GOP structure in accordance with (the movement (moving distance) of the flying object 101 determined from) the positional information as described above, a decrease in coding efficiency can be suppressed or an increase in loads of the coding processing can be suppressed.

In a case of the example in FIG. 5, the coding section 213 sets the GOP structure on the basis of the positional information. For example, when setting the coding parameters in step S126 (FIG. 8), the coding section 213 executes GOP structure setting processing to set the GOP structure on the basis of the positional information as described above.

<Procedure of GOP Structure Setting Processing>

Figure 21:
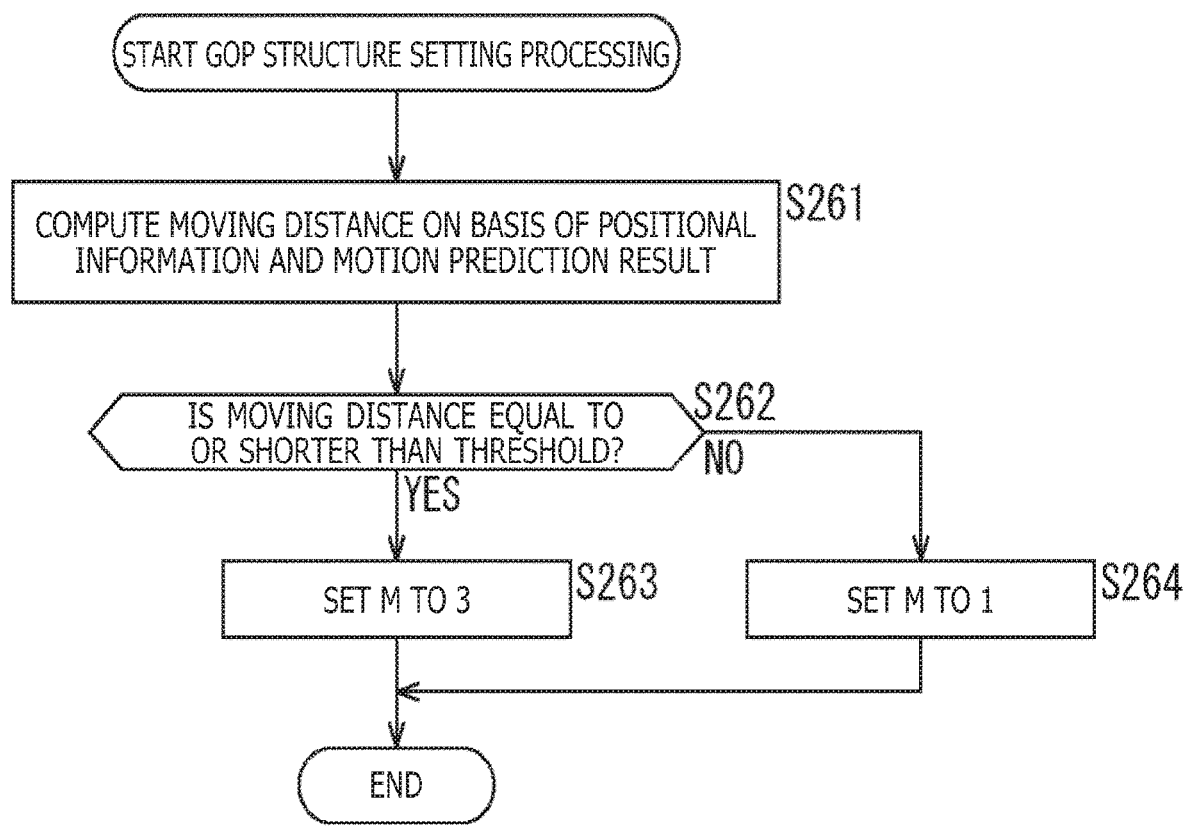
FIG. 21 is a flowchart illustrating an example of a procedure of GOP structure setting processing.

An example of a procedure of the GOP structure setting processing will be described with reference to a flowchart in FIG. 21. When the GOP structure setting processing is started, in step S261, the coding section 213 computes the moving distance of the flying object 101 on the basis of the positional information and the motion prediction results.

In step S262, the coding section 213 determines whether the moving distance is equal to or shorter than predetermined threshold or not. In a case where the coding section 213 determines that the moving distance of the flying object 101 is equal to or shorter than predetermined threshold, the processing proceeds to step S263.

In step S263, the coding section 213 set a parameter M to 3, the parameter M indicating a repetition period (interval) of P pictures or I pictures. In other words, the coding section 213 selects the GOP structure using forward prediction and backward prediction such as the example in A of FIG. 20. When the processing in step S263 ends, the GOP structure setting processing ends.

Additionally, in step S262, in a case where the moving distance of the flying object 101 is equal to or longer than a predetermined threshold, the processing proceeds to step S264.

In step S264, the coding section 213 sets the parameter M to 1. In other words, the coding section 213 selects the GOP structure using only forward prediction such as the example in B of FIG. 20. When the processing in step S264 ends, the GOP structure setting processing ends.

By executing the GOP structure setting processing as described above, the moving image coding section 204 can select a more appropriate GOP structure on the basis of the positional information, allowing suppression of a decrease in coding efficiency and of an increase in loads of the coding processing.

Note that, for example, in a case of FIG. 9 and FIG. 10, the control section 301 executes the processing in each step of the above-described GOP structure setting processing (FIG. 21) in step S142. Accordingly, also in this case, a decrease in coding efficiency can be suppressed and an increase in coding loads can be suppressed.

<Method #1-4>

Now, a method #1-4 will be described. As described with reference to FIG. 1, rate control may be performed on the basis of the positional information (method #1-4).

Figure 22:
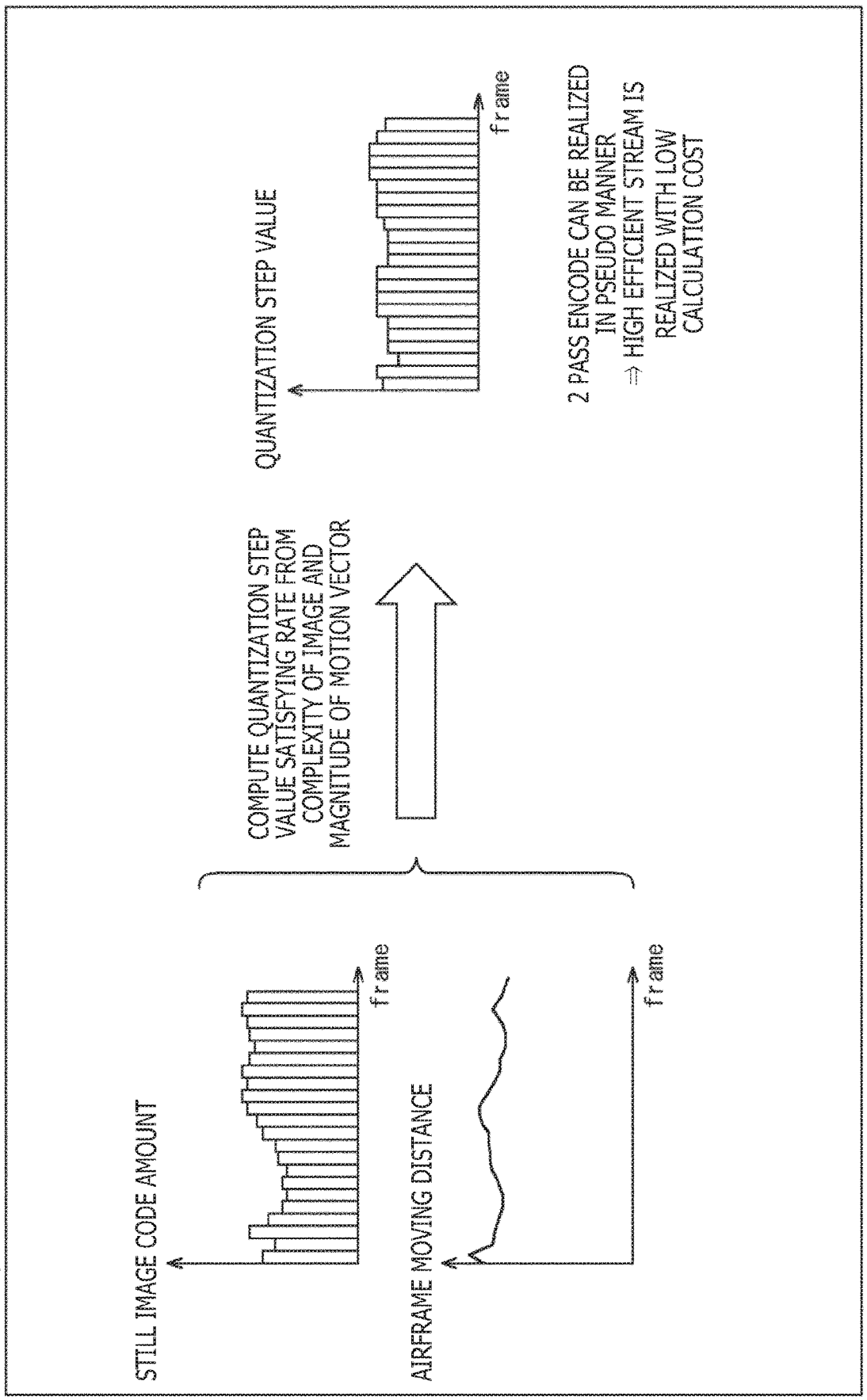
FIG. 22 is a diagram illustrating a method #1-4.

For example, the positional information is used to estimate the code amount, a coding parameter is set in accordance with the estimation, and coding (pseudo 2 path rate control) is performed using the coding parameter. For example, as illustrated in FIG. 22, complexity of each captured image is determined (=code amount×quantization step). A correlation is observed between the complexity of a still image and the complexity of a moving image. Then, the positional information is used to compute the moving distance of the flying object 101, and the moving distance is reflected in the complexity. In general, significant movement tends to increase the complexity of the moving image. Then, the quantization step is set from the complexity to set the total code amount to a desired value.

Then, coding is performed using the quantization step. As described above, as a coding parameter, the quantization step for the quantization performed for coding of the moving image is set on the basis of the positional information, and the pseudo 2 path rate control is executed, in which coding is performed again using the quantization step. This enables more appropriate rate control to be performed, allowing the coding efficiency to be improved. Additionally, an increase in loads of the coding processing can be suppressed.

Figure 23:
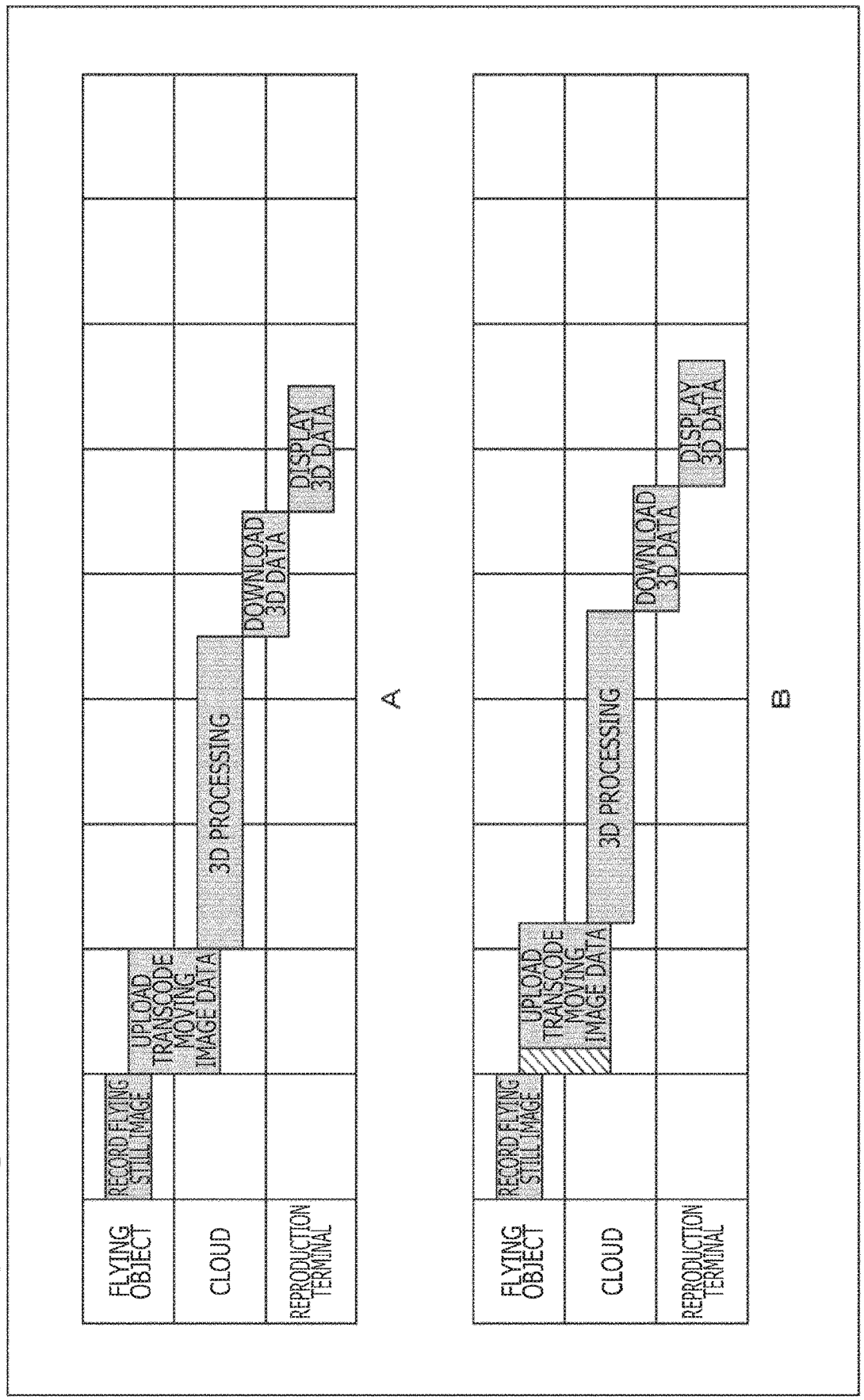
FIG. 23 is a diagram illustrating the method #1-4.

For example, in a case where the pseudo 2 path rate control as described above is not performed, each step of processing is executed as illustrated in A of FIG. 23. In contrast, the pseudo 2 path rate control is performed in a shaded portion illustrated in B of FIG. 23.

In a case of the example in FIG. 5, the coding section 213 performs the pseudo 2 path rate control on the basis of the positional information. For example, when setting the coding parameters in step S126 (FIG. 8), the coding section 213 performs the pseudo 2 path rate control processing or coding control processing to execute rate control on the basis of the positional information as described above.

<Procedure of Pseudo 2 Path Rate Control Processing>

Figure 24:
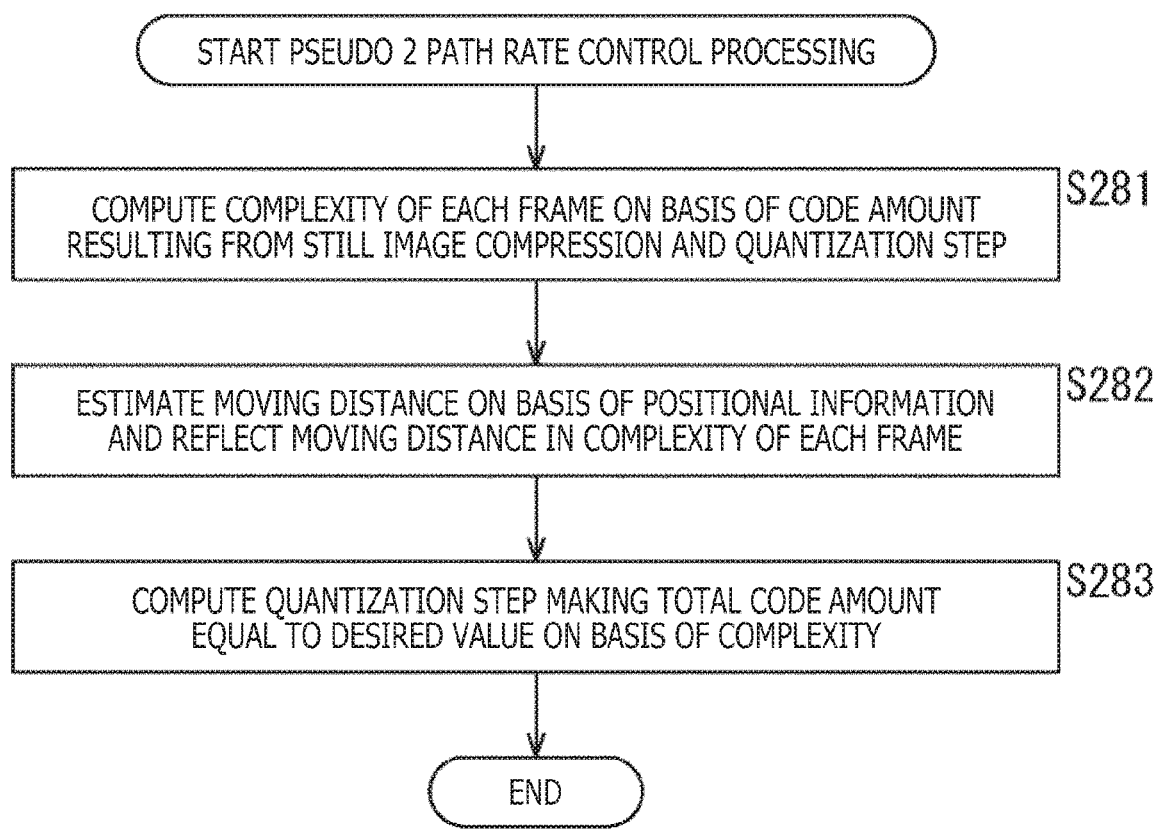
FIG. 24 is a flowchart illustrating an example of a procedure of pseudo 2 path rate control processing.

An example of a procedure of the pseudo 2 path rate control processing will be described with reference to a flowchart in FIG. 24. When the pseudo 2 path rate control processing is started, in step S281, the coding section 213 computes the complexity of each frame (=code amount× quantization step) on the basis of the code amount and quantization step resulting from compression of the still image.

In step S282, the coding section 213 estimates the moving distance of the flying object 101 on the basis of the positional information to reflect the moving distance in the complexity of each frame.

In step S283, the coding section 213 computes the quantization step on the basis of the complexity such that the total code amount has a desired value.

When the processing in step S283 ends, the pseudo 2 path rate control processing ends.

<Procedure of Coding Control Processing>

Figure 25:
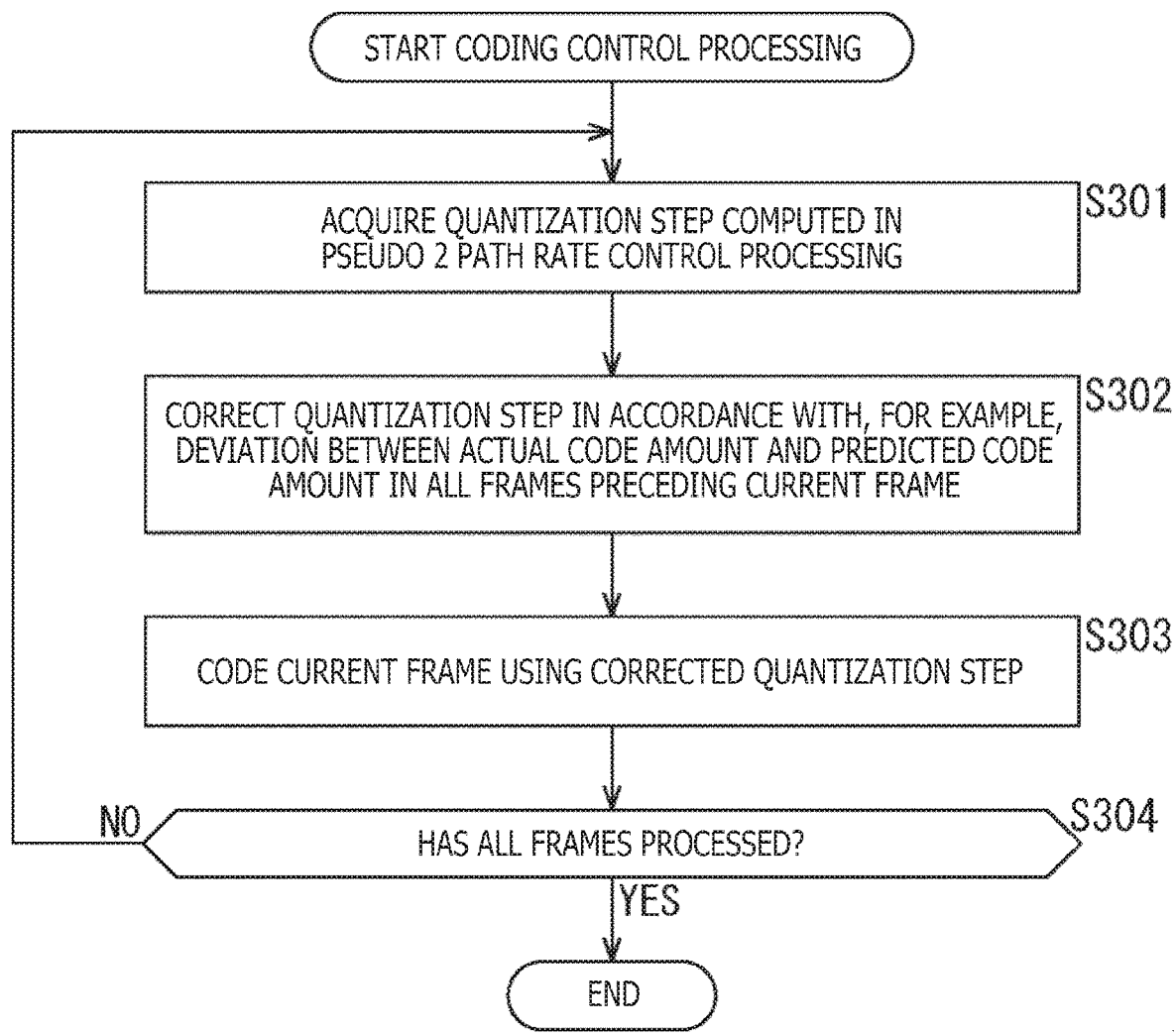
FIG. 25 is a flowchart illustrating an example of a procedure of coding control processing.

Now, an example of a procedure of the coding control processing will be described with reference to a flowchart in FIG. 25. When the coding control processing is started, in step S301, the coding section 213 acquires the quantization step computed in the pseudo 2 path rate control processing.

In step S302, the coding section 213 corrects the quantization step according to, for example, a deviation between a predicted code amount and an actual code amount in all the frames preceding the current frame.

In step S303, the coding section 213 uses the corrected quantization step to code the current frame.

In step S304, the coding section 213 determines whether or not all the frames of the moving image to be processed have been processed. In a case where the coding section 213 determines that any of the frames has been unprocessed, the processing returns to step S301.

As described above, until all the frames are processed, the processing from step S301 to step S304 is repeated. Then, in a case where the coding section 213 determines in step S304 that all the frames have been processed, the coding control processing ends.

By executing each step of processing as described above, the moving image coding section 204 can implement the pseudo 2 path rate control on the basis of the positional information, allowing the coding efficiency to be improved.

Note that, for example, in a case of FIG. 9 and FIG. 10, the control section 301 executes the processing in each step of the pseudo 2 path rate control processing and the processing in step S301, step S302, and step S304 of the coding control processing. Additionally, the sections from the sort buffer 311 to the rate control section 323 execute the processing in step S303 as moving image coding processing.

Additionally, also in this case, the pseudo 2 path rate control can be implemented on the basis of the positional information, and a decrease in coding efficiency can be suppressed.

<Method #1-5>

Now, a method #1-5 will be described. As described with reference to FIG. 1, sorting-out of captured images (frames) may be performed on the basis of the positional information (method #1-5).

Figure 26:
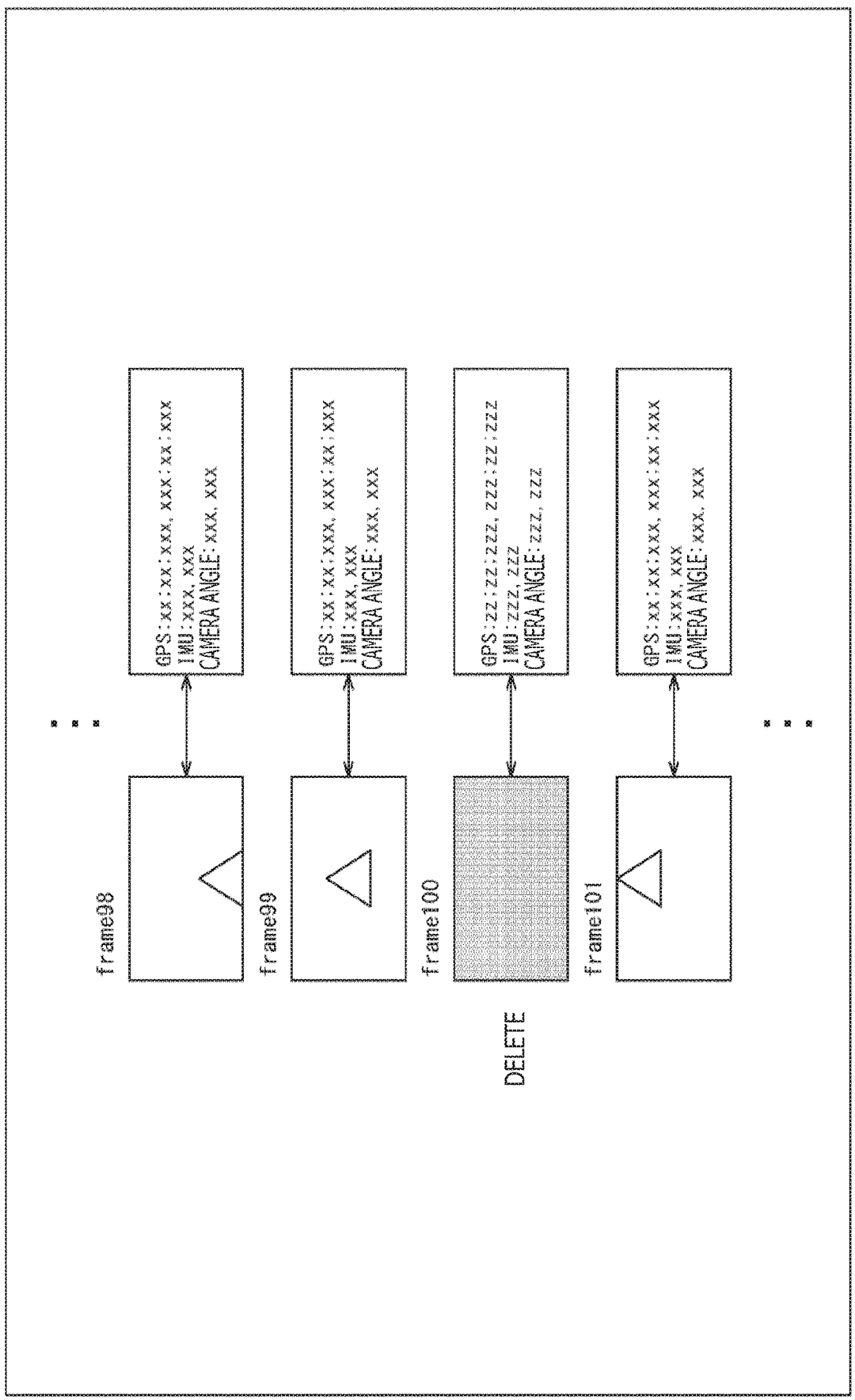
FIG. 26 is a diagram illustrating the method #1-5.

Movement of the flying object (image capturing range of each operation of image capturing) is not stable, and for example, an external factor such as the wind may cause an unintended image capturing range to be obtained. For example, in a case where captured images with frame number 98 to frame number 101 are obtained as in an example in FIG. 26, a captured image (gray) with frame number 100 (frame100) includes positional information significantly different from the positional information of the other frame images (captured images). Note that the captured image with frame number 100 including positional information significantly different from the positional information of the other frame images is indicated by the expression, using z, of the GPS information, the IMU information, and the image capturing control information (camera angle) included in the positional information of this captured image and the expression, using x, of the GPS information, the IMU information, and the image capturing control information (camera angle) included in the positional information of the other captured images (x and z do not indicate particular values).

Such an unintended range of captured images are likely to have no use and to be unwanted. In other words, such a captured image may be deleted without any problem (for example, three-dimensional map information can be generated without any inconvenience). Thus, whether the captured image is unwanted or not is determined on the basis of the positional information (that is, the image capturing range), and unwanted captured images are deleted before coding. For example, in a case of FIG. 26, the captured image with frame number 100 is deleted.

This allows a decrease in coding efficiency to be suppressed.

In a case of the example in FIG. 5, the coding section 213 performs such sorting-out of the frame images. For example, in step S124 (FIG. 8), the coding section 213 executes frame selection processing on the captured image group stored in the frame memory 211 to perform frame selection based on the positional information as described above.

<Procedure of Frame Selection Processing>

Figure 27:
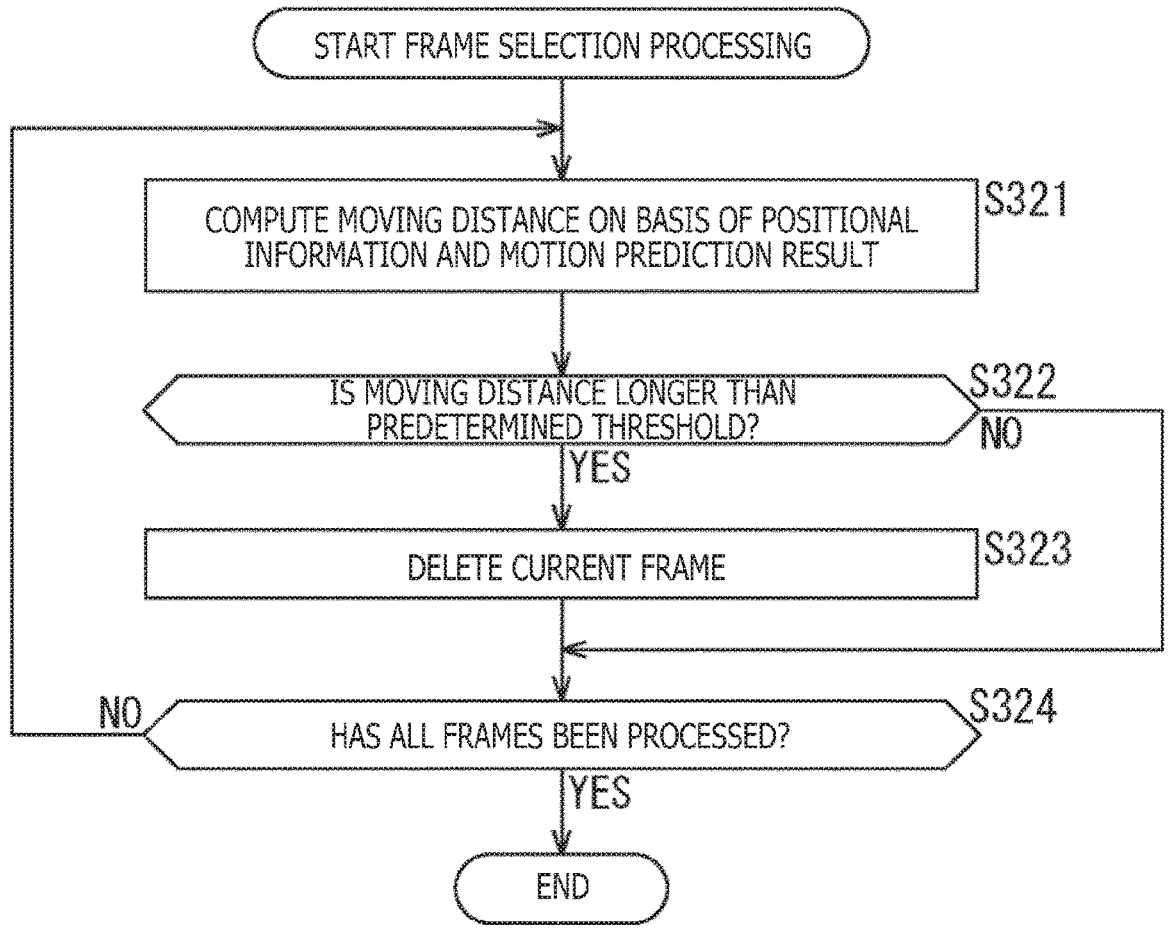
FIG. 27 is a flowchart illustrating an example of a procedure of frame selection processing.

An example of a procedure of the frame selection processing will be described with reference to a flowchart in FIG. 27. When the frame selection processing is started, in step S321, the coding section 213 computes the moving distance of the flying object 101 on the basis of the positional information and the motion prediction results.

In step S322, the coding section 213 determines whether the moving distance is longer than a predetermined threshold or not. In a case of determining that the moving distance is longer than the predetermined threshold, the coding section 213 deletes the captured image of the current frame (excludes the captured image from coding targets).

When the processing in step S323 ends, the processing proceeds to step S324. Additionally, in a case where the coding section 213 determines in step S322 the moving distance to be equal to or shorter than the predetermined threshold, the processing in step S323 is omitted (with the captured image of the current frame not deleted), and the processing proceeds to step S324.

In step S324, the coding section 213 determines whether all the frames of the moving image to be coded have been processed or not. In a case where the coding section 213 determines that any of the frames of the moving image remains unprocessed, the processing returns to step S321. In other words, until all the frames are processed, the processing in each of steps S321 to S324 is repeatedly executed. Then, in step S324, in a case where the coding section 213 determines that all the frames have been processed, the frame selection processing ends.

The frame selection processing executed as described above allows a decrease in coding efficiency to be suppressed.

Note that, for example, in a case of FIG. 9 and FIG. 10, the control section 301 executes the processing in each step of the frame selection processing in step S142. Accordingly, also in this case, unwanted captured images can be deleted on the basis of the positional information, and a decrease in coding efficiency can be suppressed.

<Method #1-6>

Now, a method #1-6 will be described. As described with reference to FIG. 1, the positional information may be added to (associated with) the moving image coded data as user data (method #1-6). Then, when the moving image coded data is decoded to restore captured images, which are then processed, the positional information regarding each captured image can be utilized. For example, when map information is generated, the positional information regarding each captured image can be used, enabling more efficient processing.

In a case of the example in FIG. 5, the coding section 213 adds the positional information to the moving image coded data as user data. For example, in step S127 (FIG. 8), the coding section 213 executes user data processing to add (associate) the positional information to (with) the moving image coded data.

<Procedure of User Data Processing>

Figure 28:
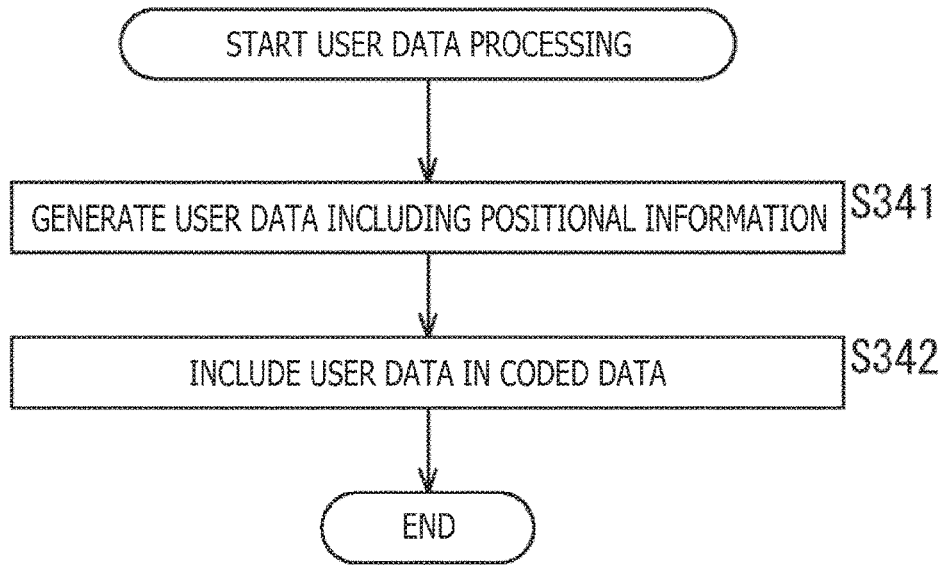
FIG. 28 is a flowchart illustrating an example of a procedure of user data processing.

An example of a procedure of the user data processing will be described with reference to a flowchart in FIG. 28. When the user data processing is started, in step S341, the coding section 213 generates user data (for example, SEI (Supplemental Enhancement Information)) including the positional information.

In step S342, the coding section 213 adds the generated user data to the moving image coded data. When the processing in step S342 ends, the user data processing ends.

With the user data processing executed as described above, when the moving image coded data is decoded to restore captured images, which are then processed, the positional information regarding the captured images can be utilized.

Note that, for example, in a case of FIG. 9 and FIG. 10, the control section 301 executes, in step S142, the processing in step S341 of the user data processing. Additionally, the coding section 315 executes, in step S153, the processing in step S342 of the user data processing. Accordingly, also in this case, the positional information can be added to the moving image coded data, and when the moving image coded data is decoded to restore captured images, which are then processed, the positional information regarding the captured images can be utilized.

4. Second Embodiment

<Method #2>

Now, a method #2 will be described. As described with reference to FIG. 1, during transcoding, captured images generated in a respective plurality of moving bodies may be sorted on the basis of the positional information, and the group of the sorted captured images may be coded into one moving image in accordance with the moving image coding scheme to generate moving image coded data (method #2). This enables the generated flying object 101 to reference the different captured images, allowing the coding efficiency to be improved.

<Image Processing System>

Figure 29:
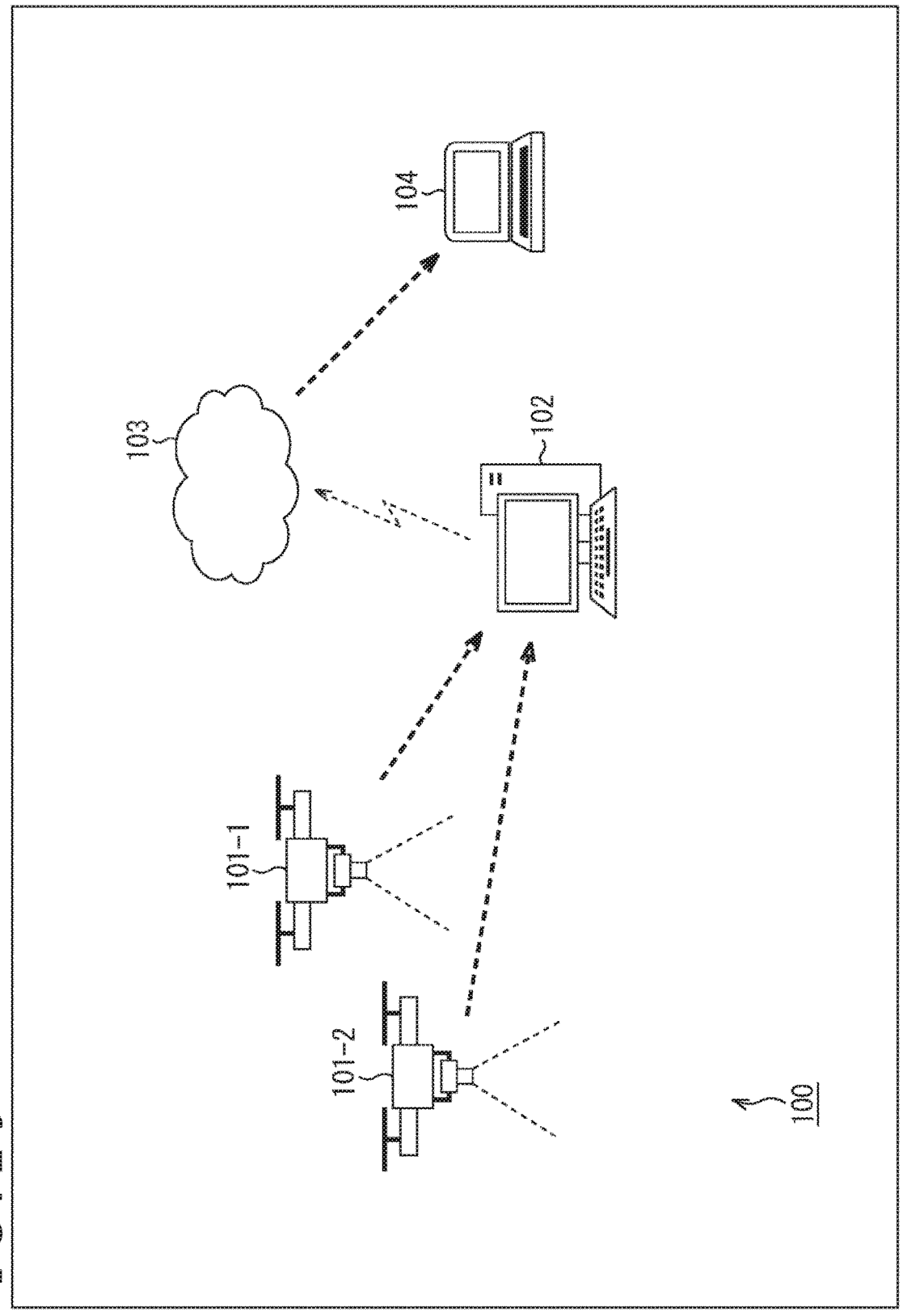
FIG. 29 is a diagram illustrating another example of a system to which the present technique is applied.

As illustrated in FIG. 29, the image processing system 100 in this case includes two flying objects 101 (flying object 101-1 and flying object 101-2). In this case, the flying object 101-1 and the flying object 101-2 share capturing of images of the subject area 110. For example, the flying object 101-1 captures images while flying as indicated by a thick arrow in FIG. 30 to generate captured images . . . , A-frame98 to A-frame101, . . . , A-frame120 to A-frame123, . . . . Additionally, the flying object 101-2 captures images while flying as indicated by a thin arrow in FIG. 30 to generate captured images . . . , B-frame98 to B-frame101, . . . , B-frame120 to B-frame123, . . . .

In other words, in this case, rows of captured images captured by the flying object 101-1 are arranged alternately with rows of captured images captured by the flying object 101-2. Accordingly, among the captured images captured by the flying object 101-1 and the captured images captured by the flying object 101-2, there are combinations each of captured images of close positions. In other words, some combinations of captured images have a high correlation. Accordingly, because the captured images captured by both flying objects 101 are collectively coded into one moving image, the coding can be performed utilizing the correlation as described above. This allows a decrease in coding efficiency to be more appropriately suppressed than coding of each of the captured images generated by each flying object 101.

Figure 30:
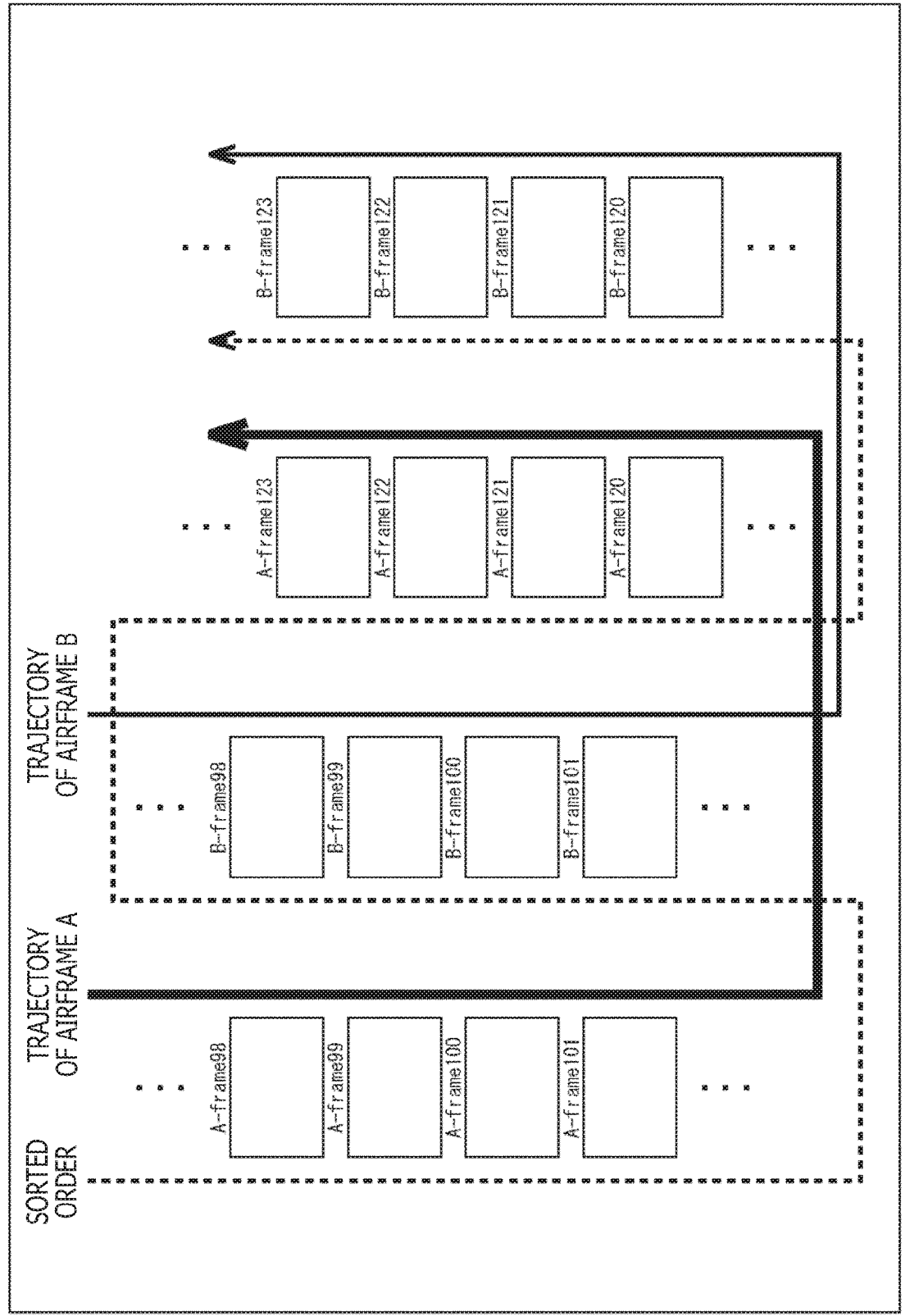
FIG. 30 is a diagram illustrating a method #2.
Figure 31:
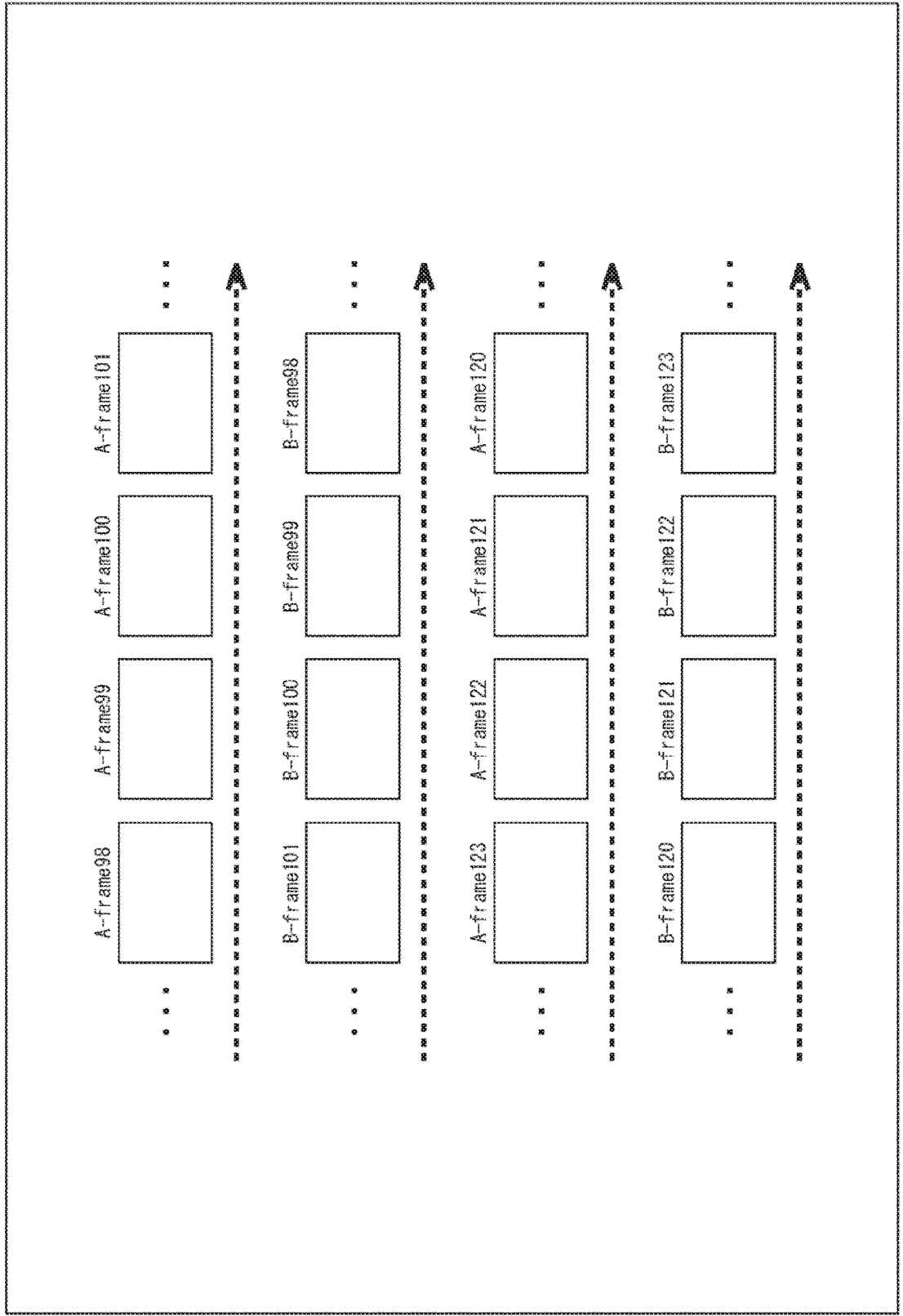
FIG. 31 is a diagram illustrating the method #2.

For example, when sorted and arranged in a sorted order as indicated by a dotted arrow in FIG. 30, captured images captured by the flying objects 101 in FIG. 30 can be organized into one moving image in an order as indicated by a dotted arrow in an example in FIG. 31.

Figure 32:
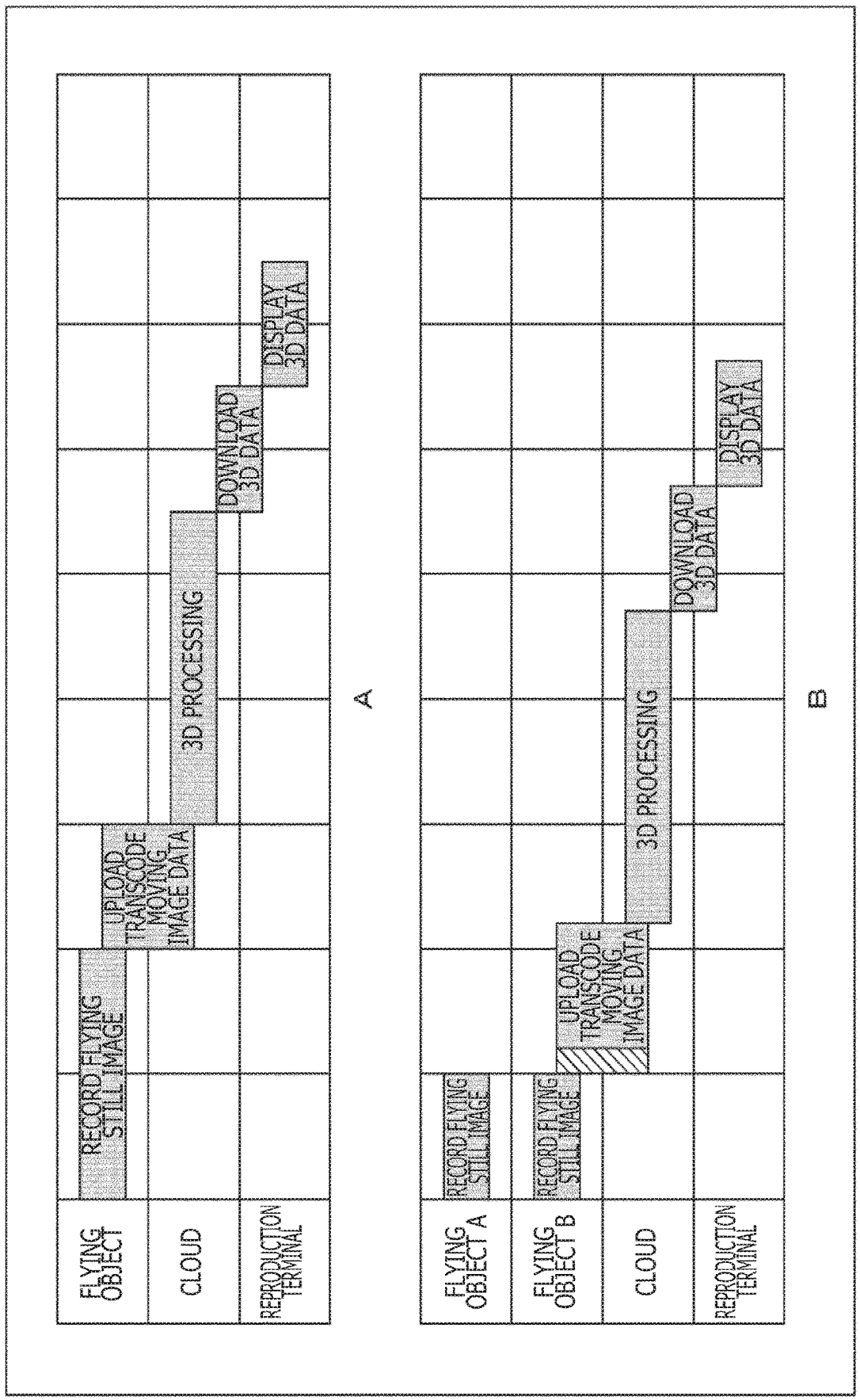
FIG. 32 is a diagram illustrating the method #2.

For example, in a case where image capturing by one flying object 101 is assumed to require a processing time as illustrated in A of FIG. 32, using two flying objects 101 for image capturing allows the time for image capturing to be substantially halved as illustrated in B of FIG. 32. Accordingly, even in a case where processing is executed in which the captured images captured by both flying objects 101 are organized into one moving image on the basis of the positional information as illustrated by dotted lines in B of FIG. 32, the processing time can be made shorter than in A of FIG. 32. Accordingly, three-dimensional map information can be generated, provided, and utilized more quickly.

<Procedure of Transformation and Transfer Processing>

Figure 33:
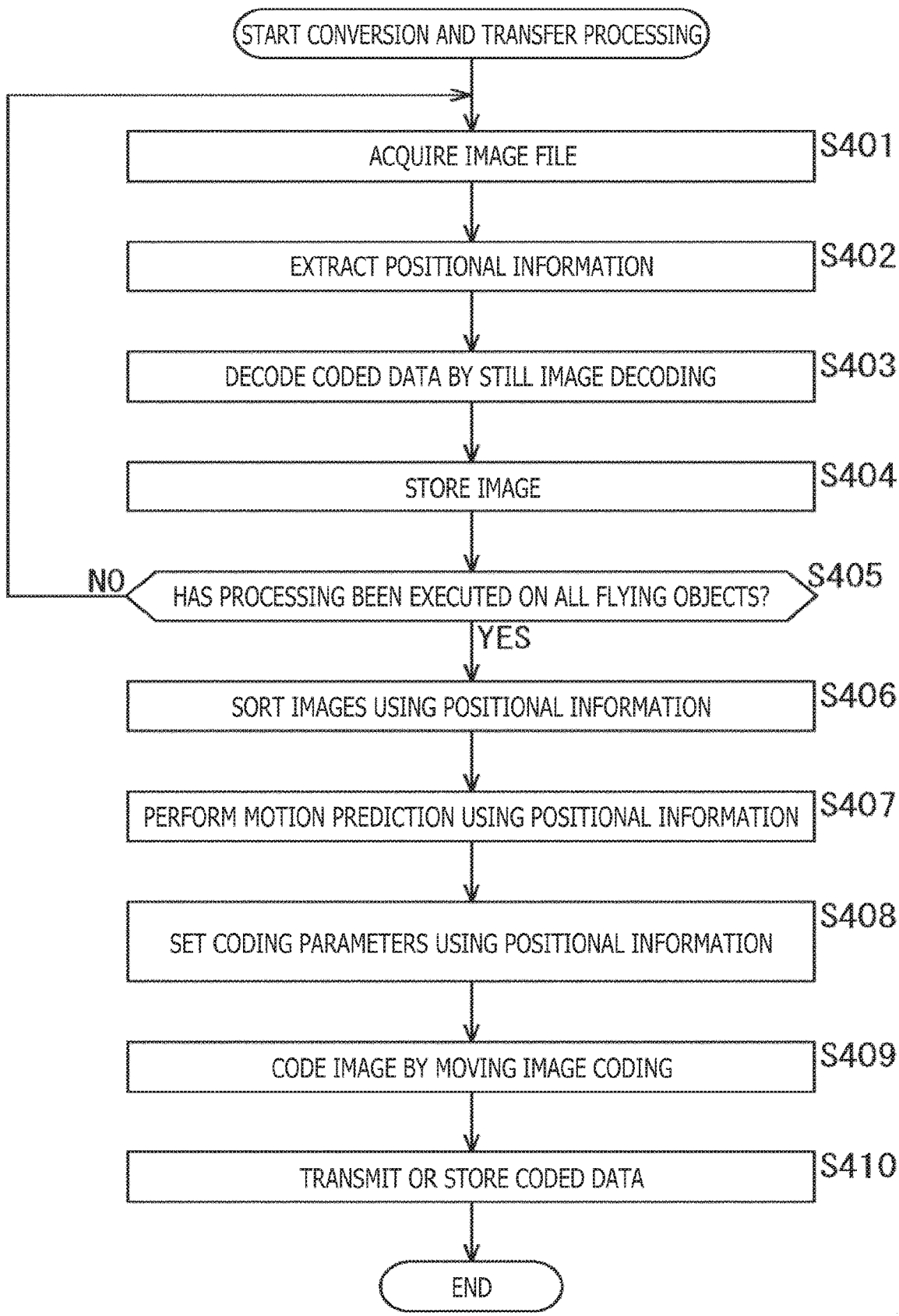
FIG. 33 is a flowchart illustrating an example of a procedure of transformation and transfer processing.

When flying (image capturing) of each flying object 101 ends and is communicatively connected to the ground station 102, the ground station 102 executes transformation and transfer processing. An example of a procedure of the transformation and transfer processing executed by the ground station 102 will be described with reference to a flowchart in FIG. 33.

When the transformation and transfer processing is started, the ground station 102 executes the processing from step S401 to step S404 for each flying object 101 as is the case with the processing from step S121 to step S124.

In step S405, the ground station 102 determines whether the above-described steps of processing have been executed on all the flying objects 101 or not. In a case where any of the flying objects 101 remains unprocessed, the processing returns to step S401. In other words, the processing from step S401 to step S405 is executed on each flying object 101. Then, in a case where, in step S405, the processing is determined to have been executed on all the flying objects, the processing proceeds to step S406.

In step S406, the coding section 213 sorts captured images generated by each flying object 101 and stored in the frame memory 211, by using the positional information regarding the captured images, to reorganize the captured images into one moving image.

The processing from step S407 to step 410 is executed on the one moving image generated in step S406, like the processing from step S125 to step S128.

When step S410 ends, the transformation and transfer processing ends.

Each step of processing executed as described above allows a decrease in coding efficiency to be suppressed.

Note that, for example, in a case of FIG. 9 and FIG. 10, the control section 301 may execute, in step S142 of the moving image coding processing in FIG. 10, the processing in each of steps S406 to S408 of the transformation and transfer processing, and execute, as processing in step S409 of the transformation and transfer processing, steps from S143 to S154 of the moving image coding processing in FIG. 10. Therefore, this case also allows a decrease in coding efficiency to be suppressed.

The example described above corresponds to the case of the two flying objects 101. However, the number of flying objects is optional. For example, three or more flying objects 101 may be used or one flying object may be used. For example, even with one flying object 101, a flying route may be complicated or the order of image capturing may deviate from an order along the flying route. In such a case, the order of the captured images is changed on the basis of the positional information to enable captured images with a high correlation to be arranged as frames close to one another in the order of image capturing, allowing a decrease in coding efficiency to be suppressed.

In other words, the coding section 213 may sort a plurality of captured images on the basis of the positional information regarding the captured images and code the sorted plurality of captured images into a moving image, regardless of which of the flying objects 101 has generated which of the captured images. This allows a decrease in coding efficiency to be suppressed.

5. Third Embodiment

<Method #3>

Now, a method #3 will be described. As described with reference to FIG. 1, selection of whether to transmit or record coded data by or in the moving body may be enabled (method #3). This enables selection of whether to record or transmit still image coded data (as the whole system, how the captured images are transmitted), allowing the captured images to be transmitted in an appropriate manner depending on the situation.

<Image Processing System>

Figure 34:
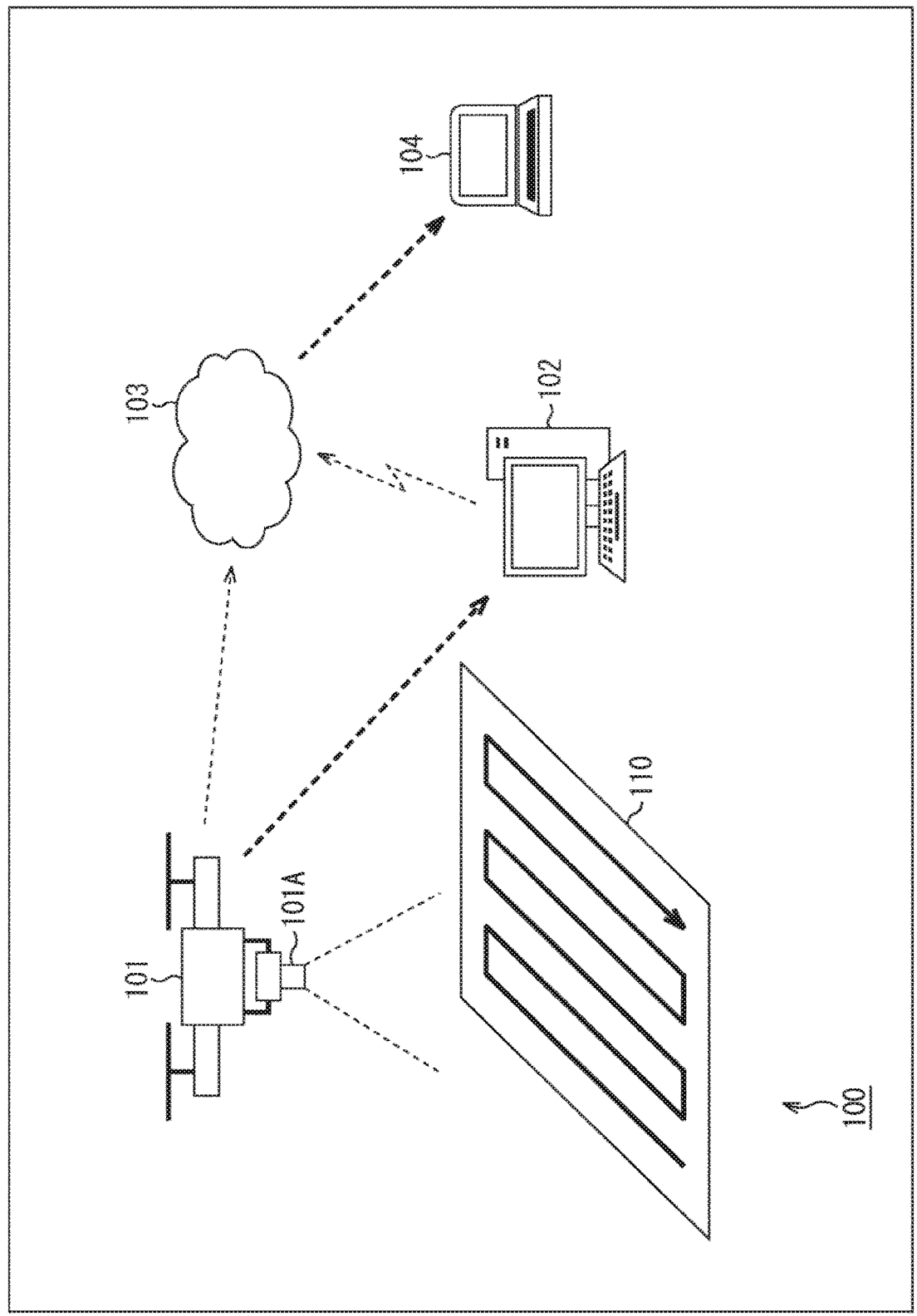
FIG. 34 is a diagram illustrating yet another example of the system to which the present technique is applied.

In other words, as illustrated in FIG. 34, the flying object 101 is enabled to select, depending on the situation or the like, whether to transmit captured images (still image coded data) to the cloud 103 or to transmit the captured images to the ground station 102 after storage in the storage section 158.

<Flying Object>

Figure 35:
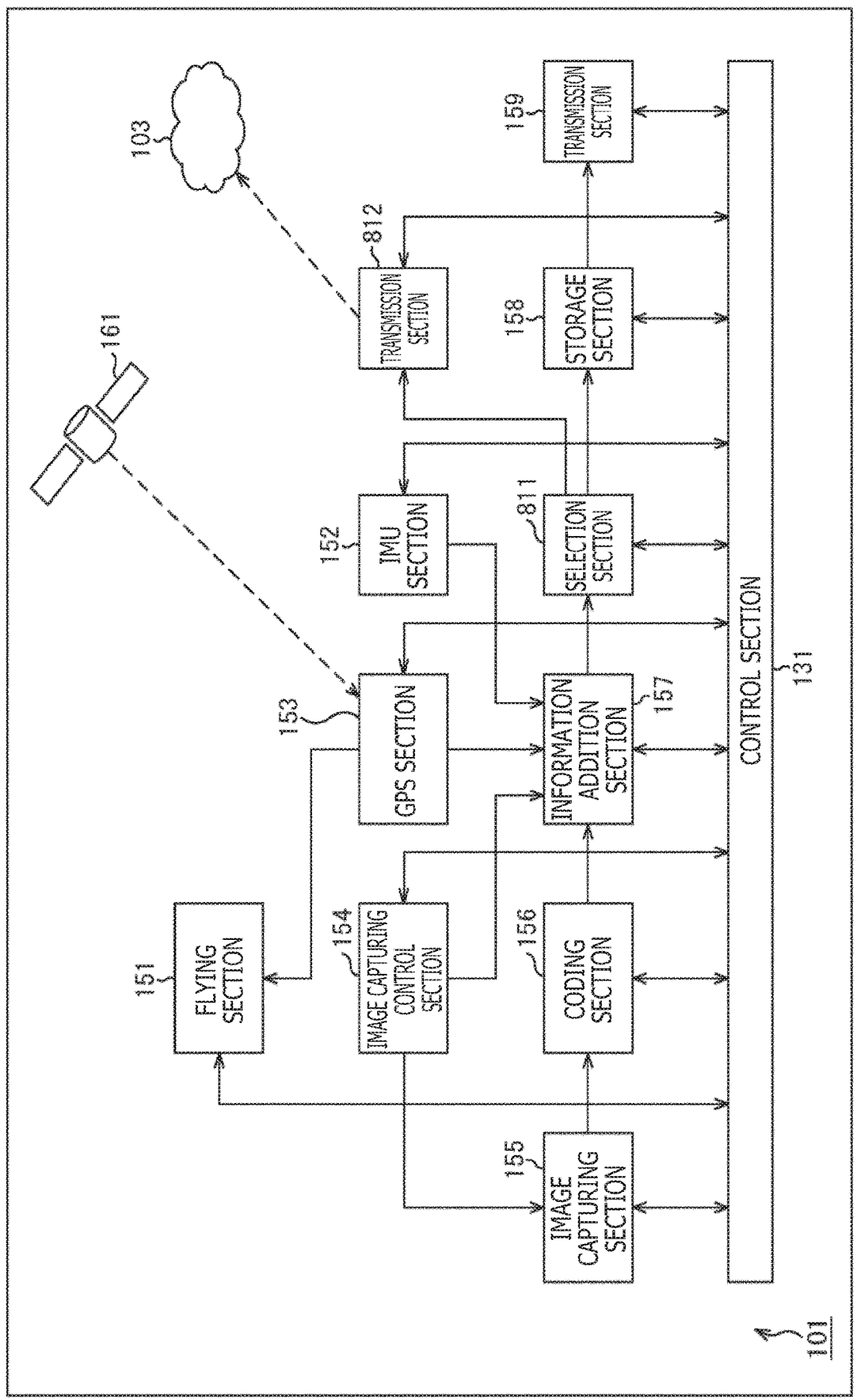
FIG. 35 is a block diagram illustrating a main configuration example of a flying object.

FIG. 35 illustrates a main configuration example of the flying object 101 in that case. As illustrated in FIG. 35, the flying object 101 in this case also includes a configuration basically similar to the configuration in the first embodiment (FIG. 3). However, the flying object 101 in this case further includes a selection section 811 and a transmission section 812.

The information addition section 157 feeds a generated image file to the selection section 811. On the basis of optional information or an optional indication, control, or the like, the selection section 811 selects whether to feed the image file to the storage section 158 or to the transmission section 812. For example, the selection section 811 performs this selection depending on a communication environment. For example, with a sufficiently wide communication band, the selection section 811 feeds the image file to the transmission section 812.

The transmission section 812 includes an optional network interface, and transmits the image file fed from the selection section 811, to the cloud 103 via the network interface.

Additionally, with a not sufficiently wide communication band, the selection section 811 feeds the image file to the storage section 158. In this case, captured images (still image coded data) are transmitted to the ground station 102 after being stored in the storage section 158 as is the case with the first embodiment.

As described above, the image processing system 100 can cause captured images to be transmitted using an appropriate manner depending on the situation.

<Procedure of Image Capture Processing>

Figure 36:
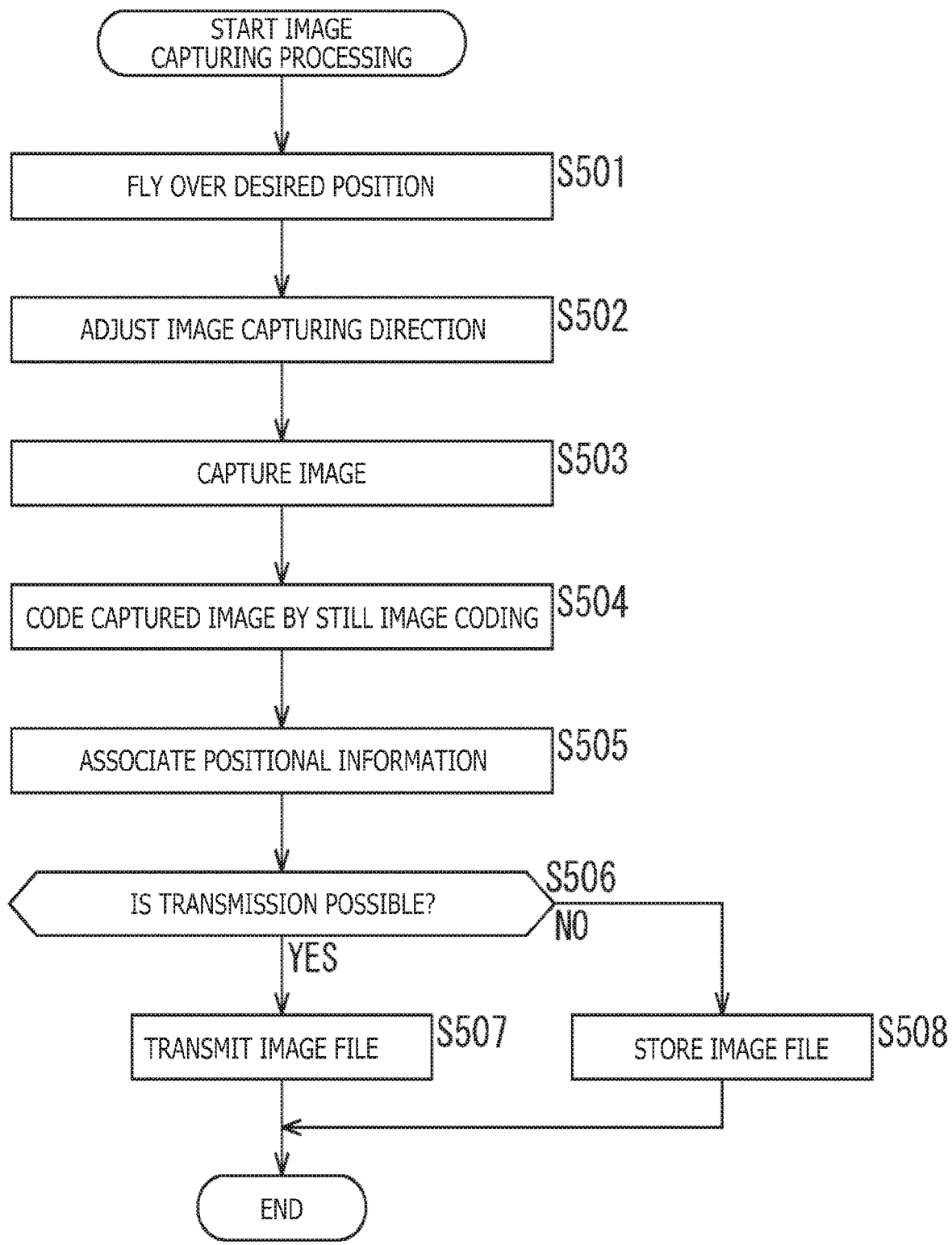
FIG. 36 is a flowchart illustrating an example of a procedure of image capture processing.

An example of a procedure of image capture processing executed by the flying object 101 in this case will be described with reference to a flowchart in FIG. 36.

Figure 7:
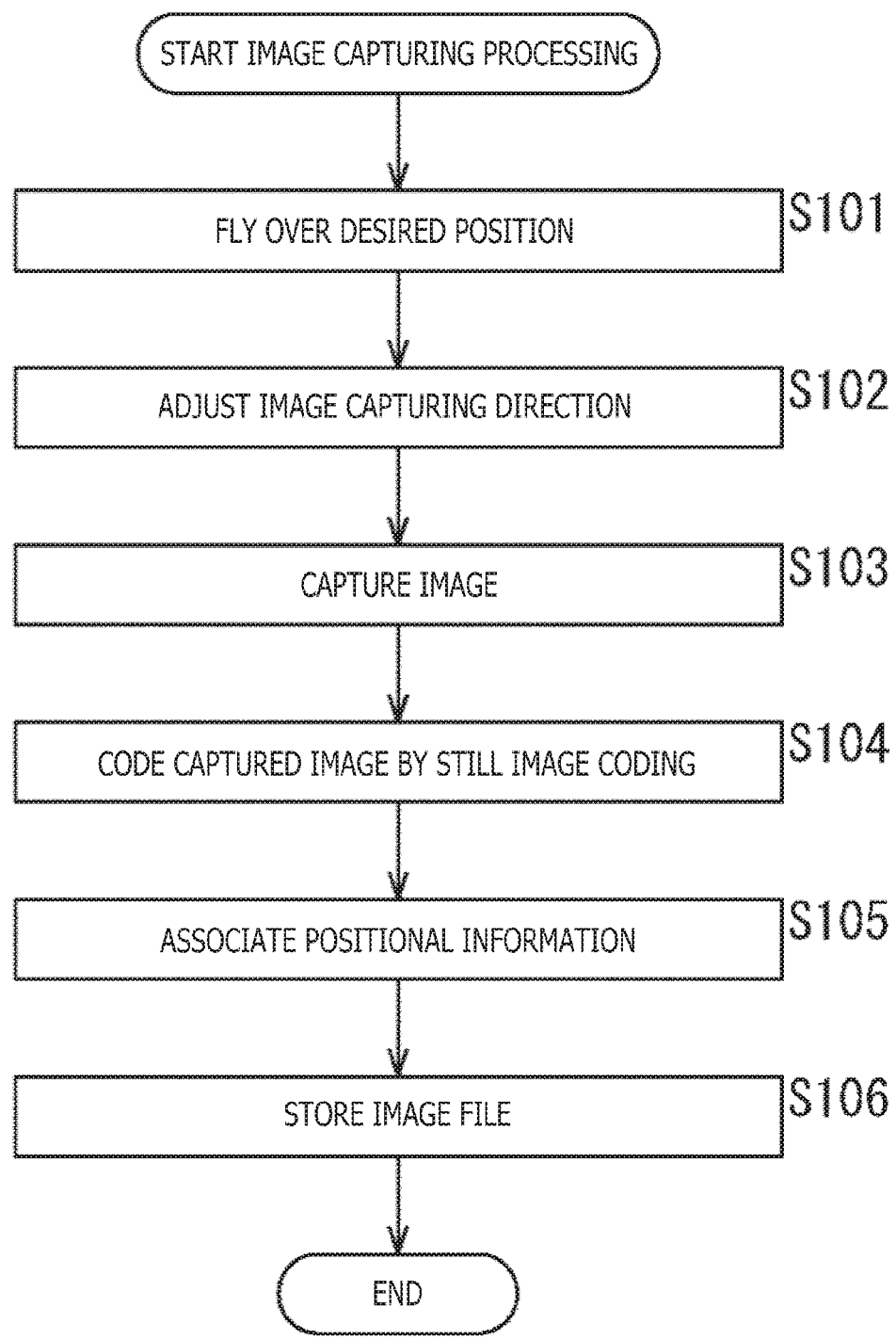
FIG. 7 is a flowchart illustrating an example of a procedure of image capture processing.

Processing in each of steps S501 to S505 is executed as is the case with the processing in each of steps S101 to S105 (FIG. 7).

In step S506, the selection section 811 determines whether an image file can be transmitted or not, on the basis of the communication environment (communication bandwidth) or the like. In a case where the selection section 811 determines that the image file can be transmitted, the processing proceeds to step S507.

In step S507, the transmission section 812 transmits the image file, for example, to the cloud 103. When the processing in step S507 ends, the image capture processing ends. In this case, the transformation and transfer processing by the ground station 102 is omitted.

Furthermore, the selection section 811 determines in step S506 that an image file cannot be transmitted, the processing proceeds to step S508. In step S508, the storage section 158 stores the image file. When the processing in step S508 ends, the image capture processing ends. In this case, the ground station 102 executes the transformation and transfer processing as described in the first embodiment.

The image capture processing executed as described above allows the flying object 101 to transmit the captured images in an appropriate manner depending on the situation.

6. Supplemental Feature

<Coding Scheme and Transcoding>

In the above description, the flying object 101 (moving body) codes captured images in accordance with the still image coding scheme, and the ground station 102 transcodes resultant still image coded data into moving image coded data (recodes the still image coded data in accordance with the moving image coding scheme). However, the coding scheme applied to the flying object 101 and the ground station 102 is optional, and is not limited to this example. For example, the flying object 101 may code the captured images in accordance with the moving image coding scheme to generate moving image coded data, and the ground station 102 may transcode the moving image coded data in accordance with another moving image coding scheme. Additionally, for example, the ground station 102 may transcode still image coded data to generate moving image coded data and transcode the moving image coded data again into moving image coded data in accordance with another moving image coding scheme. Furthermore, for example, the ground station 102 may transcode and transform still image coded data generated by the flying object 101 into still image coded data in accordance with another still image coding scheme.

In other words, the coding scheme for the coded data transcoded by the ground station 102 (coded data input to the ground station 102) is optional and may be a still image coding scheme or a moving image coding scheme. In other words, the coding scheme for the coded data decoded by the decoding section 203 is optional and may be a still image coding scheme or a moving image coding scheme. In other words, the decoding scheme for the decoding performed by the decoding section 203 is optional and may be a still image decoding scheme or a moving image decoding scheme.

Additionally, the coding scheme for the coded data transcoded by the ground station 102 (coded data output from the ground station 102) is optional and may be a still image coding scheme or a moving image coding scheme. In other words, the coding scheme for the coded data generated by the coding by the moving image coding section 204 (coding section 213) (in other words, the coding scheme for the coding performed by the moving image coding section 204 (coding section 213)) is optional and may be a still image coding scheme or a moving image coding scheme.

Additionally, in the above description, the ground station 102 performs transcoding to transform the coding scheme. However, any transcoding may be used as long as the transcoding transforms any coding parameter by decoding the coded data and coding the decoded data again. For example, the ground station 102 may decode and recode the coded data to change the rate (perform translation as transcoding).

Additionally, it is sufficient that the decoding and coding in the transcoding performed by the ground station 102 involve processing required to transform desired matters such as schemes and parameters, and the image data need not be completely restored. For example, the ground station 102 may perform only a part of decoding of coded data (execute only processing of a part of decoding processing including a plurality of steps of processing) to restore coefficient data regarding an orthogonal transform coefficient, and recode the coefficient data (execute only processing of a part of coding processing including a plurality of steps of processing) to generate coded data. By executing only required steps of the decoding or coding including a plurality of steps of processing as described above, an increase in loads of processing involved in transcoding can be suppressed.

<Computer 22>

The above-described series of steps of processing can be executed by hardware or software. In a case where the series of steps of processing is executed by software, a program included in the software is installed in a computer. Here, examples of the computer include a computer integrated in dedicated hardware, and for example, a general-purpose computer that can perform various functions when various programs are installed in the computer.

Figure 37:
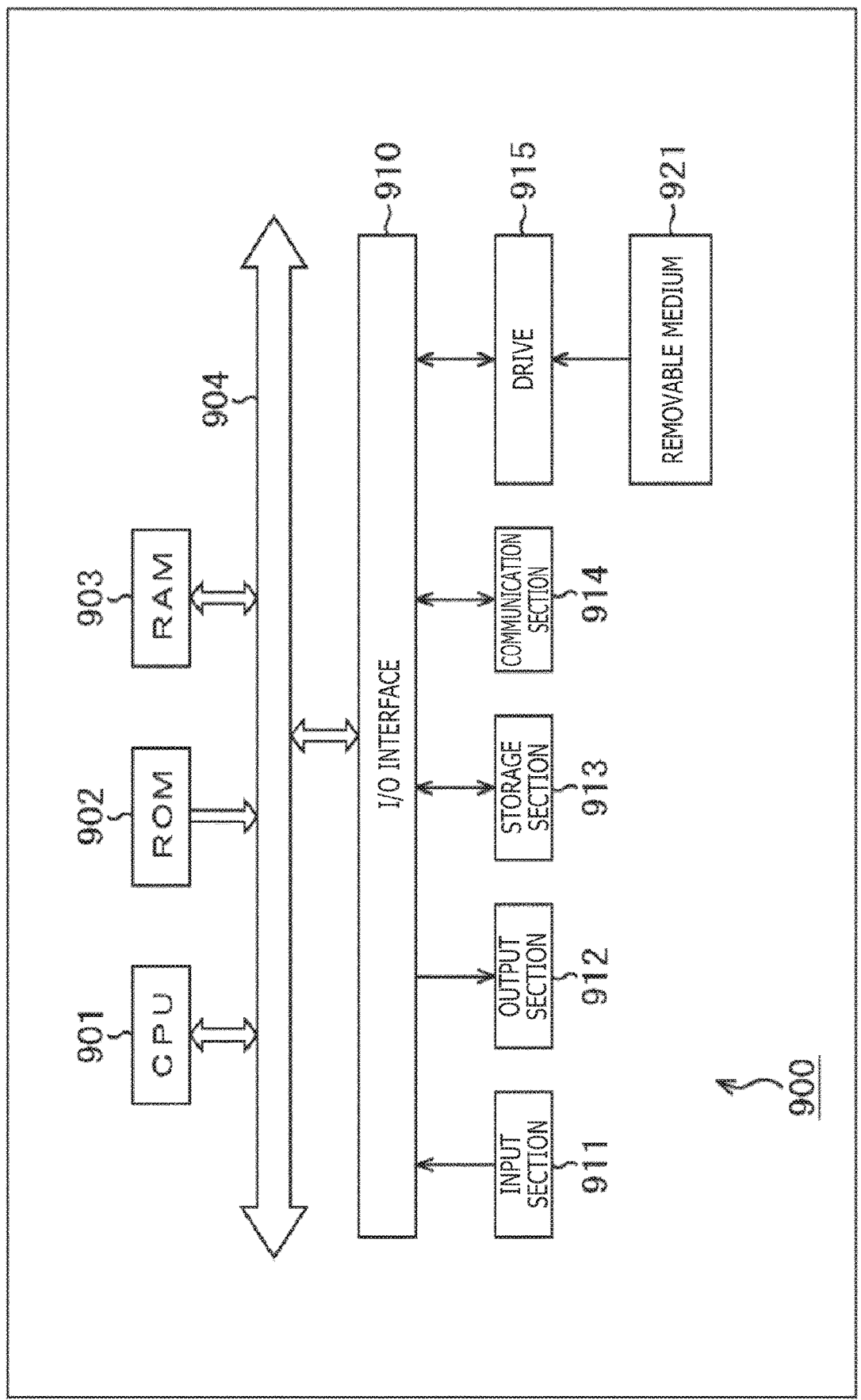
FIG. 37 is a block diagram illustrating a main configuration example of a computer.

FIG. 37 is a block diagram illustrating a configuration example of hardware of a computer executing the above-described series of steps of processing.

In a computer 900 illustrated in FIG. 37, a CPU (Central Processing Unit) 901, a ROM (Read Only Memory) 902, and a RAM (Random Access Memory) 903 are connected together via a bus 904.

The bus 904 also connects to an I/O interface 910. The I/O interface 910 connects to an input section 911, an output section 912, a storage section 913, a communication section 914, and a drive 915.

The input section 911 includes, for example, a keyboard, a mouse, a microphone, a touch panel, and an input terminal. The output section 912 includes, for example, a display, a speaker, an output terminal, and the like. The storage section 913 includes, for example, a hard disk, a RAM disk, a nonvolatile memory, and the like. The communication section 914 includes, for example, network interface. The drive 915 drives a removable medium 921 such as a magnetic disk, an optical disc, a magneto-optical disc, or a semiconductor memory.

In the computer configured as described above, the above-described series of steps of processing is executed by the CPU 901, for example, loading a program stored in the storage section 913 into the RAM 903 via the I/O interface 910 and the bus 904 and executing the program. The RAM 903 also stores, as appropriate, data required for the CPU 901 to execute various types of processing, and the like.

The program executed by the computer (CPU 901) can be applied by, for example, being recorded in the removable medium 921, used as a package medium or the like. In that case, the program can be installed in the storage section 913 via the I/O interface 910 by mounting the removable medium 921 in the drive 915.

Additionally, the program can be provided via a wired or wireless transmission medium such as a local area network, the Internet, and digital satellite broadcasting. In that case, the program can be received by the communication section 914 and installed in the storage section 913.

Otherwise, the program can be installed in the ROM 902 or the storage section 913 in advance.

<Applications of Present Technique>

The present technique can be applied to optional image coding and decoding schemes. In other words, various types of processing related to image coding and decoding are optionally specified and are not limited to the above-described example unless there is inconsistency with the above-described present technique.

The present technique can also be implemented as any configuration mounted in an optional apparatus or an apparatus included in a system, for example, a processor (for example, a vides processor) used as system LSI (Large Scale Integration) or the like, a module using a plurality of processors or the like (for example, a video module), a unit using a plurality of modules or the like (for example, a video unit), a set corresponding to a unit to which any other function are further added (for example, a video set), or the like (that is, a configuration corresponding to a part of the apparatus).

Furthermore, the present technique can be applied to a network system including a plurality of apparatuses. For example, the present technique can be applied to a cloud service providing service related to images (moving images) to an optional terminal, for example, a computer, AV (Audio Visual) equipment, a portable information processing terminal, or an IoT (Internet of Things) device, or the like.

<Other Features>

Note that the "flag" as used herein refers to information for distinguishing a plurality of states and includes not only information used to identify two states of true (1) or false (0) but also information enabling three or more states to be identified. Accordingly, a possible value of the "flag" may be two values of, for example, 1/0 or three or more values. In other words, the number of bits included in the "flag" is optional, and may be one bit or a plurality of bits. Additionally, the identification information (including flags) is assumed to be in a form in which the identification information is included in a bit stream but also a form in which difference information regarding the difference of the identification information from information used as a reference, and thus the "flag" and "identification information" include not only this information but also difference information regarding a difference from the reference information.

Additionally, various types of information (metadata or the like) related to coded data (bit stream) may be transmitted or recorded in any form as long as the information is associated with the coded data. Here, the term "associate" means that, for example, when one data is processed, the other data may be utilized (linked). In other words, data associated with each other may be compiled into one data or provided as individual data. For example, the information associated with the coded data (image) may be transmitted on a transmission path different from a transmission path on which the coded data (image) is transmitted. Additionally, for example, the information associated with the coded data (image) may be recorded in a recording medium different from a recording medium in which the coded data (image) is recorded (or recorded in a recording area of a recording medium different from a recording area of the same recording medium) in which the coded data (image) is recorded. Note that the "association" may correspond to a part of data instead of the whole data. For example, the image and the information corresponding to the image may be associated with each other in optional units such as a plurality of frames, single frames, or portions of the frame.

Note that the terms "synthesize," "multiplex," "add," "integrate," "include," "store," "put in," "plug in," "insert," and the like mean that a plurality of objects is organized into one object, for example, coded data and metadata are organized into one data and mean one method for "associate" described above.

Additionally, the embodiments of the present technique are not limited to the above-described embodiments, and various changes may be made to the embodiments without departing from the spirits of the present technique.

Additionally, for example, the present technique can also be implemented as any configuration included in an apparatus or a system, for example, a processor used as system LSI (Large Scale Integration) or the like, a module using a plurality of processors or the like, a unit using a plurality of modules or the like, a set corresponding to a unit to which any other function is further added, or the like (that is, a configuration corresponding to a part of the apparatus).

Note that the system as used herein means a set of a plurality of components (apparatuses, modules (parts), or the like) regardless of whether or not all the components are located in the same housing. Accordingly, the following are both systems that is a plurality of apparatuses housed in separate housings and connected together via a network, and one apparatus including a plurality of modules housed in one housing.

Additionally, the configuration described as one apparatus (or processing section) may be divided into and configured as a plurality of apparatuses (or processing sections). In contrast, the configuration described above as a plurality of apparatuses (or processing sections) may be integrated into one apparatus (or processing section). Additionally, of course, to the configuration of each apparatus (or each processing section), a configuration other than the above-described configuration may be added. Furthermore, as long as the configuration and operation of the system as a whole remain substantially unchanged, a part of configuration of one apparatus (or processing section) may be included in the configuration of another apparatus (or another processing section).

Additionally, for example, the present technique can take a configuration of cloud computing in which one function is shared among a plurality of apparatuses via a network and jointly processed.

Additionally, for example, the above-described program can be executed in an optional apparatus. In that case, the apparatus is only required to include required functions (functional blocks and the like) and obtain required information.

Additionally, for example, the steps described in the above-described flowcharts can be executed by one apparatus or shared among a plurality of apparatuses for execution. Furthermore, in a case where one step includes a plurality of types of processing, the plurality of types of processing included in the one step can be executed by one apparatus or shared among a plurality of apparatuses for execution. In other words, the plurality of types of processing included in the one step can also be executed as processing including a plurality of steps. In contrast, the processing described as a plurality of steps can be organized into one step for execution.

Note that, for the program executed by the computer, the processing in the steps describing the program may be executed chronologically along the order described herein, or in parallel, or individually at required timings when, for example, the program is invoked. In other words, the processing in the steps may be executed in an order different from the above-described order unless there is inconsistency. The processing in the steps describing the program may be executed in parallel with or in combination with the processing in another program.

Note that the plurality of present techniques described herein can be independently and solely implemented unless there is inconsistency. Of course, any plurality of the present techniques can be implemented at the same time. For example, in any of the embodiments, a part or all of the present technique described can be implemented in combination with a part or all of the present technique described in another embodiment. Additionally, a part or all of any of the present techniques can be implemented simultaneously with another technique not described above.

Note that the present technique can also take the following configurations.

(1)

An image processing apparatus including:

a coding section coding a captured image on the basis of positional information indicating a position where a moving body has captured an image of a subject to generate the captured image.

(2)

The image processing apparatus according to (1), in which the positional information includes at least one of GPS (Global Positioning System) information indicating a position of the moving body, IMU (Inertial Measurement Unit) information indicating movement of the moving body, or image capturing control information indicating an image capturing direction of the captured image.

(3)

The image processing apparatus according to (1) or (2), in which the coding section codes the captured image as frame images of a moving image.

(4)

The image processing apparatus according to (3), in which the coding section sets, on the basis of the positional information, a reference frame referenced in coding of the moving image.

(5)

The image processing apparatus according to (3) or (4), in which the coding section performs inter-frame prediction in coding of the moving image, and sets motion vectors on the basis of the positional information.

(6)

The image processing apparatus according to (5), in which the coding section further sets a motion vector for a current frame on the basis of a motion vector for a coded frame.

(7)

The image processing apparatus according to any one of (3) to (6), in which the coding section sets, on the basis of the positional information, a coding parameter used for coding of the moving image.

(8)

The image processing apparatus according to (7), in which the coding section sets a GOP structure as the coding parameter on the basis of the positional information.

(9)

The image processing apparatus according to (7) or (8), in which the coding section sets a quantization step for quantization performed in coding of the moving image, as the coding parameter on the basis of the positional information.

(10)

The image processing apparatus according to any one of (3) to (9), in which the coding section selects, on the basis of the positional information, a captured image to be coded.

(11)

The image processing apparatus according to any one of (3) to (10), in which the coding section adds the positional information to coded data generated by coding.

(12)

The image processing apparatus according to any one of (3) to (11), further including:

a decoding section decoding coded data obtained by coding the captured image in accordance with a predetermined coding scheme, in accordance with a decoding scheme corresponding to the coding scheme, to restore the captured image, in which the coding section codes the captured image restored by the decoding section, in accordance with a scheme different from the coding scheme on the basis of the positional information.

(13)

The image processing apparatus according to (12), in which the coded data is obtained by coding the captured image into a still image on a one-by-one basis, the decoding section decodes the coded data of each of a plurality of the captured images, and the coding section codes a restored plurality of the captured images into a moving image.

(14)

The image processing apparatus according to (13), in which the positional information is added to the coded data using an Exif format.

(15)

The image processing apparatus according to any one of (3) to (14), in which the coding section sorts a plurality of the captured images on the basis of the positional information, and codes the sorted plurality of the captured images into a moving image.

(16)

The image processing apparatus according to (15), in which the plurality of captured images includes captured images generated by a plurality of the moving bodies.

(17)

The image processing apparatus according to any one of (1) to (16), further including:

a transmission section transmitting, to another apparatus, coded data generated by the coding section.

(18)

The image processing apparatus according to (17), further including:

a recording section recording the coded data generated by the coding section, and a selection section selecting, according to a communication status of the transmission section, whether to transmit the coded data to the another apparatus via the transmission section or to record the coded data in the recording section.

(19)

The image processing apparatus according to any one of (1) to (18), in which the moving body includes a flying object.

(20)

An image processing method including:

coding a captured image on the basis of positional information indicating a position where a moving body has captured an image of a subject to generate the captured image.

(21)

An image processing apparatus including:

a transcode section configured to transcode coded data obtained by coding a captured image captured by a moving body with an image capturing section, on the basis of positional information indicating a position where the captured image has been generated.

(22)

The image processing apparatus according to (21), in which the transcode section includes a decoding section decoding the coded data to generate a decoded image, and a coding section coding the decoded image generated by the decoding.

(23)

The image processing apparatus according to (22), in which the coded data is obtained by coding the captured image into a still image on a one-by-one basis, the decoding section decodes the coded data of each of a plurality of the captured images to generate the decoded image, and the coding section codes, into a moving image, a plurality of the decoded images generated by the decoding section.

(24)

The image processing apparatus according to (22) or (23), in which the coding section performs coding to obtain frame images of a moving image.

(25)

The image processing apparatus according to (24), in which the coding section sets, on the basis of the positional information, a reference frame referenced in coding of the moving image.

(26)

The image processing apparatus according to (24) or (25), in which the coding section sets, on the basis of the positional information, motion vectors used when inter-frame prediction is performed in coding of the moving image.

(27)

The image processing apparatus according to (26), in which the coding section sets a motion vector for a current frame on the basis of a motion vector for a coded frame.

(28)

The image processing apparatus according to any one of (24) to (27), in which the coding section sets, on the basis of the positional information, a coding parameter used for coding of the moving image.

(29)

The image processing apparatus according to (28), in which the coding section sets a GOP structure as the coding parameter on the basis of the positional information.

(30)

The image processing apparatus according to (28) or (29), in which the coding section sets a quantization step for quantization performed in coding of the moving image, as the coding parameter on the basis of the positional information.

(31)

The image processing apparatus according to any one of (23) to (30), in which the coding section selects, on the basis of the positional information, a captured image to be coded.

(32)

The image processing apparatus according to any one of (21) to (31), in which the positional information includes at least one of GPS (Global Positioning System) information indicating a position of the moving body, IMU (Inertial Measurement Unit) information indicating movement of the moving body, or image capturing control information indicating an image capturing direction of the captured image.

(33)
The image processing apparatus according to any one of (21) to (32), in which
the coded data is associated with the positional information.
(34)
The image processing apparatus according to (33), in which
the positional information is added to the coded data using an Exif format.
(35)
The image processing apparatus according to any one of (24) to (34), in which
the coding section sorts a plurality of the decoded images on the basis of the positional information and codes the sorted plurality of the decoded images into a moving image.
(36)
The image processing apparatus according to (35), in which
the plurality of captured images includes captured images generated by a plurality of the moving bodies.
(37)
The image processing apparatus according to any one of (23) to (36), further including:
a transmission section transmitting, to another apparatus, recoded data generated by the coding section.
(38)
The image processing apparatus according to any one of (21) to (37), in which
the moving body includes a flying object.
(39)
The image processing apparatus according to any one of (21) to (38), in which
the moving body includes a vehicle.
(40)
An image processing method including:
transcoding coded data obtained by coding a captured image captured by a moving body with an image capturing section, on the basis of positional information indicating a position where the captured image has been generated.

REFERENCE SIGNS LIST

100 Image processing system, 101 Flying object, 102 Ground station, 103 Cloud, 104 Terminal apparatus, 110 Subject area, 131 Control section, 151 Flying section, 152 IMU section, 153 GPS section, 154 Image capturing control section, 155 Image capturing section, 156 Coding section, 157 Information addition section, 158 Storage section, 159 Transmission section, 201 Reception section, 202 Separation section, 203 Decoding section, 204 Moving image coding section, 205 Transmission section, 206 Storage section, 211 Frame memory, 212 Motion prediction section, 213 Coding section, 301 Control section, 311 Sort buffer, 314 Quantization section, 315 Coding section, 317 Dequantization section, 322 Prediction section, 811 Selection section, 812 Transmission section

The invention claimed is:

1. An image processing apparatus comprising:
   circuitry configured to:
   receive, from a moving body different from the image processing apparatus, data coded by the moving body, the coded data including data corresponding to a plurality of still images captured by the moving body and data corresponding to positional information indicating positions where the moving body has captured the plurality of still images;
   decode the received coded data to acquire the plurality of still images and the positional information; and
   recode the decoded plurality of still images on a basis of the decoded positional information to generate coded data representing a moving image corresponding to the plurality of still images.

2. The image processing apparatus according to claim 1, wherein
   the circuitry is further configured to recode the decoded plurality of still images to represent frame images indicating the moving image.

3. The image processing apparatus according to claim 2, wherein
   the circuitry is further configured to set, on a basis of the positional information, a reference frame referenced in the coding of the moving image.

4. The image processing apparatus according to claim 2, wherein
   the circuitry is further configured to set, on a basis of the positional information, motion vectors used when inter-frame prediction is performed in the coding of the moving image.

5. The image processing apparatus according to claim 4, wherein
   the circuitry is further configured to set a motion vector for a current frame on a basis of a motion vector for a coded frame in the coding of the moving image.

6. The image processing apparatus according to claim 2, wherein
   the circuitry is further configured to set, on a basis of the positional information, a coding parameter used for the coding of the moving image.

7. The image processing apparatus according to claim 6, wherein
   the circuitry is further configured to set a GOP structure as a coding parameter in the coding of the moving image on a basis of the positional information.

8. The image processing apparatus according to claim 6, wherein
   the circuitry is further configured to set a quantization step for quantization performed in the coding of the moving image, as a coding parameter on a basis of the positional information.

9. The image processing apparatus according to claim 1, wherein
   the circuitry is further configured to select, on a basis of the positional information, a part of the plurality of still images to be coded.

10. The image processing apparatus according to claim 1, wherein
    the positional information includes at least one of Global Positioning System (GPS) information indicating the positions of the moving body, Inertial Measurement Unit (IMU) information indicating movement of the moving body, or image capturing control information indicating an image capturing direction of the plurality of still images.

11. The image processing apparatus according to claim 1, wherein
    the positional information in the coded data is represented using an Exif format.

12. The image processing apparatus according to claim 1, wherein
    the circuitry is further configured to sort, in the recoding of the decoded plurality of still images, the decoded plurality of still images on a basis of the positional information.

13. The image processing apparatus according to claim 1, wherein the circuitry is further configured to transmit the recoded data to an apparatus different from the image processing apparatus and the moving body.

14. The image processing apparatus according to claim 1, wherein the moving body includes a flying object.

15. The image processing apparatus according to claim 1, wherein the moving body includes a vehicle.

16. An image processing method, by an image processing apparatus, the method comprising:

receiving, from a moving body different from the image processing apparatus, data coded by the moving body, the coded data including data corresponding to a plurality of still images captured by the moving body and data corresponding to a positional information indicating a position where the moving body has captured the plurality of still images;

decoding the received coded data to acquire the plurality of still images and the positional information; and recoding the decoded plurality of still images on a basis of the decoded positional information to generate coded data representing a moving image corresponding to the plurality of still images.

17. A non-transitory computer-readable medium having embodied thereon a program, which when executed by a computer causes the computer to execute an image processing method, the method comprising:

receiving, from a moving body different from the image processing apparatus, data coded by the moving body, the coded data including data corresponding to a plurality of still images captured by the moving body and data corresponding to a positional information indicating a position where the moving body has captured the plurality of still images;

decoding the received coded data to acquire the plurality of still images and the positional information; and recoding the decoded plurality of still images on a basis of the decoded positional information to generate coded data representing a moving image corresponding to the plurality of still images.

* * * * *